United States Patent
Momma et al.

(10) Patent No.: US 12,552,681 B2
(45) Date of Patent: Feb. 17, 2026

(54) METHOD FOR FORMING POSITIVE ELECTRODE ACTIVE MATERIAL, METHOD FOR MANUFACTURING SECONDARY BATTERY, AND SECONDARY BATTERY

(71) Applicant: SEMICONDUCTOR ENERGY LABORATORY CO., LTD., Atsugi (JP)

(72) Inventors: Yohei Momma, Kanagawa (JP); Mayumi Mikami, Kanagawa (JP); Teruaki Ochiai, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 1016 days.

(21) Appl. No.: 17/442,208

(22) PCT Filed: Mar. 25, 2020

(86) PCT No.: PCT/IB2020/052785
§ 371 (c)(1),
(2) Date: Sep. 23, 2021

(87) PCT Pub. No.: WO2020/201916
PCT Pub. Date: Oct. 8, 2020

(65) Prior Publication Data
US 2022/0185694 A1    Jun. 16, 2022

(30) Foreign Application Priority Data

Apr. 5, 2019  (JP) .................. 2019-072940
Jul. 4, 2019  (JP) .................. 2019-124896

(51) Int. Cl.
C01G 53/42    (2025.01)
H01M 4/02    (2006.01)
(Continued)

(52) U.S. Cl.
CPC .......... *C01G 53/42* (2013.01); *H01M 4/0471* (2013.01); *H01M 4/505* (2013.01); *H01M 4/525* (2013.01);
(Continued)

(58) Field of Classification Search
CPC ..... C01G 53/42; C01G 53/00; H01M 4/0471; H01M 4/505; H01M 4/525;
(Continued)

(56) References Cited

U.S. PATENT DOCUMENTS 8,741,484 B2    6/2014    Karthikeyan et al.
8,765,306 B2    7/2014    Amiruddin et al.
(Continued)

FOREIGN PATENT DOCUMENTS

CN    101350405 A    1/2009
CN    101414680 A    4/2009
(Continued)

OTHER PUBLICATIONS

Chinese Office Action (Application No. 202080026569.9) Dated Feb. 13, 2023.
(Continued)

*Primary Examiner* — Anthony J Zimmer
*Assistant Examiner* — Syed T Iqbal
(74) *Attorney, Agent, or Firm* — Fish & Richardson P.C.

(57) ABSTRACT

A positive electrode active material with high capacity and excellent charge and discharge cycle performance, a positive electrode active material with high productivity, a positive electrode active material that suppresses a decrease in capacity, or the like is provided. Alternatively, a high-capacity secondary battery, a secondary battery with excellent charge and discharge characteristics, a highly safe or reliable secondary battery, or the like is provided. The positive electrode active material is obtained by a first heating step of heating (Continued)

a mixture of a first material, a second material, and a third material and a second heating step of heating a mixture which is a mixture of the mixture, a fourth material, and a fifth material and has a total amount of 15 g or more. The first material is a halogen compound including an alkali metal, the second material includes magnesium, the third material is a metal oxide including a metal A and cobalt, the fourth material includes nickel, and the fifth material includes aluminum. Each heating is performed in an atmosphere including oxygen. A temperature in the first heating step is lower than a temperature in the second heating step by 20° C. or more.

10 Claims, 44 Drawing Sheets

(51) Int. Cl.
  *H01M 4/04* (2006.01)
  *H01M 4/505* (2010.01)
  *H01M 4/525* (2010.01)
  *H01M 10/0525* (2010.01)

(52) U.S. Cl.
  CPC ..... *H01M 10/0525* (2013.01); *C01P 2002/72* (2013.01); *C01P 2006/40* (2013.01); *H01M 2004/028* (2013.01)

(58) Field of Classification Search
  CPC ....... H01M 10/0525; H01M 2004/028; H01M 10/052; H01M 4/5815; C01P 2002/72; C01P 2006/40; C01P 2002/74; Y02E 60/10
  See application file for complete search history.

(56) References Cited

U.S. PATENT DOCUMENTS

| | | | |
|---|---|---|---|
| 8,877,377 | B2 | 11/2014 | Hosoya |
| 8,999,578 | B2 | 4/2015 | Park et al. |
| 10,522,830 | B2 | 12/2019 | Kaneda et al. |
| 10,541,414 | B2 | 1/2020 | Li et al. |
| 10,741,834 | B2 | 8/2020 | Zhang et al. |
| 2002/0110736 | A1 | 8/2002 | Kweon et al. |
| 2003/0104279 | A1 | 6/2003 | Miyazaki et al. |
| 2004/0142241 | A1 | 7/2004 | Nagayama |
| 2006/0263690 | A1 | 11/2006 | Suhara et al. |
| 2007/0117014 | A1 | 5/2007 | Saito et al. |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0247986 | A1 | 9/2010 | Toyama et al. |
| 2011/0236751 | A1 | 9/2011 | Amiruddin et al. |
| 2011/0244331 | A1 | 10/2011 | Karthikeyan et al. |
| 2013/0052534 | A1 | 2/2013 | Fujiki et al. |
| 2013/0323596 | A1 | 12/2013 | Morita et al. |
| 2014/0212759 | A1 | 7/2014 | Blangero et al. |
| 2015/0008364 | A1 | 1/2015 | Endo |
| 2016/0006032 | A1 | 1/2016 | Paulsen et al. |
| 2016/0013478 | A1* | 1/2016 | Satow ................... H01M 4/364 429/223 |
| 2016/0156032 | A1 | 6/2016 | Lee et al. |
| 2016/0197341 | A1 | 7/2016 | Lu et al. |
| 2016/0268601 | A1 | 9/2016 | Paulsen et al. |
| 2016/0276659 | A1 | 9/2016 | Choi et al. |
| 2017/0352864 | A1* | 12/2017 | Kawakami ............. H01M 4/0471 |
| 2018/0013130 | A1 | 1/2018 | Ochiai et al. |
| 2018/0145317 | A1 | 5/2018 | Momma et al. |
| 2018/0145368 | A1 | 5/2018 | Ochiai et al. |
| 2018/0183045 | A1 | 6/2018 | Liu et al. |
| 2018/0233770 | A1 | 8/2018 | Ein-Eli et al. |
| 2019/0245199 | A1 | 8/2019 | Zeng et al. |
| 2020/0176770 | A1 | 6/2020 | Takahashi et al. |
| 2020/0220173 | A1 | 7/2020 | Jo et al. |
| 2021/0020935 | A1 | 1/2021 | Takahashi et al. |
| 2021/0028456 | A1 | 1/2021 | Takahashi et al. |
| 2021/0083281 | A1 | 3/2021 | Mikami et al. |
| 2021/0313571 | A1 | 10/2021 | Momma et al. |
| 2022/0131146 | A1 | 4/2022 | Saito et al. |
| 2022/0359870 | A1 | 11/2022 | Mikami et al. |
| 2025/0105282 | A1 | 3/2025 | Liu et al. |

FOREIGN PATENT DOCUMENTS

| | | |
|---|---|---|
| CN | 102054985 A | 5/2011 |
| CN | 105655554 A | 6/2016 |
| CN | 105938917 A | 9/2016 |
| CN | 106532029 A | 3/2017 |
| CN | 106784626 A | 5/2017 |
| CN | 107195863 A | 9/2017 |
| CN | 107768642 A | 3/2018 |
| CN | 110337744 A | 10/2019 |
| CN | 113140726 A | 7/2021 |
| EP | 2019442 A | 1/2009 |
| EP | 3783707 A | 2/2021 |
| JP | 2000-203842 A | 7/2000 |
| JP | 2000-323140 A | 11/2000 |
| JP | 2002-216760 A | 8/2002 |
| JP | 2006-261132 A | 9/2006 |
| JP | 2008-270201 A | 11/2008 |
| JP | 2010-080407 A | 4/2010 |
| JP | 2013-524413 | 6/2013 |
| JP | 2013-524440 | 6/2013 |
| JP | 2015-099722 A | 5/2015 |
| JP | 2015-122299 A | 7/2015 |
| JP | 2016-528707 | 9/2016 |
| JP | 2018-523276 | 8/2018 |
| JP | 2019-032954 A | 2/2019 |
| JP | 2019-179758 A | 10/2019 |
| KR | 2019-0028089 A | 3/2019 |
| TW | 201907608 | 2/2019 |
| WO | WO-2011/119386 | 9/2011 |
| WO | WO-2011/123264 | 10/2011 |
| WO | WO-2015/026525 | 2/2015 |
| WO | WO-2017/025957 | 2/2017 |
| WO | WO-2019/003025 | 1/2019 |
| WO | WO-2020/201916 | 10/2020 |

OTHER PUBLICATIONS

Shin.H et al., "Improvement of electrochemical properties of Li[Ni0.4CO0.2Mn(0.4-x)Mgx]O2-yFy cathode materials at high voltage region", Electrochimica Acta, May 19, 2006, vol. 52, No. 4, pp. 1477-1482, Elesevier.
Jung.H et al., "Improved electrochemical performances of LiM0.05Co0.95O1.95F0.05(M=Mg, Al, Zr) at high voltage", Electrochimica Acta, Feb. 24, 2012, vol. 68, pp. 153-157, Elesevier.
International Search Report (Application No. PCT/IB2020/052785) Dated Jul. 7, 2020.
Written Opinion (Application No. PCT/IB2020/052785) Dated Jul. 7, 2020.
Okumura.T et al., "Correlation of lithium ion distribution and X-ray absorption near-edge structure in 03- and 02-lithium cobalt oxides from first-principle calculation", Journal of Materials Chemistry, 2012, vol. 22, pp. 17340-17348.
Motohashi.T et al., "Electronic phase diagram of the layered cobalt oxide system LixCoO2 (0.0≤x≤1.0)", Phys. Rev. B (Physical Review. B), Oct. 9, 2009, vol. 80, No. 16, pp. 165114-1-165114-9.
Chen.Z et al., "Staging Phase Transitions in LixCoO2", J. Electrochem. Soc. (Journal of the Electrochemical Society), 2002, vol. 149, No. 12, pp. A1604-A1609.
Counts. W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.
Belsky.A et al., "New developments in the Inorganic Crystal Structure Database (ICSD): Accessibility in support of materials research

(56) References Cited

OTHER PUBLICATIONS and design.", Acta. Cryst.(Acta Crystallographica Section B), Jun. 1, 2002, vol. B58, No. 3, pp. 364-369.
Zhang.J et al., "Trace doping of multiple elements enables stable battery cycling of LiCoO2 at 4.6 V", Nature Energy, Jun. 17, 2019, vol. 4, pp. 594-603.
Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.
Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.
Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.
Wang.Z et al., "EELS analysis of cation valence states and oxygen vacancies in magnetic oxides", Micron, Oct. 1, 2000, vol. 31, No. 5, pp. 571-580, Elsevier.
Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.
Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.
Zou.M et al., "Synthesis and Electrochemical Performance of High Voltage Cycling LiM0.05Co0.9502 as Cathode Material for Lithium Rechargeable Cells", Electrochemical and Solid-State Letters, Apr. 26, 2004, vol. 7, No. 7, pp. A176-A179.
Kim. Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.
Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.
Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.
Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.
Taguchi.N et al., "Characterization of MgO-coated-LiCoO2 particles by analytical transmission electron microscopy", Journal of Power Sources, Aug. 10, 2016, vol. 328, pp. 161-166, Elsevier.
Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.
Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.
Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.
Shao-horn.Y et al., "Probing Lithium and Vacancy Ordering in 03 Layered Lix CoO2 (x = 0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-lon Cells", Advanced Energy Materials, Oct. 12, 2016, vol. 7, No. 1, pp. 1601507-1-1601507-21.

\* cited by examiner

FIG. 18A
FIG. 18B
FIG. 18C
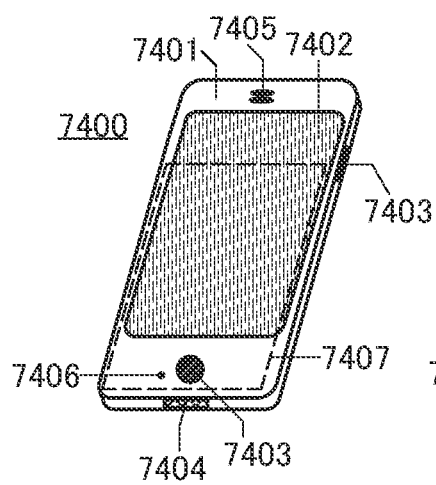
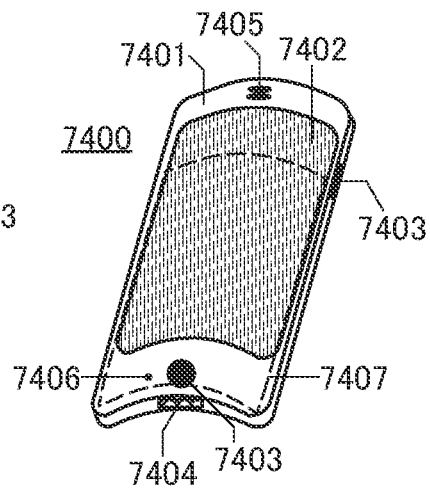
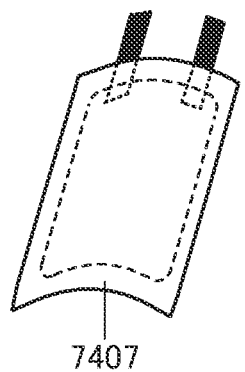
FIG. 18D
FIG. 18E
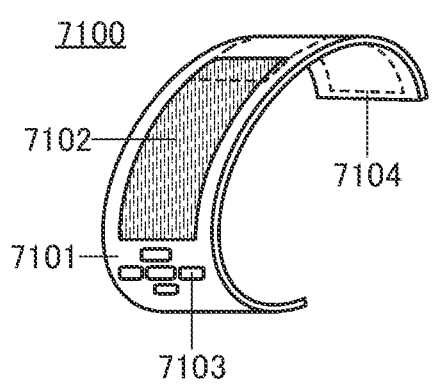
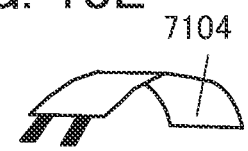
FIG. 18F
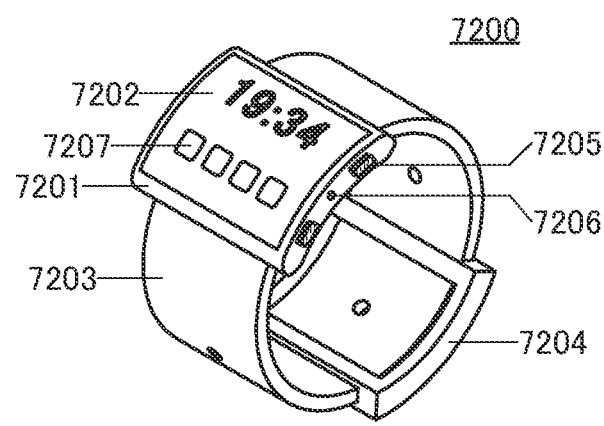
FIG. 18G
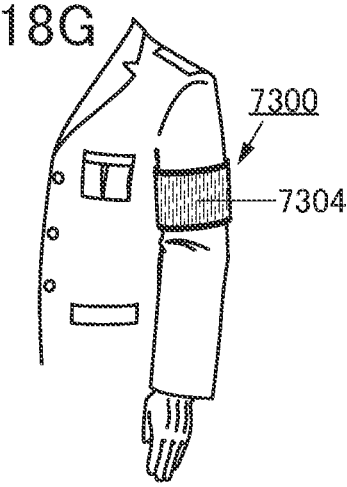
FIG. 18H
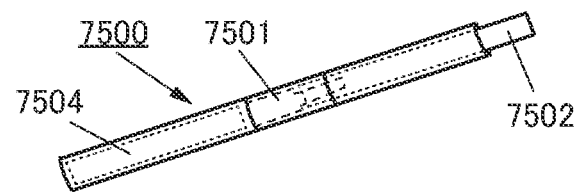

METHOD FOR FORMING POSITIVE ELECTRODE ACTIVE MATERIAL, METHOD FOR MANUFACTURING SECONDARY BATTERY, AND SECONDARY BATTERY

CROSS REFERENCE TO RELATED APPLICATIONS

This application is a U.S. National Phase Application under 35 U.S.C. § 371 of International Application PCT/IB2020/052785, filed on Mar. 25, 2020, which is incorporated by reference and claims the benefit of foreign priority applications filed in Japan on Apr. 5, 2019, as Application No. 2019-072940 and on Jul. 4, 2019, as Application No. 2019-124896.

TECHNICAL FIELD

One embodiment of the present invention relates to an object, a method, or a manufacturing method. Alternatively, one embodiment of the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used in a secondary battery, a secondary battery, and an electronic device including a secondary battery.

Note that in this specification, a power storage device refers to every element and device having a function of storing power. Examples of the power storage device include a storage battery (also referred to as a secondary battery) such as a lithium-ion secondary battery, a lithium-ion capacitor, and an electric double layer capacitor.

In addition, electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and laptop computers; portable music players; digital cameras; medical equipment; next-generation clean energy vehicles (hybrid electric vehicles (HV), electric vehicles (EV), plug-in hybrid electric vehicles (PHV), and the like); and the like. The lithium-ion secondary batteries are essential as rechargeable energy supply sources for today's information society.

The performance required for lithium-ion secondary batteries includes much higher energy density, improved cycle performance, safety under a variety of operation environments, improved long-term reliability, and the like.

Thus, improvement of a positive electrode active material has been studied to improve the cycle performance and increase the capacity of lithium-ion secondary batteries (Patent Document 1 and Patent Document 2). In addition, a crystal structure of a positive electrode active material has also been studied (Non-Patent Document 1 to Non-Patent Document 4).

X-ray diffraction (XRD) is one of methods used for analysis of a crystal structure of a positive electrode active material. With the use of the ICSD (Inorganic Crystal Structure Database) introduced in Non-Patent Document 5, XRD data can be analyzed.

REFERENCES

Patent Documents

[Patent Document 1] Japanese Published Patent Application No. 2002-216760
[Patent Document 2] Japanese Published Patent Application No. 2006-261132

Non-Patent Documents

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 2012, 22, pp. 17340-17348.
[Non-Patent Document 2] Motohashi, T. et al., "Electronic phase diagram of the layered cobalt oxide system $LixCoO_2$ ($0.0 \leq x \leq 1.0$)", *Physical Review B*, 80 (16); 165114.
[Non-Patent Document 3] Zhaohui Chen et al., "Staging Phase Transitions in $LixCoO_2$, *Journal of The Electrochemical Society*, 2002, 149 (12) A1604-A1609.
[Non-Patent Document 4] W. E. Counts et al., *Journal of the American Ceramic Society*, (1953), 36 [1] 12-17. FIG. 01471.
[Non-Patent Document 5] Belsky, A. et al., "New developments in the Inorganic Crystal Structure Database (ICSD): accessibility in support of materials research and design", *Acta Cryst.* (2002), B58, 364-369.

SUMMARY OF THE INVENTION

Problems to be Solved by the Invention

An object of one embodiment of the present invention is to provide a positive electrode active material with high capacity and excellent charge and discharge cycle performance for a lithium-ion secondary battery, and a forming method thereof. Another object is to provide a method for forming a positive electrode active material with high productivity. Another object of one embodiment of the present invention is to provide a positive electrode active material that suppresses a decrease in capacity in charge and discharge cycles when used for a lithium-ion secondary battery. Another object of one embodiment of the present invention is to provide a high-capacity secondary battery. Another object of one embodiment of the present invention is to provide a secondary battery with excellent charge and discharge characteristics. Another object is to provide a positive electrode active material in which elution of a transition metal such as cobalt is inhibited even when a state being charged with high voltage is held for a long time. Another object of one embodiment of the present invention is to provide a highly safe or reliable secondary battery.

Another object of one embodiment of the present invention is to provide a novel material, novel active material particles, a novel power storage device, or a forming method thereof.

Note that the descriptions of these objects do not preclude the existence of other objects. One embodiment of the present invention does not have to achieve all these objects. Note that other objects can be taken from the descriptions of the specification, the drawings, and the claims.

Means for Solving the Problems

One embodiment of the present invention is a method for forming a positive electrode active material, which includes a first step of forming a first mixture in which a first material, a second material, and a third material are mixed; a second step of heating the first mixture to form a second mixture; a third step of forming a third mixture in which the second mixture, a fourth material, and a fifth material are mixed; and a fourth step of heating the third mixture to form a fourth mixture. The first material is a halogen compound including an alkali metal. The second material includes magnesium. The third material is a metal oxide including the alkali metal and cobalt. The fourth material includes nickel. The fifth material includes aluminum. The third mixture is heated in a treatment chamber of an annealing apparatus in the fourth step. A total amount of the third mixture heated in the treatment chamber in the fourth step is more than or equal to 15 g. The heating in the second step is performed in an atmosphere including oxygen. The heating in the second step is performed in a temperature range higher than or equal to 600° C. and lower than or equal to 950° C. for more than or equal to 1 hour and less than or equal to 100 hours. The heating in the fourth step is performed in an atmosphere including oxygen. The heating in the fourth step is performed in a temperature range higher than or equal to 600° C. and lower than or equal to 950° C. for more than or equal to 1 hour and less than or equal to 100 hours. A temperature of the heating in the fourth step is lower than a temperature of the heating in the second step by 20° C. or more.

In the above-described structure, the alkali metal is preferably lithium, the first material is preferably lithium fluoride, and the second material is preferably magnesium fluoride.

In the above-described structure, the third material is preferably nickel hydroxide, and the fourth material is preferably aluminum hydroxide.

Another embodiment of the present invention is a method for forming a positive electrode active material, which includes a first step of forming a first mixture in which a first material, a second material, a third material, and a fourth material are mixed; and a second step of heating the first mixture to form a second mixture. The first material is a halogen compound including an alkali metal. The second material includes magnesium. The third material includes one or more selected from nickel, aluminum, titanium, vanadium, and chromium. The fourth material is a metal oxide including the alkali metal and cobalt. The heating in the second step is performed in a temperature range higher than or equal to 600° C. and lower than or equal to 950° C. for more than or equal to 1 hour and less than or equal to 100 hours. When the first material, the second material, and the third material are mixed and subjected to differential scanning calorimetry, the first material, the second material, and the third material have a first peak having a local minimum value in a range higher than or equal to 620° C. and lower than or equal to 920° C. The first peak is a negative peak.

In the above-described structure, the alkali metal is preferably lithium, the first material is preferably lithium fluoride, and the second material is preferably magnesium fluoride.

In the above-described structure, the third material preferably includes nickel, the first mixture is preferably a mixture where a fifth material is mixed with the first material, the second material, the third material, and the fourth material, and the fifth material preferably includes aluminum.

In the above-described structure, the third material is preferably nickel hydroxide.

In the above-described structure, a half width of the first peak is preferably lower than 100° C.

In the above-described structure, a measurement temperature range of the differential scanning calorimetry preferably at least includes a range higher than or equal to 200° C. and lower than or equal to 850° C.

In the above-described structure, an atmosphere of the heating in the second step preferably includes oxygen.

Alternatively, one embodiment of the present invention is a method for forming a positive electrode active material, which includes a first step of forming a first mixture in which a first material, a second material, a third material, and a fourth material are mixed and a second step of heating the first mixture to form a second mixture. The first material is a halogen compound including a metal A, the second material includes magnesium, the third material includes one or more selected from nickel, aluminum, titanium, vanadium, and chromium, the fourth material is a metal oxide including the metal A and cobalt, and the metal A is an alkali metal. The heating in the second step is performed in a temperature range higher than or equal to 600° C. and lower than or equal to 950° C. for more than or equal to 1 hour and less than or equal to 100 hours. When the first material, the second material, and the third material are mixed, heated in a temperature range higher than or equal to 600° C. and lower than or equal to 950° C. for more than or equal to 1 hour and less than or equal to 100 hours, and analyzed by X-ray diffraction, the first material, the second material, and the third material have a first diffraction peak having a local maximum at 2θ of greater than or equal to 39.5° and less than or equal to 41.5°, and four peaks at 2θ=19.0°±0.25°, 2θ=31.3°±0.25°, 2θ=36.9°±0.15°, and 2θ=59.4°±0.25° are not observed.

In the above-described structure, the metal A is preferably lithium, the first material is preferably lithium fluoride, and the second material is preferably magnesium fluoride.

In the above-described structure, the third material preferably includes nickel, the first mixture is preferably a mixture where a fifth material is mixed with the first material, the second material, the third material, and the fourth material, and the fifth material preferably includes aluminum.

In the above-described structure, the third material is preferably nickel hydroxide.

Effect of the Invention

With one embodiment of the present invention, a positive electrode active material with high capacity and excellent charge and discharge cycle performance for a lithium-ion secondary battery, and a forming method thereof can be provided. Furthermore, a method for forming a positive electrode active material with high productivity can be provided. Furthermore, a positive electrode active material that suppresses a decrease in capacity in charge and discharge cycles when used for a lithium-ion secondary battery can be provided. Furthermore, a high-capacity secondary battery can be provided. Furthermore, a secondary battery with excellent charge and discharge characteristics can be provided. Furthermore, a positive electrode active material in which elution of a transition metal such as cobalt is inhibited even when a state being charged with high voltage is held for a long time can be provided. Furthermore, a highly safe or reliable secondary battery can be provided. Furthermore, a novel material, novel active material particles, a novel power storage device, or a forming method thereof can be provided.

BRIEF DESCRIPTION OF THE DRAWINGS

FIG. 16A, FIG. 16B1, FIG. 16B2, FIG. 16C, and FIG. 16D are diagrams illustrating a bendable secondary battery.

FIG. 18A, FIG. 18B, FIG. 18C, FIG. 18D, FIG. 18E, FIG. 18F, FIG. 18G, and FIG. 18H are diagrams illustrating examples of electronic devices.

MODE FOR CARRYING OUT THE INVENTION

Figure 1A:
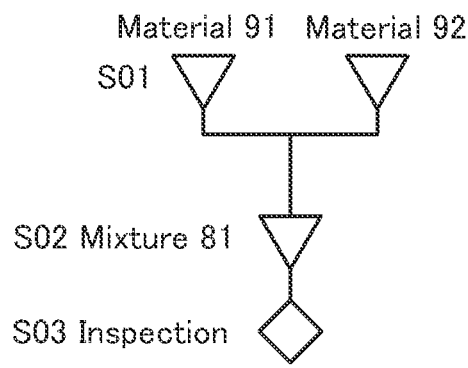
FIG. 1A, FIG. 1B, and FIG. 1C are diagrams illustrating methods for inspecting materials.

Embodiments of the present invention are described in detail below with reference to the drawings. Note that the present invention is not limited to the following descriptions, and it is readily understood by those skilled in the art that modes and details of the present invention can be modified in various ways. In addition, the present invention should not be construed as being limited to the descriptions of the embodiments below.

In addition, in this specification and the like, crystal planes and orientations are indicated by the Miller index. In the crystallography, a bar is placed over a number in the expression of crystal planes and orientations; however, in this specification and the like, crystal planes and orientations are in some cases expressed by placing a minus sign (−) before a number instead of placing the bar over the number due to patent expression limitations. Furthermore, an individual direction which shows an orientation in a crystal is denoted with "[ ]", a set direction which shows all of the equivalent orientations is denoted with "< >", an individual plane which shows a crystal plane is denoted with "( )", and a set plane having equivalent symmetry is denoted with "{ }".

In this specification and the like, segregation refers to a phenomenon in which in a solid made of a plurality of elements (e.g., A, B, and C), a certain element (e.g., B) is spatially non-uniformly distributed.

In this specification and the like, a superficial portion of a particle of an active material or the like refers to a region from a surface to a depth of approximately 10 nm. A plane generated by a crack may also be referred to as the surface. In addition, a region in a deeper position than a superficial portion is referred to as an inner portion.

In this specification and the like, a layered rock-salt crystal structure of a composite oxide including lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide including lithium and a transition metal belongs to a space group R-3m, and is not a spinel crystal structure but a crystal structure in which an ion of cobalt, magnesium, or the like is coordinated to six oxygen atoms and the cation arrangement has symmetry similar to that of the spinel crystal structure. Note that in the pseudo-spinel crystal structure, a light element such as lithium is sometimes coordinated to four oxygen atoms. Also in that case, the ion arrangement has symmetry similar to that of the spinel crystal structure.

The pseudo-spinel crystal structure can also be regarded as a crystal structure that includes Li between layers at random but is similar to a $CdCl_2$ type crystal structure. The crystal structure similar to the $CdCl_2$ type crystal structure is close to a crystal structure of lithium nickel oxide when charged up to a depth of charge of 0.94 ($Li_{0.06}NiO_2$); however, simple and pure lithium cobalt oxide or a layered rock-salt positive electrode active material including a large amount of cobalt is known not to have this crystal structure generally.

Anions of a layered rock-salt crystal and anions of a rock-salt crystal have cubic closest packed structures (face-centered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

Substantial alignment of the crystal orientations in two regions can be judged from a TEM (transmission electron microscopy) image, a STEM (scanning transmission electron microscopy) image, a HAADF-STEM (high-angle annular dark-field scanning transmission electron microscopy) image, an ABF-STEM (annular bright-field scanning transmission electron microscopy) image, or the like. X-ray diffraction (XRD), electron diffraction, neutron diffraction, and the like can also be used for judging. In the TEM image and the like, alignment of cations and anions can be observed as repetition of bright lines and dark lines. When the orientations of cubic closest packed structures in the layered rock-salt crystal and the rock-salt crystal are aligned, a state where an angle made by the repetition of bright lines and dark lines in the layered rock-salt crystal and the rock-salt crystal is less than or equal to 5°, further preferably less than or equal to 2.5° can be observed. Note that in the TEM image and the like, a light element such as oxygen or fluorine cannot be clearly observed in some cases; however, in such a case, alignment of orientations can be judged by arrangement of metal elements.

In this specification and the like, the theoretical capacity of a positive electrode active material refers to the amount of electricity for the case where all the lithium that can be inserted and extracted in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, the depth of charge obtained when all the lithium that can be inserted and extracted is inserted is 0, and the depth of charge obtained when all the lithium that can be inserted and extracted in a positive electrode active material is extracted is 1.

In addition, in this specification and the like, charging refers to transfer of lithium ions from a positive electrode to a negative electrode in a battery and transfer of electrons from a negative electrode to a positive electrode in an external circuit. For a positive electrode active material, extraction of lithium ions is called charging. A positive electrode active material with a depth of charge of greater than or equal to 0.7 and less than or equal to 0.9 may be referred to as a positive electrode active material charged with a high voltage.

Similarly, discharging refers to transfer of lithium ions from a negative electrode to a positive electrode in a battery and transfer of electrons from a positive electrode to a negative electrode in an external circuit. Discharging of a positive electrode active material refers to insertion of lithium ions. Furthermore, a positive electrode active material with a depth of charge of less than or equal to 0.06 or a positive electrode active material from which more than or equal to 90% of the charge capacity is discharged from a state where the positive electrode active material is charged with high voltage is referred to as a sufficiently discharged positive electrode active material.

In this specification and the like, an unbalanced phase change refers to a phenomenon that causes a nonlinear change in physical quantity. For example, an unbalanced phase change might occur before and after peaks in a dQ/dV curve obtained by differentiating capacitance (Q) with voltage (V) (dQ/dV), which can largely change the crystal structure.

A secondary battery includes a positive electrode and a negative electrode, for example. A positive electrode active material is a material included in the positive electrode. The positive electrode active material is a material that performs a reaction contributing to the charge and discharge capacity, for example. Note that the positive electrode active material may partly include a material that does not contribute to the charge and discharge capacity.

In this specification and the like, the positive electrode active material of one embodiment of the present invention is expressed as a positive electrode material, a secondary battery positive electrode material, or the like in some cases. In this specification and the like, the positive electrode active material of one embodiment of the present invention preferably includes a compound. In this specification and the like, the positive electrode active material of one embodiment of the present invention preferably includes a composition. In this specification and the like, the positive electrode active material of one embodiment of the present invention preferably includes a composite.

The discharge rate refers to the relative ratio of a current at the time of discharging to battery capacity and is expressed in a unit C. A current corresponding to 1 C in a battery with a rated capacity X (Ah) is X (A). The case where discharging is performed at a current of 2X (A) is rephrased as to perform discharging at 2 C, and the case where discharging is performed at a current of X/5 (A) is rephrased as to perform discharging at 0.2 C. The same applies to the charge rate; the case where charging is performed at a current of 2X (A) is rephrased as to perform charging at 2 C, and the case where charging is performed at a current of X/5 (A) is rephrased as to perform charging at 0.2 C.

Constant current charging refers to a charging method with a fixed charge rate, for example. Constant voltage charging refers to a charging method in which voltage is fixed when reaching the upper voltage limit, for example. Constant current discharging refers to a discharging method with a fixed discharge rate, for example.

Embodiment 1

In this embodiment, a method for forming a positive electrode active material and the like according to one embodiment of the present invention are described.

A positive electrode active material of one embodiment of the present invention is obtained by mixing a halogen compound including an alkali metal A, a compound including magnesium, and a metal oxide including the alkali metal A and a transition metal and performing annealing (also expressed as heating, heat treatment, and the like in some cases). In the annealing process, a compound including a metal M is preferably added to the above-described three materials. The addition of the compound including the metal M improves the structural stability of the positive electrode active material and can increase the charge voltage of the secondary battery in some cases. As a result, the energy density is increased. Moreover, the life of the secondary battery is lengthened.

In the metal oxide including the alkali metal A and the transition metal, the transition metal is preferably one or more of cobalt, manganese, nickel, and iron, for example. The transition metal included in the metal oxide including the alkali metal A and the transition metal is preferably an element that is different from the metal M described later.

The metal oxide including the alkali metal A and the transition metal has a layered rock-salt structure, for example. Alternatively, the metal oxide has a spinel structure, for example.

The metal M is one or more selected from nickel, aluminum, manganese, titanium, vanadium, iron, and chromium and particularly preferably one or more of nickel and aluminum, for example.

It is suggested that a eutectic reaction occurs by mixing and heating the halogen compound including the alkali metal A and the compound including magnesium. Alternatively, a eutectic point is lowered. Alternatively, a eutectic crystallization reaction occurs. Alternatively, a eutectic crystallizaiton point is lowered. The eutectic reaction, for example, causes melting at a temperature lower than the melting points of the materials, so that magnesium can be added to a surface and an inner portion of the metal oxide including the alkali metal A and the transition metal.

The addition of the compound including the metal M to the three materials, which are the halogen compound including the alkali metal A, the compound including magnesium, and the metal oxide including the alkali metal A and the transition metal, might inhibit the eutectic reaction between the halogen compound including the alkali metal A and the compound including magnesium in some cases. A reason of inhibiting the eutectic reaction can be a reaction of the compound including the metal M with at least one of the compound including magnesium and the halogen compound including the alkali metal A at a temperature lower than the temperature at which the eutectic reaction is suggested.

The ease of the eutectic reaction may change depending on the atmosphere and pressure in annealing and the total amount of the annealed material with respect to the volume of the inside of a treatment chamber of an annealing apparatus.

The amount of reaction of the compound including the metal M with the compound including magnesium and the halogen compound including the alkali metal A is preferably small at a temperature lower than the temperature at which the eutectic reaction is suggested.

Furthermore, in the case where the compound including the metal M is likely to inhibit the eutectic reaction, the halogen compound including the alkali metal A, the compound including magnesium, and the metal oxide including the alkali metal A and the transition metal are mixed and subjected to annealing, and then the compound including the metal M is mixed and annealing is performed, for example.

The reaction of the halogen compound including the alkali metal A and the compound including magnesium with the compound including the metal M at a temperature lower than the temperature at which the eutectic reaction is suggested can be inspected by the following method.

Note that although the compound including magnesium has been described so far as the material that causes the eutectic reaction with the halogen compound including the alkali metal A, a compound including an element X can be used instead of the compound including magnesium. As the element X, an element such as calcium, zirconium, lanthanum, or barium can be used. For another example, an element such as copper, potassium, sodium, or zinc can be used as the element X. Magnesium may be included in the element X in addition to the elements described above. Two or more of the elements described above may be combined and used as the element X.

<DSC>

FIG. 1A illustrates an example of inspecting a reaction between a material 91 and a material 92 using DSC (Differential scanning calorimetry). Here, the material 91 is the halogen compound including the alkali metal A, and the material 92 is the compound including the element X.

In Step S01, the material 91 and the material 92 are prepared.

Next, in Step S02, the material 91 and the material 92 are mixed to obtain a mixture 81.

Next, in Step S03, inspection is performed. Here, DSC is performed as the inspection. In DSC, measurement temperatures are scanned to observe a change in the amount of heat. This change in the amount of heat is caused by an endothermic reaction such as melting or an exothermic reaction such as crystallization, for example.

From the material 91 and the material 92, a change in the amount of heat suggesting an endothermic reaction is preferably observed at a temperature T(1).

Figure 1B:
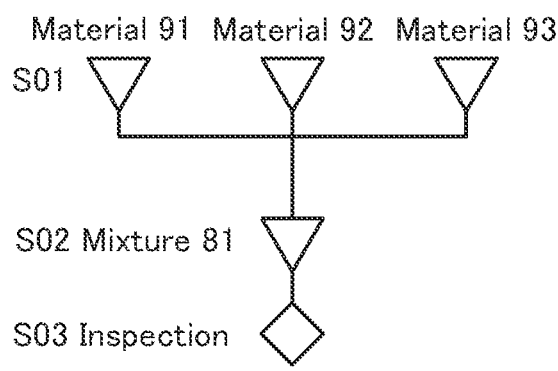

FIG. 1B illustrates an example of inspecting a reaction among the material 91, the material 92, and a material 93 using DSC. Here, the material 93 is a compound including a metal M(1). For the metal M(1), the description of the metal M can be referred to.

The mixture 81 of the material 91, the material 92, and the material 93 is inspected using DSC. It is possible to inspect how much the reaction at the temperature T(1) observed in the inspection in FIG. 1A is inhibited by addition of the material 93 can be inspected.

Specifically, for example, DSC is performed at the inspection in FIG. 1A, and a peak suggesting an endothermic reaction with a peak intensity I(1) is observed at the temperature T(1). Here, the temperature T(1) is preferably higher than or equal to 620° C. and lower than or equal to 920° C., further preferably higher than or equal to 700° C. and lower than or equal to 850° C., still further preferably higher than or equal to 700° C. and lower than or equal to 770° C.

DSC is performed at the inspection in FIG. 1B to obtain a temperature-heat flow curve. In the case where a peak suggesting an endothermic reaction is observed at an intensity that is higher than or equal to 0.3 times the peak intensity I(1) at preferably higher than or equal to [the temperature T(1)−50° C.] and lower than or equal to [the temperature T(1)+50° C.], further preferably higher than or equal to [the temperature T(1)−30° C.] and lower than or equal to [the temperature T(1)+30° C.], the inhibition against the eutectic reaction is judged to be insignificant. At this time, the half width of the observed peak is preferably below 100° C., preferably lower than or equal to 50° C., further preferably lower than or equal to 30° C.

Here, the peak intensity I(1) is preferably calculated by normalization with the ratio of the material 91 and the material 92 in the total weight of the mixture.

Here, the DSC scanning rate is 20° C./min. for example, preferably higher than or equal to 2° C./min. and lower than or equal to 30° C./min. for example.

Furthermore, the peak intensity may be a difference in height between a local maximum point and a local minimum point observed in an obtained DSC differential waveform around a temperature at which a peak is observed in a temperature-heat flow curve before the differentiation. The absolute value of the difference between the peak position where the local maximum point of the differential waveform is observed and the peak position of the temperature-heat flow curve is preferably less than 0.5 times the half width of the peak of the temperature-heat flow curve. The absolute value of the difference between the peak position where the local minimum point of the differential waveform is observed and the peak position of the temperature-heat flow curve is also preferably less than 0.5 times the half width of the peak of the temperature-heat flow curve.

Figure 1C:
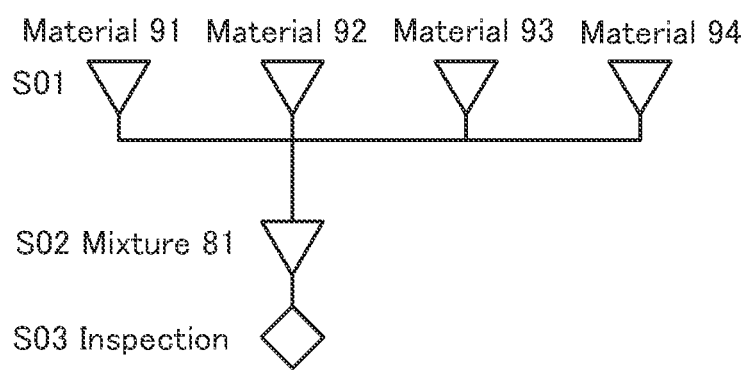

FIG. 1C illustrates an example of inspecting a reaction among the material 91, the material 92, the material 93, and a material 94 using DSC. Here, the material 94 is a compound including a metal M(2). For the metal M(2), the description of the metal M can be referred to. Furthermore, the metal M(2) preferably includes a metal that is different from the metal M(1).

The mixture 81 of the material 91, the material 92, the material 93, and the material 94 is inspected using DSC. It is possible to inspect how much the reaction at the temperature T(1) observed in the inspection in FIG. 1A is inhibited by addition of the material 93 and the material 94. In the case where the inhibition against the reaction at the temperature T(1) is suggested, the material 94 is used instead of the material 93 in FIG. 1B to perform inspection. Thus, it can be found which of the material 93 and the material 94 contributes more to the inhibition against the reaction at the temperature T(1).

In Step S01 in FIG. 1A, FIG. 1B, and FIG. 1C, a metal oxide 95 may be added to perform inspection. Here, the metal oxide 95 is the metal oxide including the alkali metal A and the transition metal.

In the case where DSC is performed with the addition of the metal oxide 95, the temperature T(1) at which the peak is observed might become higher than that of the case where the metal oxide 95 is not added by approximately 100° C., for example.

As the alkali metal A, lithium, sodium, potassium, or the like may be used, for example, and lithium is particularly preferably used. As the metal oxide including the alkali metal A and the transition metal, a metal oxide having a layered rock-salt structure may be used, for example. Alternatively, a metal oxide having a structure represented by a space group R-3m may be used.

As the metal oxide including the alkali metal A and the transition metal, lithium cobalt oxide, lithium manganite, lithium nickel oxide, lithium cobalt oxide where manganese substitutes for part of cobalt, lithium cobalt oxide where nickel substitutes for part of cobalt, or nickel-manganese-lithium cobalt oxide can be used.

In the case where the metal oxide including the alkali metal A and the transition metal includes nickel, the proportion of nickel atoms (Ni) in the sum of cobalt atoms and nickel atoms (Co+Ni) (Ni/(Co+Ni)) is preferably less than 0.1, further preferably less than or equal to 0.075, for example. When a state being charged with high voltage is held for a long time, the transition metal dissolves in an electrolyte solution from the positive electrode active material, and the crystal structure might be broken. However, when nickel is included at the above-described proportion, dissolution of the transition metal from a positive electrode active material 100 can be inhibited in some cases.

Examples of the halogen compound including the alkali metal A include lithium fluoride, sodium fluoride, potassium fluoride, lithium chloride, sodium chloride, and calcium chloride. In particular, lithium fluoride is preferable because it is easily melted in an annealing process described later.

As the compound including the element X, a compound including magnesium can be used. Examples of the compound including magnesium include magnesium fluoride, magnesium oxide, magnesium hydroxide, magnesium carbonate, and magnesium chloride.

In forming the positive electrode active material of one embodiment of the present invention, lithium fluoride is preferably used as the halogen compound including the alkali metal A, and magnesium fluoride is preferably used as the compound including magnesium. By mixing lithium fluoride, melting can be caused at a temperature lower than the melting point of magnesium fluoride, and a positive electrode active material is formed utilizing this eutectic phenomenon.

As the compound including the metal M, a hydroxide, an oxide, or the like of a metal can be used, for example. In the case where a metal included in the metal M is nickel, nickel hydroxide, nickel oxide, or the like can be used, for example. In the case where a metal included in the metal M is aluminum, aluminum hydroxide, aluminum oxide, or the like can be used, for example. In the case where a metal included in the metal M is manganese, manganese hydroxide, manganese oxide, or the like can be used, for example.

Furthermore, as the compound including the metal M, a metal alkoxide may be used. For example, aluminum isopropoxide, tetramethoxy titanium, or the like can be used.

The positive electrode active material of one embodiment of the present invention preferably includes the above-described metal oxide including the alkali metal A and the transition metal. In the case where the positive electrode active material of one embodiment of the present invention includes particles, the particles preferably include the above-described metal oxide including the alkali metal A and the transition metal, for example.

The positive electrode active material of one embodiment of the present invention preferably includes magnesium and the metal M. Furthermore, the positive electrode active material of one embodiment of the present invention includes positive electrode active material particles of one embodiment of the present invention; in the case where the particles include the above-described metal oxide including the alkali metal A and the transition metal, the metal oxide includes at least one of magnesium and the metal M in a region, specifically in surfaces and the vicinity of the particles, for example.

<XRD>

XRD may be performed as the inspection illustrated in FIG. 1B or FIG. 1C. For example, in the case where XRD suggests the existence of a compound which includes the element X included in the material 92 and one or more of the metal elements included in the material 93 and/or the material 94, it is judged that the eutectic reaction between the material 91 and the material 92 is significantly inhibited. Note that in the inspection, heating is performed first in a temperature range higher than or equal to 600° C. and lower than or equal to 950° C. for more than or equal to 1 hour and less than or equal to 100 hours, and then XRD evaluation is performed.

In the case where the metal oxide including the alkali metal A and the transition metal has a layered rock-salt structure, it is judged that the eutectic reaction is significantly inhibited when a peak derived from a spinel structure is observed in XRD, for example. More specifically, for example, in the case where aluminum is used as the metal M, it is judged that the eutectic reaction is significantly inhibited when at least any of four peaks at $2\theta=19.0°\pm0.25°$, $2\theta=31.3°\pm0.25°$, $2\theta=36.9°\pm0.15°$, and $2\theta=59.4°\pm0.25°$ is observed in XRD. It is suggested that these peaks are derived from $MgAl_2O_4$. These peaks are preferably not observed or preferably have sufficiently low peak intensities, for example. For example, it is not preferable that all the four peaks suggesting MgAl2O4 at $2\theta=19.0°\pm0.25°$, $2\theta=31.3°\pm0.25°$, $2\theta=36.9°\pm0.15°$, and $2\theta=59.4°\pm0.25°$ be observed having intensities that are more than or equal to 0.02 times the intensity of the peak having the highest intensity among the peaks observed in a 2θ range higher than or equal to 15° and lower than or equal to 90° in XRD.

Here, even in the case where the material 91, the material 92, and at least one of the material 93 and the material 94 are mixed, heated, and subjected to XRD analysis to observe a peak from which it is judged that the eutectic reaction is significantly inhibited, if the metal oxide 95 is further mixed with the material 91, the material 92, and at least one of the material 93 and the material 94 and heating is performed, the peak from which it is judged that the eutectic reaction is significantly inhibited might not be observed because the intensity of a peak derived from the metal oxide 95 is high.

<Formation Method>

Figure 2A:
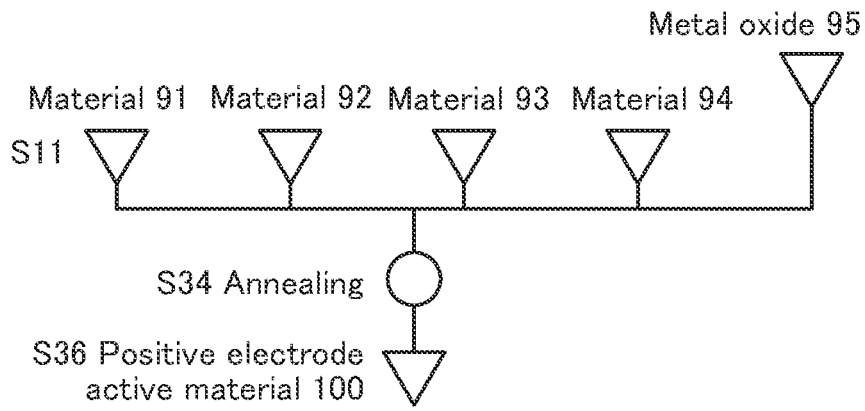
FIG. 2A, FIG. 2B, and FIG. 2C are diagrams illustrating methods for forming a positive electrode active material.
Figure 2B:
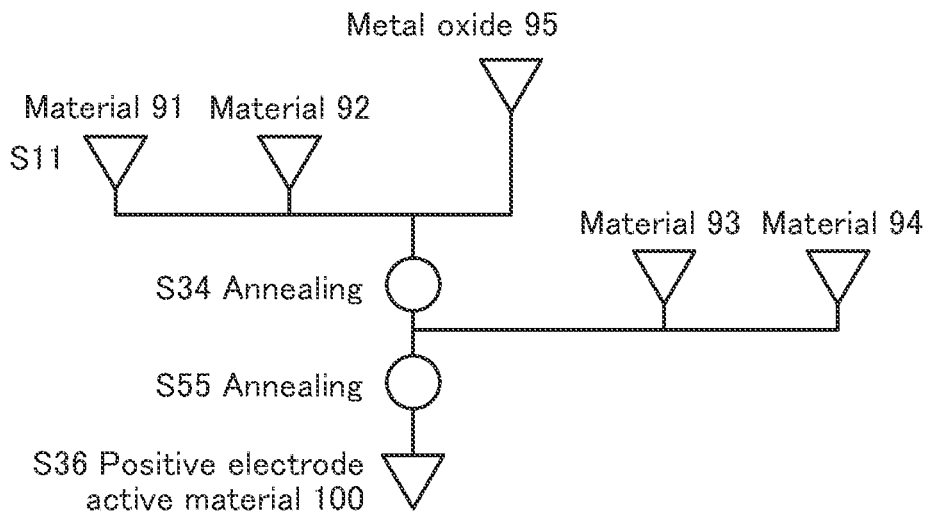
Figure 2C:
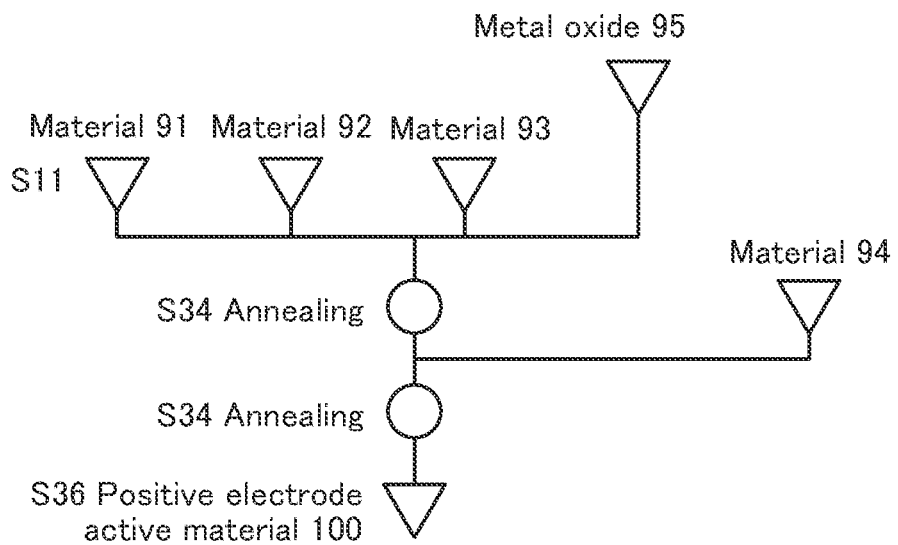

FIG. 2A, FIG. 2B, and FIG. 2C illustrate examples of a method for forming a positive electrode active material of one embodiment of the present invention using the material 91, the material 92, the material 93, and the material 94, which are described with reference to FIG. 1, and the metal oxide 95.

Note that some steps in a formation procedure described in this specification and the like are sometimes not illustrated for simplicity.

In a procedure illustrated in FIG. 2A, the material 91, the material 92, the material 93, the material 94, and the metal oxide 95 are prepared and mixed in Step S11, annealing is performed in Step S34, and the positive electrode active material 100 is obtained in Step S36.

In the case where it is judged in the inspection in FIG. 1B or FIG. 1C that at least one of the material 93 and the material 94 significantly inhibits the reaction suggesting the eutectic reaction between the material 91 and the material 92, it is preferable to use the procedure illustrated in FIG. 2B to obtain the positive electrode active material 100. In particular, in the case where the total amount of the annealed material is large, using the procedure illustrated in FIG. 2B is sometimes preferable for more uniform processing. More uniform processing can improve the quality of the positive electrode active material 100 to be obtained. Specifically, for example, in the case where the material is in the form of powder and the total amount of the powder is more than or equal to 15 g, the procedure illustrated in FIG. 2B is preferably used. In the case where the total amount of the powder is more than or equal to 15 g for example, a surface of the powder is not fully exposed to an annealing atmosphere by one-time annealing, in some cases. In that case, the eutectic reaction is more likely to be inhibited in some cases. Using the procedure in FIG. 2B is preferable because it can more surely cause the eutectic reaction. Alternatively, the atmosphere and pressure of the annealing and the total amount of the annealed material with respect to the volume of a treatment chamber of an annealing apparatus may be adjusted. In contrast, in the case where the total amount of the powder is less than 15 g, the surface of the powder is likely to be exposed to the annealing atmosphere and the inhibition against the eutectic reaction is suppressed in some cases. Here, annealing is performed with a heating furnace, for example. The volume of the heating furnace is for example more than or equal to 10 L, more than or equal to 20 L, or more than or equal to 30 L.

The procedure illustrated in FIG. 2B is a procedure where the material 93 and the material 94 are added after annealing in Step S34 is performed. The material 91, the material 92, and the metal oxide 95 are prepared and mixed in Step S11, and annealing is performed in Step S34. The material 93 and the material 94 are added to and mixed with a mixture obtained in Step S34, annealing is performed in Step S55, and the positive electrode active material 100 is obtained in Step S36.

With the procedure illustrated in FIG. 2B, the inhibition against the eutectic reaction between the material 91 and the material 92 by the material 93 and the material 94 is suppressed.

In the case where it is judged that the material 94 significantly inhibits the reaction suggesting the eutectic reaction between the material 91 and the material 92 and that the material 93 does not significantly inhibit the reaction, a procedure illustrated in FIG. 2C can be used, for example.

In the procedure illustrated in FIG. 2C, the material 91, the material 92, the material 93, and the metal oxide 95 are prepared and mixed in Step S11, and annealing is performed in Step S34. The material 94 is added to and mixed with a mixture obtained in Step S34, annealing is performed in Step S55, and the positive electrode active material 100 is obtained in Step S36.

<Formation Method 2>

Figure 3:
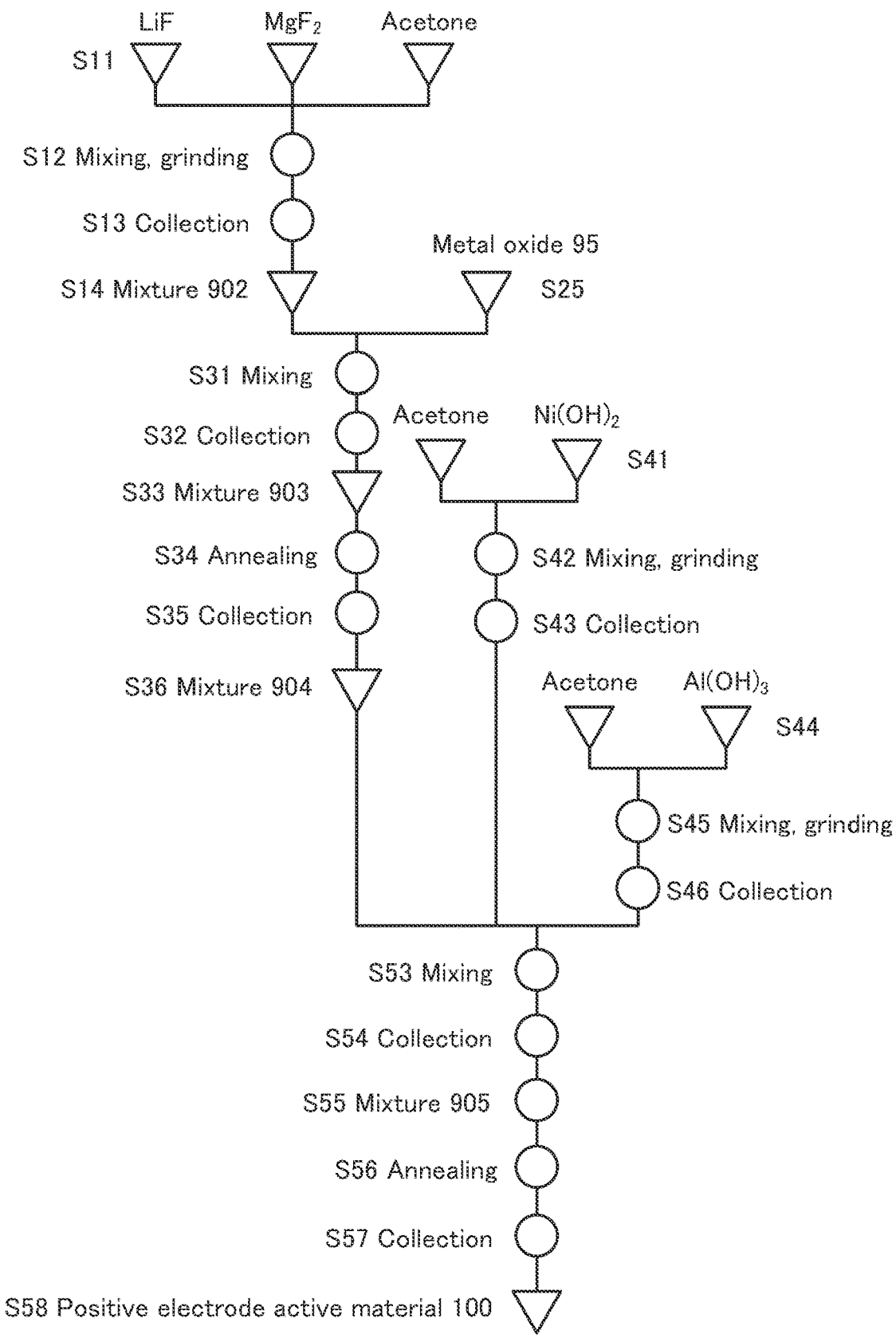
FIG. 3 is a diagram illustrating a method for forming a positive electrode active material.

FIG. 3 illustrates an example of the formation method illustrated in FIG. 2B. The formation method illustrated in FIG. 3 is an example of the case where a metal oxide including an alkali metal and cobalt is used as the metal oxide including the alkali metal A and the transition metal. In addition, illustrated is an example of the case where a compound including magnesium is used as the compound including the element X.

<Step S11>

As illustrated in Step S11 in FIG. 3, materials of a mixture 902 are prepared first. In FIG. 3, lithium fluoride LiF is prepared as the halogen compound including the alkali metal A, and magnesium fluoride $MgF_2$ is prepared as the compound including magnesium. When lithium fluoride LiF and magnesium fluoride $MgF_2$ are mixed at approximately LiF: $MgF_2$=65: 35 (molar ratio), the effect of decreasing the melting point of the mixture becomes the highest (Non-Patent Document 4). On the other hand, when the amount of lithium fluoride increases, cycle performance might deteriorate because of a too large amount of lithium. Therefore, the molar ratio of lithium fluoride LiF to magnesium fluoride $MgF_2$ is preferably LiF:$MgF_2$=x:1 ($0 \leq x \leq 1.9$), further preferably LiF:$MgF_2$=x: 1 ($0.1 \leq x \leq 0.5$), still further preferably LiF:$MgF_2$=x:1 (x=the vicinity of 0.33). Note that in this specification and the like, the vicinity means a value greater than 0.9 times and smaller than 1.1 times a certain value.

In addition, in the case where the following mixing and grinding step is performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In Step S11 in FIG. 3, acetone is used.

<Step S12>

Next, in Step S12, the materials of the mixture 902 are mixed and ground. Although the mixing can be performed by a dry process or a wet process, the wet process is preferable because the materials can be ground to smaller size. For example, a ball mill, a bead mill, or the like can be used for the mixing. When the ball mill is used, a zirconia ball is preferably used as media, for example. The mixing and grinding step is preferably performed sufficiently to pulverize the mixture 902.

<Step S13, Step S14>

Next, in Step S13, the materials mixed and ground in the above manner are collected, whereby the mixture 902 is obtained in Step S14.

For example, the D50 of the mixture 902 is preferably greater than or equal to 600 nm and less than or equal to 20 μm, further preferably greater than or equal to 1 μm and less than or equal to 10 μm. When mixed with a composite oxide including lithium, a transition metal, and oxygen in a later step, the mixture 902 pulverized to such a small size is easily attached to surfaces of composite oxide particles uniformly. The mixture 902 is preferably attached to the surfaces of the composite oxide particles uniformly in order that both halogen and magnesium are easily distributed to the superficial portion of the composite oxide particles after heating. When there is a region including neither halogen nor magnesium in the superficial portion, the positive electrode active material might be less likely to have a pseudo-spinel crystal structure, which is to be described later, in the charged state.

<Step S25>

Next, in Step S25, the metal oxide 95 is prepared as the metal oxide including the alkali metal A and cobalt. The metal oxide 95 can be obtained by baking a mixture of a material including the alkali metal A and a material including cobalt. Alternatively, a metal oxide synthesized in advance may be used.

<Step S31>

Next, in Step S31, the mixture 902 and the metal oxide 95 are mixed. The ratio of the number of cobalt atoms TM in the metal oxide 95 to the number of magnesium atoms MgMix1 included in the mixture 902 is preferably TM:Mg-Mix1=1:y ($0.005 \leq y \leq 0.05$), further preferably TM:Mg-Mix1=1:y ($0.007 \leq y \leq 0.04$), still further preferably approximately TM:MgMix1=1:0.02.

The condition of the mixing in Step S31 is preferably milder than that of the mixing in Step S12 in order not to damage the particles of the metal oxide 95. For example, a condition with a lower rotation frequency or shorter time than the mixing in Step S12 is preferable. In addition, it can be said that the dry process has a milder condition than the wet process. For example, a ball mill, a bead mill, or the like can be used for the mixing. When the ball mill is used, a zirconia ball is preferably used as media, for example.

<Step S32, Step S33>

Next, in Step S32, the materials mixed in the above manner are collected, whereby a mixture 903 is obtained in Step S33.

<Step S34>

Next, in Step S34, the mixture 903 is annealed.

The annealing is preferably performed at an appropriate temperature for an appropriate time. The appropriate temperature and time vary depending on conditions such as the particle size and the composition of the metal oxide 95. In the case where the particle size is small, the annealing is preferably performed at a lower temperature or for a shorter time than the case where the particle size is large, in some cases.

When the average particle diameter (D50) of the particles in Step S25 is approximately 12 μm, for example, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

When the average particle diameter (D50) of the particles in Step S25 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

It is considered that when the mixture 903 is annealed, a material having a lower melting point (e.g., lithium fluoride with a melting point of 848° C.) in the mixture 902 is melted first and distributed to a superficial portion of the particles of the metal oxide 95. Next, the existence of the melted material presumably causes a decrease of the melting points of other materials, resulting in melting of the other materials. For example, magnesium fluoride (melting point: 1263° C.) is presumably melted and distributed to the superficial portion of the particles of the metal oxide 95.

Elements included in the mixture 902 distributed to the superficial portion probably form a solid solution in the particles of the metal oxide 95.

The elements included in the mixture 902 are diffused faster in the superficial portion and the vicinity of the grain boundary than in the inner portion of the particles of the metal oxide 95. Therefore, the concentrations of magnesium and halogen in the superficial portion and the vicinity of the grain boundary are higher than those of magnesium and halogen in the inner portion. As described later, the higher the magnesium concentration in the superficial portion and the vicinity of the grain boundary is, the more effectively the change in the crystal structure can be inhibited.

<Step S35, Step S36>

Next, in Step S35, the materials annealed in the above manner are collected, whereby a mixture 904 is obtained in Step S36.

<Step S41>

Next, in Step S41, a metal M source is prepared. When the metal M is aluminum, for example, the molar concentration of aluminum included in the metal source ranges from 0.001 to 0.02 times that of cobalt with the number of cobalt atoms included in lithium cobalt oxide regarded as 1. When the metal M is nickel, for example, the molar concentration of nickel included in the metal source ranges from 0.001 to 0.02 times that of cobalt with the number of cobalt atoms included in lithium cobalt oxide regarded as 1. When the metal M is aluminum and nickel, for example, the molar concentration of aluminum included in the metal source ranges from 0.001 to 0.02 times that of cobalt and the molar concentration of nickel included in the metal source ranges from 0.001 to 0.02 times that of cobalt with the number of cobalt atoms included in lithium cobalt oxide regarded as 1.

In the case where mixing is performed by a wet process in subsequent Step S42, a solvent is prepared also in Step S41.

In Step S41 in FIG. 3, an example of using nickel hydroxide as the metal source and acetone as the solvent is shown.

<Step S42>

Next, in Step S42, the metal source and the solvent are mixed and ground. For the mixing and grinding, the conditions in Step S12 or the like can be referred to.

<Step S43>

Next, in Step S43, the metal M source ground in Step S42 is collected.

<Step S44>

Next, in Step S44, a metal M source including a metal that is different from the metal included in the metal M source prepared in Step S41 is prepared. In the case where mixing is performed by a wet process in subsequent Step S45, a solvent is prepared also in Step S44. In Step S44 in FIG. 3, as an example, aluminum hydroxide is prepared as the metal source, and acetone is prepared as the solvent.

<Step S45>

Next, in Step S45, the metal source and the solvent are mixed and ground. For the mixing and grinding, the conditions in Step S12 or the like can be referred to.

<Step S46>

Next, in Step S46, the metal M source ground in Step 45 is collected.

<Step S53>

Next, in Step S53, the mixture 904, the metal M source collected in Step S43, and the metal M source collected in Step S46 are mixed.

<Step S54, Step S55>

Next, in Step S54, the mixture is collected, whereby a mixture 905 is obtained in Step S55.

<Step S56>

Next, in Step S56, the mixture 905 is annealed. For the annealing time, the retention time at a temperature within a specified range is preferably longer than or equal to 1 hour and shorter than or equal to 50 hours, further preferably longer than or equal to 2 hours and shorter than or equal to 20 hours. When the baking time is too short, the crystallinity of a compound including the metal M formed in the superficial portion is low in some cases. Alternatively, the metal M is not sufficiently diffused in some cases. Alternatively, an organic substance may remain on the surface in some cases. However, when the baking time is too long, the metal M is diffused too much so that the concentration at the superficial portion and the vicinity of the crystal grain boundary might be low. Furthermore, the productivity is lowered.

The specified temperature is preferably higher than or equal to 500° C. and lower than or equal to 1200° C., further preferably higher than or equal to 700° C. and lower than or equal to 920° C., and still further preferably higher than or equal to 800° C. and lower than or equal to 900° C. When the specified temperature is too low, the crystallinity of the compound including the metal M formed in the superficial portion is low in some cases. Alternatively, the metal M is not sufficiently diffused in some cases. Alternatively, an organic substance may remain on the surface in some cases.

The baking is preferably performed in an oxygen-containing atmosphere. In the case where the oxygen partial pressure is low, cobalt might be reduced unless the baking temperature is lowered.

In this embodiment, the specified temperature is 850° C. and kept for 2 hours, the temperature rising rate is 200° C./h, and the flow rate of oxygen is 10 L/min.

The cooling time after the baking is preferably long, in which case a crystal structure is easily stabilized. For example, the temperature decreasing time from the specified temperature to room temperature is preferably longer than or equal to 10 hours and shorter than or equal to 50 hours. Here, the baking temperature in Step S56 is preferably lower than the baking temperature in Step S34. For example, the baking temperature in Step S56 is preferably lower than the baking temperature in Step S34 by 20° C. or more, 30° C. or more, or 45° C. or more.

<Step S57, Step S58>

Next, in Step S57, the cooled particles are collected. Moreover, the particles are preferably made to pass through a sieve. Through the above-described process, the positive electrode active material 100 is obtained in Step S58.

<Formation Method 3>

Figure 4:
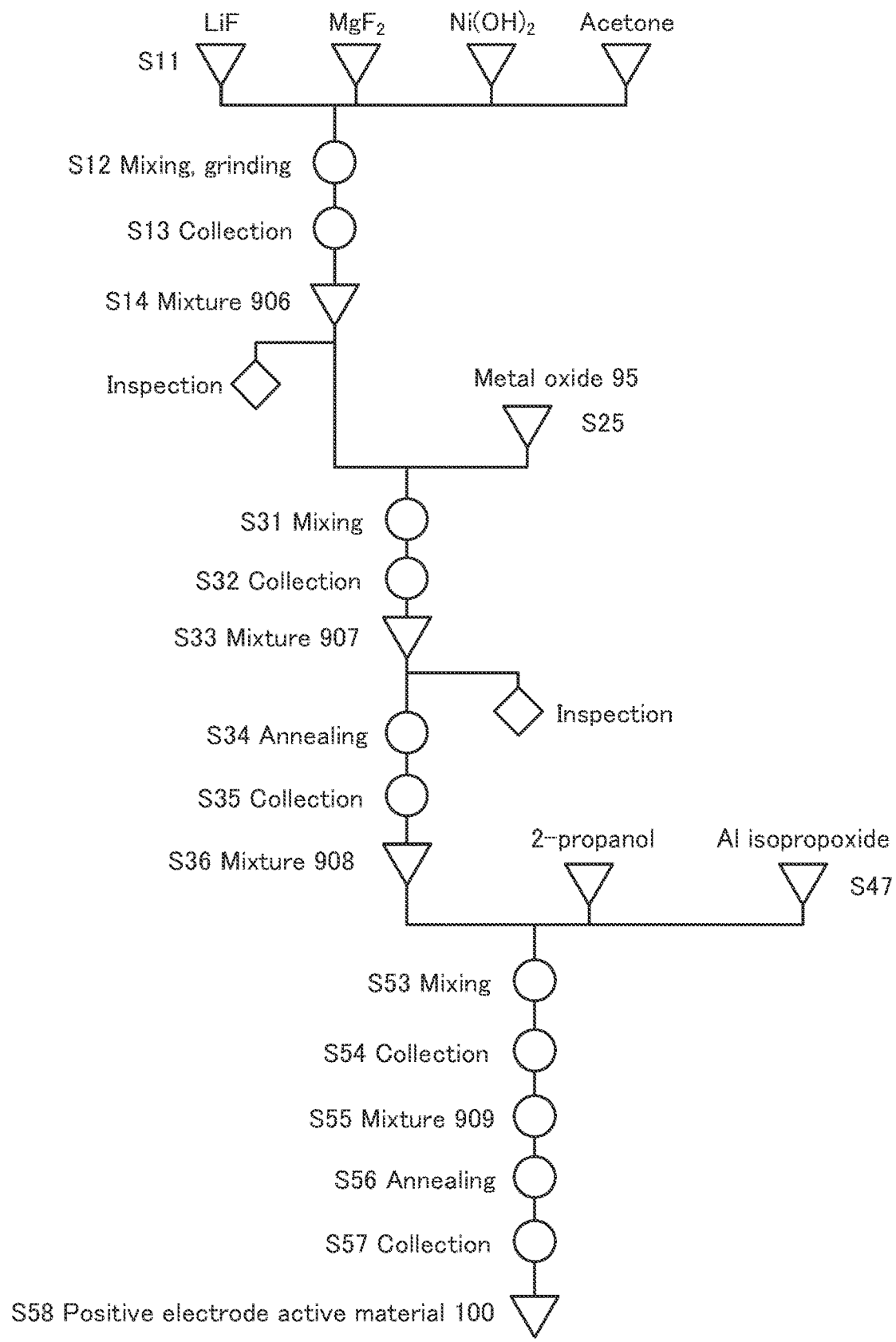
FIG. 4 is a diagram illustrating a method for forming a positive electrode active material.

Next, FIG. 4 illustrates an example of the formation method illustrated in FIG. 2C. The formation method illustrated in FIG. 4 is an example of the case where a metal oxide including an alkali metal and cobalt is used as the metal oxide including the alkali metal A and the transition metal. In addition, illustrated is an example of the case where a compound including magnesium is used as the compound including the element X.

<Step S11>

Step S11 illustrated in FIG. 4 is different from that in FIG. 3 in preparing a metal M(1) source in addition to the halogen compound including the alkali metal A, the compound including magnesium, and the solvent.

<Step S12 to Step S14>

Next, through Step S12, Step S13, and Step S14, a mixture 906, which is a mixture of the halogen compound including the alkali metal A, the compound including magnesium, and the metal M(1) source, is obtained. For the conditions and the like of Step S12 to Step S14, the description of FIG. 3 can be referred to.

After Step S14, the mixture 906 may be inspected.

<Step S25>

Next, in Step S25, the metal oxide 95 is prepared as the metal oxide including the alkali metal A and cobalt. The metal oxide 95 can be obtained by baking a mixture of a material including the alkali metal A and a material including cobalt. Alternatively, a metal oxide synthesized in advance may be used.

<Step S31 to Step S33>

Next, through Step S31, Step S32, and Step S33, a mixture 907, which is a mixture of the mixture 906 and the metal oxide 95, is obtained. For the conditions and the like of Step S31 to Step S33, the description of FIG. 3 can be referred to.

After Step S33, the mixture 907 may be inspected.

<Step S34>

Next, in Step S34, the mixture 907 is annealed. For the conditions and the like of the annealing, the description of FIG. 3 can be referred to.

<Step S35>

Next, in Step S35, the annealed powder is collected, whereby a mixture 908 is obtained in Step S36.

<Step S47>

Next, in Step S47, the metal M(2) source and a solvent are prepared. Here, an example of employing a sol-gel method using aluminum isopropoxide as the metal M(2) source and isopropanol as the solvent is shown.

<Step S53>

Next, in Step S53, aluminum isopropoxide is dissolved in isopropanol, and the mixture 908 is further mixed therein. The required amount of the metal alkoxide varies depending on the particle size of the metal oxide 95. If the particle diameter (D50) is approximately 20 μm, aluminum isopropoxide is preferably added so that the concentration of aluminum included in aluminum isopropoxide ranges from 0.001 to 0.02 times that of cobalt with the number of cobalt atoms included in the metal oxide 95 regarded as 1. The mixture 908 is preferably stirred in an atmosphere containing water vapor. The stirring can be performed with a magnetic stirrer, for example. The stirring is performed for a time long enough for water and metal alkoxide in the atmosphere to cause hydrolysis and polycondensation reaction. For example, the stirring can be performed at 25° C. and a humidity of 90% RH (Relative Humidity) for 4 hours. Alternatively, the stirring may be performed under an atmosphere where the humidity and temperature are not adjusted, for example, an air atmosphere in a fume hood. In such a case, the stirring time is preferably set longer and can be 12 hours or longer at room temperature, for example.

Reaction between moisture and metal alkoxide in the atmosphere enables a sol-gel reaction to proceed more slowly as compared with the case where liquid water is added. Alternatively, reaction between metal alkoxide and water at room temperature enables a sol-gel reaction to proceed more slowly as compared with the case where heating is performed at a temperature higher than the boiling point of alcohol serving as a solvent, for example. A sol-gel reaction that proceeds slowly enables formation of a high-quality coating layer with a uniform thickness.

<Step S54, Step S55>

Next, in Step S54, a precipitate is collected from the mixed solution, whereby a mixture 909 is obtained in Step S55. As the collection method, filtration, centrifugation, evaporation to dryness, or the like can be used. The precipitate can be washed with alcohol that is the same as the solvent in which the metal alkoxide is dissolved. Then, the collected residue is dried to obtain the mixture 909. In the drying step, vacuum or ventilation drying can be performed at 80° C. for 1 hour to 4 hours, for example.

<Step S56>

Next, in Step S56, the mixture 909 is baked. For the baking time, the retention time at a temperature within a specified range is preferably longer than or equal to 1 hour and shorter than or equal to 50 hours, further preferably longer than or equal to 2 hours and shorter than or equal to 20 hours. When the baking time is too short, the crystallinity of a compound including the metal M(2) formed in the superficial portion is low in some cases. Alternatively, the metal M(2) is not sufficiently diffused in some cases. Alternatively, an organic substance may remain on the surface in some cases. However, when the baking time is too long, the metal M(2) is diffused too much so that the concentration at the superficial portion and the vicinity of the crystal grain boundary might be low. Furthermore, the productivity is lowered.

The specified temperature is preferably higher than or equal to 500° C. and lower than or equal to 1200° C., further preferably higher than or equal to 700° C. and lower than or equal to 920° C., and still further preferably higher than or equal to 800° C. and lower than or equal to 900° C. When the specified temperature is too low, the crystallinity of the compound including the metal M(2) formed in the superficial portion is low in some cases. Alternatively, the metal M(2) is not sufficiently diffused in some cases. Alternatively, an organic substance may remain on the surface in some cases.

The baking is preferably performed in an oxygen-containing atmosphere. In the case where the oxygen partial pressure is low, Co might be reduced unless the baking temperature is lowered.

In this embodiment, the specified temperature is 850° C. and kept for 2 hours, the temperature rising rate is 200° C./h, and the flow rate of oxygen is 10 L/min.

The cooling time after the baking is preferably long, in which case a crystal structure is easily stabilized. For example, the temperature decreasing time from the specified temperature to room temperature is preferably longer than or equal to 10 hours and shorter than or equal to 50 hours. Here, the baking temperature in Step S56 is preferably lower than the baking temperature in Step S34.

<Step S57, Step S58>

Next, in Step S57, the cooled particles are collected. Moreover, the particles are preferably made to pass through a sieve. Through the above-described process, the positive electrode active material 100 is obtained in Step S58.

Although the method for forming a positive electrode active material which includes the metal M, the material 93, the material 94, and nickel or aluminum is described with reference to FIG. 2 to FIG. 4, one embodiment of the present invention is not limited thereto. As described in the beginning of this embodiment, a positive electrode active material of one embodiment of the present invention is obtained by mixing a halogen compound including an alkali metal A, a compound including magnesium, and a metal oxide including the alkali metal A and a transition metal and performing annealing (also expressed as heating, heat treatment, and the like in some cases). The metal M is not necessarily included. In the case where the metal M is not included, the number of annealing processes is the most preferably one, in some cases. In the case where the number of annealing processes is one, the productivity can be increased as compared with the case where the number of annealing processes is more than one.

This embodiment can be used in appropriate combination with the other embodiments.

Embodiment 2

In this embodiment, a positive electrode active material of one embodiment of the present invention is described.
<Positive Electrode Active Material>

With the use of the positive electrode active material of one embodiment of the present invention, the capacity of a secondary battery is increased and a reduction in discharge capacity due to charge and discharge cycles can be inhibited.
[Structure of Positive Electrode Active Material]

The positive electrode active material preferably includes a metal (hereinafter, an element A) serving as a carrier ion. As the element A, an alkali metal such as lithium, sodium, or potassium or a Group 2 element such as calcium, beryllium, or magnesium can be used, for example.

In the positive electrode active material, carrier ions are released from the positive electrode active material in charging. A larger amount of the released element A means a larger amount of ions contributing to the capacity of a secondary battery, increasing the capacity. However, a large amount of the released element A easily causes a collapse of the crystal structure of a compound included in the positive electrode active material. The collapse of the crystal structure of the positive electrode active material sometimes decreases the discharge capacity due to charge and discharge cycles. When the positive electrode active material of one embodiment of the present invention includes the element X, the collapse of the crystal structure when carrier ions are released in charging the secondary battery can be inhibited in some cases. For example, the element X is partly substituted at the element A positions. An element such as magnesium, calcium, zirconium, lanthanum, or barium can be used as the element X. For another example, an element such as copper, potassium, sodium, or zinc can be used as the element X. Two or more of the elements described above may be combined and used as the element X.

Furthermore, the positive electrode active material of one embodiment of the present invention preferably includes halogen in addition to the element X. The positive electrode active material preferably includes halogen such as fluorine or chlorine. When the positive electrode active material of one embodiment of the present invention includes the halogen, substitution of the element X at the element A position is promoted in some cases.

The positive electrode active material of one embodiment of the present invention includes a metal (hereinafter, an element Me) whose valence number changes due to charge and discharge of a secondary battery. The element Me is a transition metal, for example. The positive electrode active material of one embodiment of the present invention includes one or more of cobalt, nickel, and manganese, particularly cobalt, as the element Me, for example. The positive electrode active material may include, at an element Me position, an element that has no valence change and can have the same valence as the element Me, such as aluminum, specifically, a trivalent representative element, for example. The element X may be substituted at the element Me position, for example. In the case where the positive electrode active material of one embodiment of the present invention is an oxide, the element X may be substituted at an oxygen position.

A lithium composite oxide having a layered rock-salt crystal structure is preferably used as the positive electrode active material of one embodiment of the present invention, for example. More specifically, lithium cobalt oxide, lithium nickel oxide, a lithium composite oxide containing nickel, manganese, and cobalt, a lithium composite oxide containing nickel, cobalt, and aluminum, or the like can be used as the lithium composite oxide having a layered rock-salt crystal structure, for example. Moreover, each of these positive electrode active materials is preferably represented by a space group R-3m.

In a positive electrode active material having a layered rock-salt crystal structure, the crystal structure is disordered with increasing depth of charge in some cases. Here, the disorder of the crystal structure means deviation in layers, for example. In the case where the disorder of the crystal structure is irreversible, the capacity of the secondary battery might be reduced with repeated charge and discharge.

When the positive electrode active material of one embodiment of the present invention includes the element X, for example, the deviation in layers is suppressed even when the depth of charge is increased. By suppressing the deviation, a volume change in charging and discharging can be reduced. Accordingly, the positive electrode active material of one embodiment of the present invention can have excellent cycle performance. In addition, the positive electrode active material of one embodiment of the present invention can have a stable crystal structure in a high-voltage charged state. Thus, in the positive electrode active material of one embodiment of the present invention, a short circuit is sometimes unlikely to occur while the high-voltage charged state is maintained. This is preferable because the safety is further improved.

The positive electrode active material of one embodiment of the present invention has a small crystal-structure change and a small volume difference per the same number of transition metal atoms between a sufficiently discharged state and a high-voltage charged state.

The positive electrode active material of one embodiment of the present invention is expressed by a chemical formula $AM_yO_z$ (y>0, z>0) in some cases. For example, lithium cobalt oxide is expressed as $LiCoO_2$ in some cases. For another example, lithium nickel oxide is expressed as $LiNiO_2$ in some cases.

In the case where the depth of charge is greater than or equal to 0.8, in some cases, the positive electrode active material of one embodiment of the present invention, which includes the element X, is represented by a space group R-3m and has not the spinel crystal structure but a structure in which an ion of the element Me (e.g., cobalt), the element M (e.g., magnesium), or the like is coordinated to six oxygen atoms and the cation arrangement has symmetry similar to that of the spinel crystal structure. This structure is referred to as the pseudo-spinel crystal structure in this specification and the like. Note that in the pseudo-spinel crystal structure, a light element such as lithium is coordinated to four oxygen atoms in some cases; also in that case, the ion arrangement has symmetry similar to that of the spinel crystal structure.

The structure of the positive electrode active material becomes unstable due to release of carrier ions by charging. It can be said that the pseudo-spinel crystal structure is capable of maintaining high stability even after release of carrier ions.

In the case where the depth of charge is high in the present invention and when the positive electrode active material having the pseudo-spinel structure is used for the secondary battery, the structure of the positive electrode active material is stable for example at a voltage of approximately 4.6 V, preferably at a voltage of approximately 4.62 V to 4.7 V, with reference to the potential of lithium metal, and a reduction in capacity due to charging and discharging can be suppressed. Note that in the case of using graphite as the negative electrode active material in the secondary battery, for example, the structure of the positive electrode active material is stable for example at a voltage of the secondary battery of higher than or equal to 4.3 V and lower than or equal to 4.5 V, preferably at a voltage of higher than or equal to 4.35 V and lower than or equal to 4.55 V, and a reduction in capacity due to charging and discharging can be suppressed.

The pseudo-spinel crystal structure can also be regarded as a crystal structure that includes Li between layers at random but is similar to a $CdCl_2$ type crystal structure. The crystal structure similar to the $CdCl_2$ type crystal structure is close to a crystal structure of lithium nickel oxide when charged up to a depth of charge of 0.94 ($Li_{0.06}NiO_2$); however, pure lithium cobalt oxide or a layered rock-salt positive electrode active material containing a large amount of cobalt is known not to have this crystal structure generally.

Anions of a layered rock-salt crystal and anions of a rock-salt crystal have cubic closest packed structures (face-centered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

Note that in the unit cell of the pseudo-spinel crystal structure, coordinates of cobalt and oxygen can be represented by Co (0, 0, 0.5) and O (0, 0, x) within the range of $0.20 \leq x \leq 0.25$.

In the positive electrode active material of one embodiment of the present invention, a difference between the volume per unit cell with a depth of charge of 0 and the volume per unit cell of the pseudo-spinel crystal structure with a depth of charge of 0.82 is preferably less than or equal to 2.5%, further preferably less than or equal to 2.2%.

The pseudo-spinel crystal structure has diffraction peaks at $2\theta$ of $19.30 \pm 0.20°$ (greater than or equal to $19.10°$ and less than or equal to $19.50°$) and $2\theta$ of $45.55 \pm 0.10°$ (greater than or equal to $45.45°$ and less than or equal to $45.65°$). More specifically, sharp diffraction peaks appear at $2\theta$ of $19.30 \pm 0.10°$ (greater than or equal to $19.20°$ and less than or equal to $19.40°$) and $2\theta$ of $45.55 \pm 0.05°$ (greater than or equal to $45.50°$ and less than or equal to $45.60°$).

Note that although the positive electrode active material of one embodiment of the present invention has the pseudo-spinel crystal structure when being charged with high voltage, not all the particles necessarily have the pseudo-spinel crystal structure. The particles may have another crystal structure, or may partly be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt % of the positive electrode active material. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

The number of atoms of the element X is preferably larger than 0.001 times and less than or equal to 0.1 times, further preferably larger than 0.01 times and less than 0.04 times, still further preferably approximately 0.02 times the number of atoms of the element Me. The concentration of the element X described here may be a value obtained by element analysis on the entire particle of the positive electrode active material using ICP-MS or the like, or may be a value based on the ratio of the raw materials mixed in the process of forming the positive electrode active material, for example.

In the case where cobalt and nickel are included as the element Me, the proportion of nickel atoms (Ni) in the sum of cobalt atoms and nickel atoms (Co+Ni) (Ni/(Co+Ni)) is preferably less than 0.1, further preferably less than or equal to 0.075.

This embodiment can be used in appropriate combination with the other embodiments.

Embodiment 3

In this embodiment, examples of materials that can be used in a secondary battery containing the positive electrode active material 100 described in the above embodiments will be described. In this embodiment, a secondary battery in which a positive electrode, a negative electrode, and an electrolyte solution are wrapped in an exterior body will be described as an example.

[Positive Electrode]

The positive electrode includes a positive electrode active material layer and a positive electrode current collector.

<Positive Electrode Active Material Layer>

The positive electrode active material layer contains at least a positive electrode active material. The positive electrode active material layer may contain, in addition to the positive electrode active material, other materials such as a coating film of the active material surface, a conductive additive, and a binder.

As the positive electrode active material, the positive electrode active material 100 described in the above embodiment can be used. A secondary battery including the positive electrode active material 100 described in the above embodiment can have high capacity and excellent cycle performance.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive also allows the maintenance of a path for electric conduction between the positive electrode active materials. The addition of the conductive additive to the active material layer increases the electric conductivity of the active material layer.

Examples of the conductive additive include natural graphite, artificial graphite such as mesocarbon microbeads, and carbon fiber. As carbon fiber, mesophase pitch-based carbon fiber and isotropic pitch-based carbon fiber can be used. Other examples of carbon fiber include carbon nanofiber and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength in some cases. A graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. Hence, a graphene compound is preferably used as the conductive additive, in which case the area where the active material and the conductive additive are in contact with each other can be increased. A graphene compound that is the conductive additive is preferably formed using a spray dry apparatus as a coating film to cover the entire surface of the active material. In addition, a graphene compound is preferable because electrical resistance can be reduced in some cases. Here, it is particularly preferable to use, for example, graphene, multilayer graphene, or RGO as a graphene compound. Note that RGO refers to a compound obtained by reducing graphene oxide (GO), for example.

In the case where an active material with a small particle size (e.g., 1 µm or less) is used, the specific surface area of the active material is large and thus more conductive paths for the active materials are needed. Consequently, the amount of conductive additive tends to increase, and the carried amount of active material tends to decrease relatively. When the carried amount of active material decreases, the capacity of the secondary battery also decreases. In such a case, a graphene compound is particularly preferably used as the conductive additive because a graphene compound can efficiently form a conductive path even with a small amount and does not decrease the carried amount of active material.

As a graphene compound, graphene or multilayer graphene may be used, for example. Here, the graphene compound preferably has a sheet-like shape. The graphene compound may have a sheet-like shape formed of a plurality of sheets of multilayer graphene and/or a plurality of sheets of graphene that partly overlap each other.

In the longitudinal cross section of the active material layer, the sheet-like graphene compounds are preferably dispersed substantially uniformly in the active material layer. The plurality of graphene compounds are preferably formed to partly coat or adhere to the surfaces of a plurality of particles of the positive electrode active material so that the graphene compounds make surface contact with the particles of the positive electrode active material.

Here, the plurality of graphene compounds are bonded to each other, thereby forming a net-like graphene compound sheet (hereinafter referred to as a graphene compound net or a graphene net). The graphene net covering the active material can function as a binder for bonding active materials. The amount of binder can thus be reduced, or the binder does not have to be used. This can increase the proportion of the active material in the electrode volume or the electrode weight. That is, the capacity of the secondary battery can be increased.

Here, it is preferable to perform reduction after a layer to be the active material layer is formed in such a manner that graphene oxide is used as the graphene compound and mixed with an active material. When graphene oxide with extremely high dispersibility in a polar solvent is used to form the graphene compounds, the graphene compounds can be substantially uniformly dispersed in the active material layer. The solvent is removed by volatilization from a dispersion medium containing the uniformly dispersed graphene oxide to reduce the graphene oxide; hence, the graphene compounds remaining in the active material layer partly overlap each other and are dispersed such that surface contact is made, thereby forming a three-dimensional conduction path. Note that graphene oxide can be reduced by heat treatment or with the use of a reducing agent, for example.

Unlike a particle of conductive additive such as acetylene black, which makes point contact with an active material, the graphene compound is capable of making low-resistance surface contact; accordingly, the electrical conduction between the particles of the positive electrode active material and the graphene compound can be improved with a smaller amount of the graphene compound than that of a normal conductive additive. This can increase the proportion of the positive electrode active material in the active material layer. Thus, the discharge capacity of the secondary battery can be increased.

With a spray dry apparatus, a graphene compound serving as a conductive additive can be formed in advance as a coating film to cover the entire surface of the active material, and a conductive path can be formed between the active materials using the graphene compound.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, and regenerated cellulose or starch can be used. It is further preferred that such water-soluble polymers be used in combination with any of the above rubber materials.

Alternatively, as the binder, a material such as polystyrene, poly(methyl acrylate), poly(methyl methacrylate) (polymethyl methacrylate, PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination as the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having a significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder, such as styrene-butadiene rubber, in an aqueous solution. Furthermore, a water-soluble polymer is expected to be easily and stably adsorbed on the active material surface because it has a functional group. Many cellulose derivatives, such as carboxymethyl cellulose, have functional groups such as a hydroxyl group and a carboxyl group. Because of functional groups, polymers are expected to interact with each other and cover the active material surface in a large area.

In the case where the binder covering or being in contact with the active material surface forms a film, the film is expected to serve as a passivation film to suppress the decomposition of the electrolyte solution. Here, the passivation film refers to a film without electronic conductivity or a film with extremely low electric conductivity, and can suppress the decomposition of an electrolyte solution at a potential at which a battery reaction occurs in the case where the passivation film is formed on the active material surface, for example. It is preferred that the passivation film can conduct lithium ions while suppressing electric conduction.

<Positive Electrode Current Collector>

The positive electrode current collector can be formed using a material that has high conductivity, which is for example a metal such as stainless steel, gold, platinum, aluminum, or titanium or an alloy thereof. It is preferred that a material used for the positive electrode current collector not dissolve at the potential of the positive electrode. Alternatively, it is possible to use an aluminum alloy to which an element that improves heat resistance, such as silicon, titanium, neodymium, scandium, or molybdenum, is added. Still alternatively, the positive electrode current collector may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of greater than or equal to 5 µm and less than or equal to 30 µm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element that enables charge-discharge reactions by alloying and dealloying reactions with lithium can be used. For example, a material containing at least one of silicon, tin, gallium, aluminum, germanium, lead, antimony, bismuth, silver, zinc, cadmium, indium, and the like can be used. Such elements have higher capacity than carbon, and silicon in particular has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by alloying and dealloying reactions with lithium and a compound containing the element, for example, may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably more than or equal to 0.2 and less than or equal to 1.5, further preferably more than or equal to 0.3 and less than or equal to 1.2.

As the carbon-based material, graphite, graphitizing carbon (soft carbon), non-graphitizing carbon (hard carbon), carbon nanotube, graphene, carbon black, and the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it is relatively easy to have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li$^+$) when lithium ions are intercalated into graphite (when a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a positive electrode active material that does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material. For example, a transition metal oxide that does not form an alloy with lithium, such as cobalt oxide (CoO), nickel oxide (NiO), and iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material that is not alloyed with carrier ions, such as lithium, is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharge or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2Bi_2Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter also simply referred to as "impurities"). Specifically, the weight ratio of impurities to the electrolyte solution is preferably less than or equal to 1%, further preferably less than or equal to 0.1%, still further preferably less than or equal to 0.01%.

An additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of the material to be added in the whole solvent is, for example, higher than or equal to 0.1 wt % and lower than or equal to 5 wt %.

Alternatively, a polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP), can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a PEO (polyethylene oxide)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S.30P_2S_5$, $30Li_2S.26B_2S_3.44LiI$, $63Li_2S.38SiS_2.1Li_3PO_4$, $57Li_2S.38SiS_2.5Li_4SiO_4$, and $50Li_2S.50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a conduction path after charge and discharge because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-x}Al_xTi_{2-x}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$—$Li_4SiO_4$ and $50Li_4SiO_4.50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ ($0<x<1$) with a NASICON crystal structure (hereinafter LATP) is preferable because LATP contains aluminum and titanium, each of which is the element the positive electrode active material used for the secondary battery of one embodiment of the present invention is allowed to contain, and thus a synergistic effect of improving the cycle performance is expected. Moreover, higher productivity due to the reduction in the number of steps is expected. Note that in this specification and the like, a material with a NASICON crystal structure refers to a compound that is represented by $M_2(XO_4)_3$ (M: transition metal; X: S, P, As, Mo, W, or the like) and has a structure in which $MO_6$ octahedra and $XO_4$ tetrahedra that share common corners are arranged three-dimensionally.

[Separator]

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably formed to have an envelope-like shape and placed to wrap one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charge and discharge at high voltage can be suppressed and thus the reliability of the secondary battery can be improved. In addition, when the separator is coated with the fluorine-based material, the separator is easily brought into close contact with an electrode, resulting in high output characteristics. When the separator is coated with the polyamide-based material, in particular, aramid, heat resistance is improved; thus, the safety of the secondary battery is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. An exterior body in the form of a film can also be used. As the film, for example, it is possible to use a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film.

Embodiment 4

In this embodiment, examples of a shape of a secondary battery including the positive electrode active material 100 described in the above embodiment are described. For the materials used for the secondary battery described in this embodiment, the description of the above embodiment can be referred to.

[Coin-Type Secondary Battery]

Figure 5A:
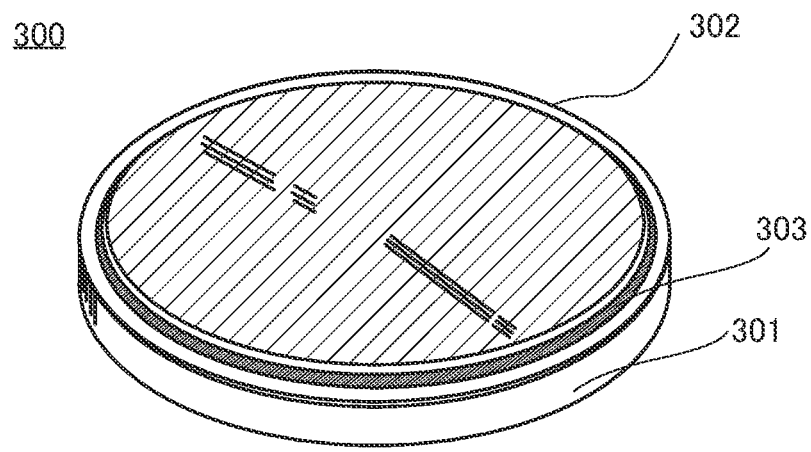
FIG. 5A, FIG. 5B, and FIG. 5C are diagrams illustrating a coin-type secondary battery.
Figure 5B:
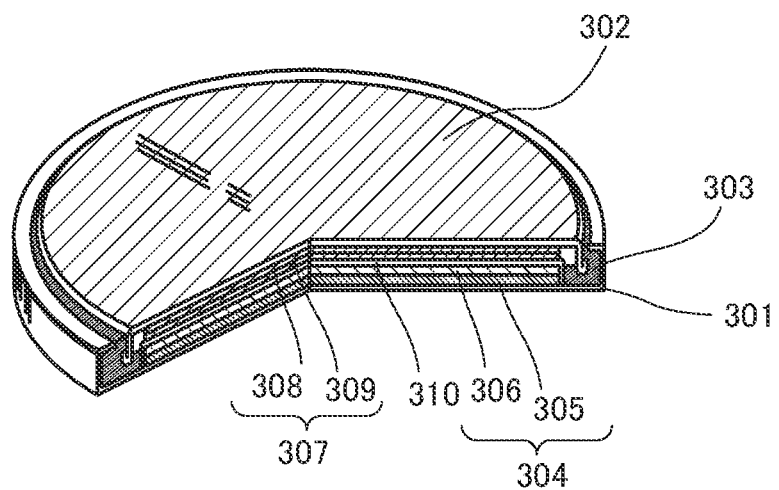

First, an example of a coin-type secondary battery is described. FIG. 5A is an external view of a coin-type (single-layer flat type) secondary battery, and FIG. 5B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. The positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The coin-type secondary battery 300 is manufactured in the following manner: the negative electrode 307, the positive electrode 304, and a separator 310 are immersed in the electrolyte solution; as illustrated in FIG. 5B, the positive electrode 304, the separator 310, the negative electrode 307, and the negative electrode can 302 are stacked in this order with the positive electrode can 301 positioned at the bottom; and then the positive electrode can 301 and the negative electrode can 302 are subjected to pressure bonding with the gasket 303 located therebetween.

When the positive electrode active material described in the above embodiment is used in the positive electrode 304, the coin-type secondary battery 300 with high capacity and excellent cycle performance can be obtained.

Here, a current flow in charging the secondary battery is described with reference to FIG. 5C. When a secondary battery using lithium is regarded as a closed circuit, lithium ions transfer and a current 78$i$ flows in the same direction. Note that in the secondary battery using lithium, an anode and a cathode change places in charging and discharging, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charge current is supplied. The use of terms an "anode" and a "cathode" related to oxidation reaction and reduction reaction might cause confusion because the anode and the cathode interchange in charging and in discharging. Thus, the terms "anode" and "cathode" are not used in this specification. If the term the "anode" or the "cathode" is used, it should be clearly mentioned that the anode or the cathode is which of the one in charging or in discharging and corresponds to which of the positive electrode (plus electrode) or the negative electrode (minus electrode).

Figure 5C:
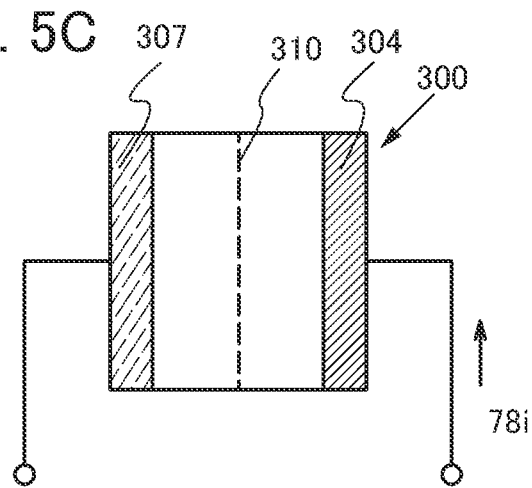

Two terminals illustrated in FIG. 5C are connected to a charger, and the secondary battery 300 is charged. As the charging of the secondary battery 300 proceeds, a potential difference between electrodes increases.

[Cylindrical Secondary Battery]

Figure 6A:
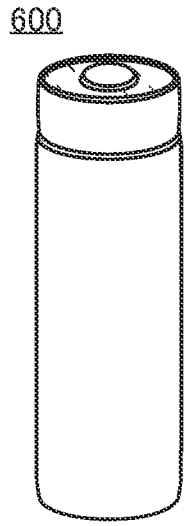
FIG. 6A, FIG. 6B, FIG. 6C, and FIG. 6D are diagrams illustrating cylindrical secondary batteries.
Figure 6B:
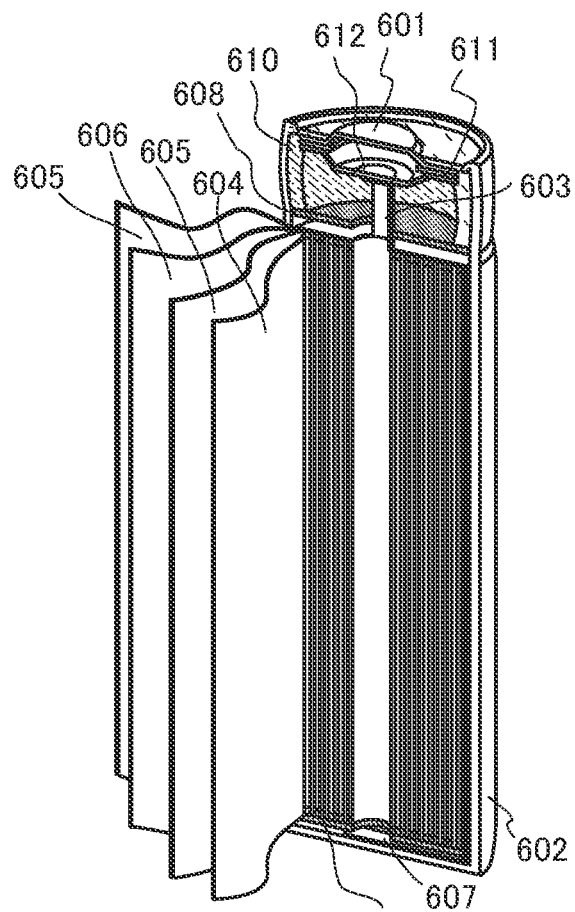

Next, an example of a cylindrical secondary battery is described with reference to FIG. 6. FIG. 6A illustrates an external view of a cylindrical secondary battery 600. FIG. 6B is a diagram schematically illustrating a cross section of the cylindrical secondary battery 600. As illustrated in FIG. 6B, the cylindrical secondary battery 600 includes a positive electrode cap (battery lid) 601 on a top surface and a battery can (outer can) 602 on a side surface and a bottom surface. The positive electrode cap and the battery can (outer can) 602 are insulated from each other by a gasket (insulating packing) 610.

Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound centering around a center pin. One end of the battery can 602 is closed and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is sandwiched between a pair of insulating plates 608 and 609 that face each other. Furthermore, a nonaqueous electrolyte (not illustrated) is injected inside the battery can 602 provided with the battery element. As the nonaqueous electrolyte, a nonaqueous electrolyte that is similar to that for the coin-type secondary battery can be used.

Since a positive electrode and a negative electrode that are used for a cylindrical storage battery are wound, active materials are preferably formed on both surfaces of a current collector. A positive electrode terminal (positive electrode current collector lead) 603 is connected to the positive electrode 604, and a negative electrode terminal (negative electrode current collector lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. In addition, the PTC element 611 is a thermally sensitive resistor whose resistance increases as temperature rises, and limits the amount of current by increasing the resistance to prevent abnormal heat generation. Barium titanate ($BaTiO_3$)-based semiconductor ceramics or the like can be used for the PTC element.

Figure 6C:
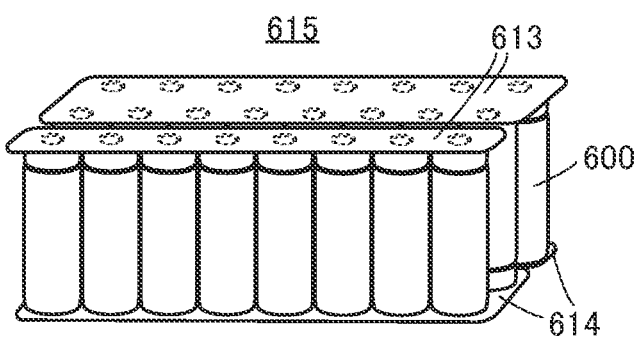

Furthermore, as illustrated in FIG. 6C, a plurality of secondary batteries 600 may be sandwiched between a conductive plate 613 and a conductive plate 614 to form a module 615. The plurality of secondary batteries 600 may be connected in parallel, connected in series, or connected in series after being connected in parallel. By forming the module 615 including the plurality of secondary batteries 600, large power can be extracted.

Figure 6D:
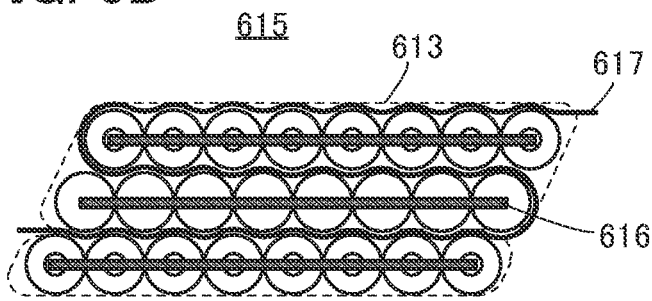

FIG. 6D is a top view of the module 615. The conductive plate 613 is shown by a dotted line for clarity of the drawing. As illustrated in FIG. 6D, the module 615 may include a wiring 616 which electrically connects the plurality of secondary batteries 600 to each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 with high capacity and excellent cycle performance can be obtained.

[Structure Examples of Secondary Battery]

Other structure examples of secondary batteries are described using FIG. 7 to FIG. 11.

Figure 7A:
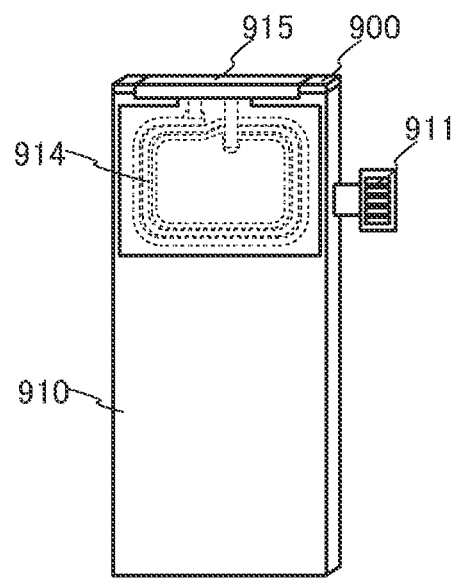
FIG. 7A and FIG. 7B are diagrams illustrating an example of a secondary battery.
Figure 7B:
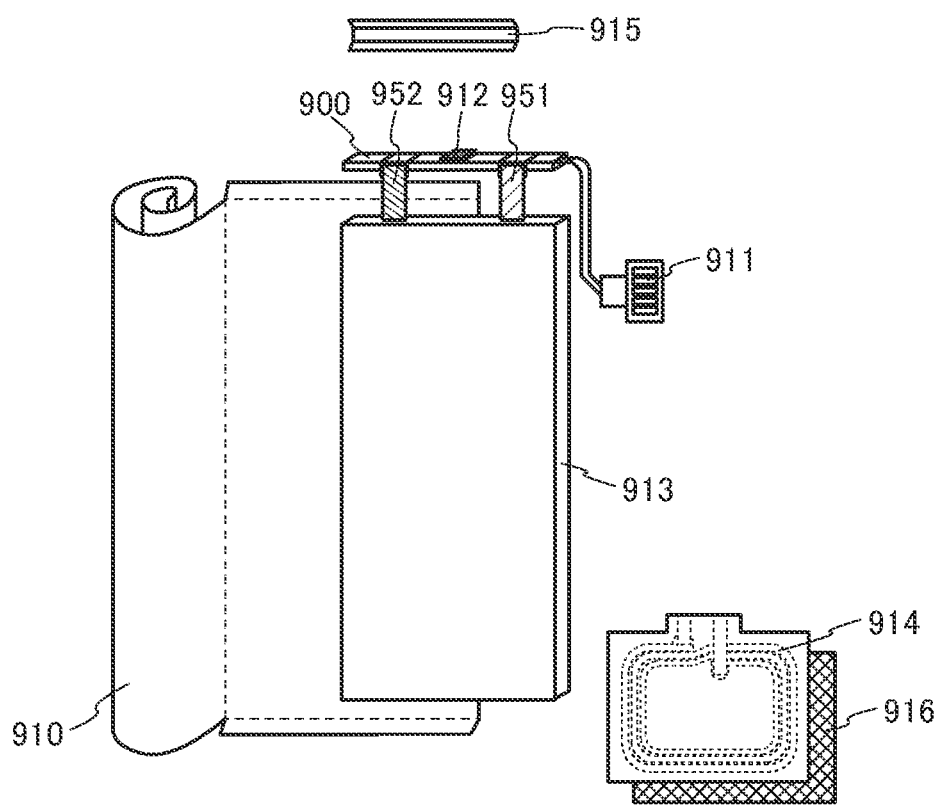

FIG. 7A and FIG. 7B are external views of a secondary battery. A secondary battery 913 is connected to an antenna 914 and an antenna 915 through a circuit board 900. A label 910 is attached to the secondary battery 913. Moreover, as illustrated in FIG. 7B, the secondary battery 913 is connected to a terminal 951 and a terminal 952.

The circuit board 900 includes a terminal 911 and a circuit 912. The terminal 911 is connected to the terminal 951, the terminal 952, the antenna 914, the antenna 915, and the circuit 912. Note that a plurality of terminals 911 serving as a control signal input terminal, a power supply terminal, and the like may be provided.

The circuit 912 may be provided on the rear surface of the circuit board 900. Note that the shape of the antenna 914 and the antenna 915 is not limited to a coil shape and may be a linear shape or a plate shape. An antenna such as a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. This flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than the line width of the antenna 915. This makes it possible to increase the amount of power received by the antenna 914.

The secondary battery includes a layer 916 between the antennas 914 and 915 and the secondary battery 913. The layer 916 has a function of blocking an electromagnetic field from the secondary battery 913, for example. As the layer 916, for example, a magnetic body can be used.

Note that the structure of the secondary battery is not limited to that illustrated in FIG. 7.

Figure 8A:
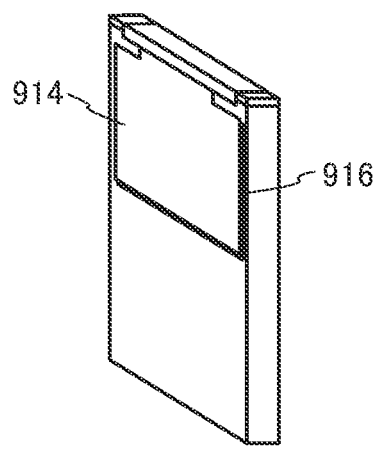
FIG. 8A, FIG. 8B, FIG. 8C, and FIG. 8D are diagrams illustrating examples of secondary batteries.
Figure 8B:
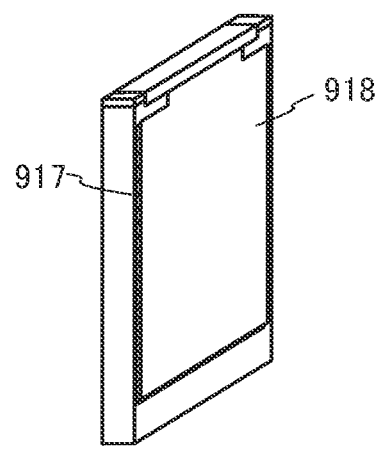

For example, as illustrated in FIG. 8A and FIG. 8B, an antenna may be provided for each of a pair of opposite surfaces of the secondary battery 913 illustrated in FIG. 7A and FIG. 7B. FIG. 8A is an external view illustrating one of the pair of surfaces, and FIG. 8B is an external view illustrating the other of the pair of surfaces. Note that for portions similar to those in FIG. 7A and FIG. 7B, the description of the secondary battery illustrated in FIG. 7A and FIG. 7B can be appropriately referred to.

As illustrated in FIG. 8A, the antenna 914 is provided on one of the pair of surfaces of the secondary battery 913 with the layer 916 located therebetween, and as illustrated in FIG. 8B, an antenna 918 is provided on the other of the pair of surfaces of the secondary battery 913 with a layer 917 located therebetween. The layer 917 has a function of blocking an electromagnetic field by the secondary battery 913, for example. As the layer 917, for example, a magnetic body can be used.

With the above structure, both of the antenna 914 and the antenna 918 can be increased in size. The antenna 918 has a function of communicating data with an external device, for example. An antenna with a shape that can be applied to the antenna 914, for example, can be used as the antenna 918. As a system for communication using the antenna 918 between the secondary battery and another device, a response method that can be used between the secondary battery and another device, such as near field communication (NFC), can be employed.

Figure 8C:
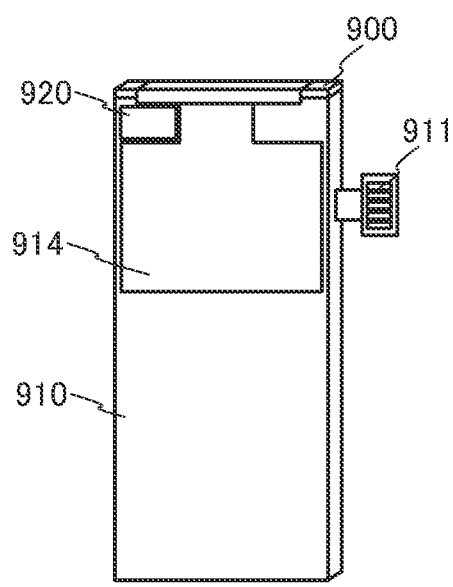

Alternatively, as illustrated in FIG. 8C, the secondary battery 913 illustrated in FIG. 7A and FIG. 7B may be provided with a display device 920. The display device 920 is electrically connected to the terminal 911. Note that the label 910 is not necessarily provided in a portion where the display device 920 is provided. Note that for portions similar to those in FIG. 7A and FIG. 7B, the description of the secondary battery illustrated in FIG. 7A and FIG. 7B can be appropriately referred to.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 8D:
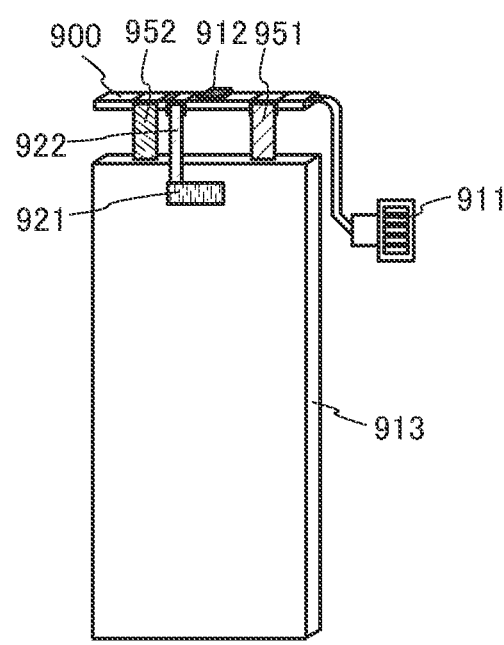

Alternatively, as illustrated in FIG. 8D, the secondary battery 913 illustrated in FIG. 7A and FIG. 7B may be provided with a sensor 921. The sensor 921 is electrically connected to the terminal 911 via a terminal 922. Note that for portions similar to those in FIG. 7A and FIG. 7B, the description of the secondary battery illustrated in FIG. 7A and FIG. 7B can be appropriately referred to.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With provision of the sensor 921, for example, data on an environment where the secondary battery is placed (e.g., temperature or the like) can be detected and stored in a memory inside the circuit 912.

Figure 9A:
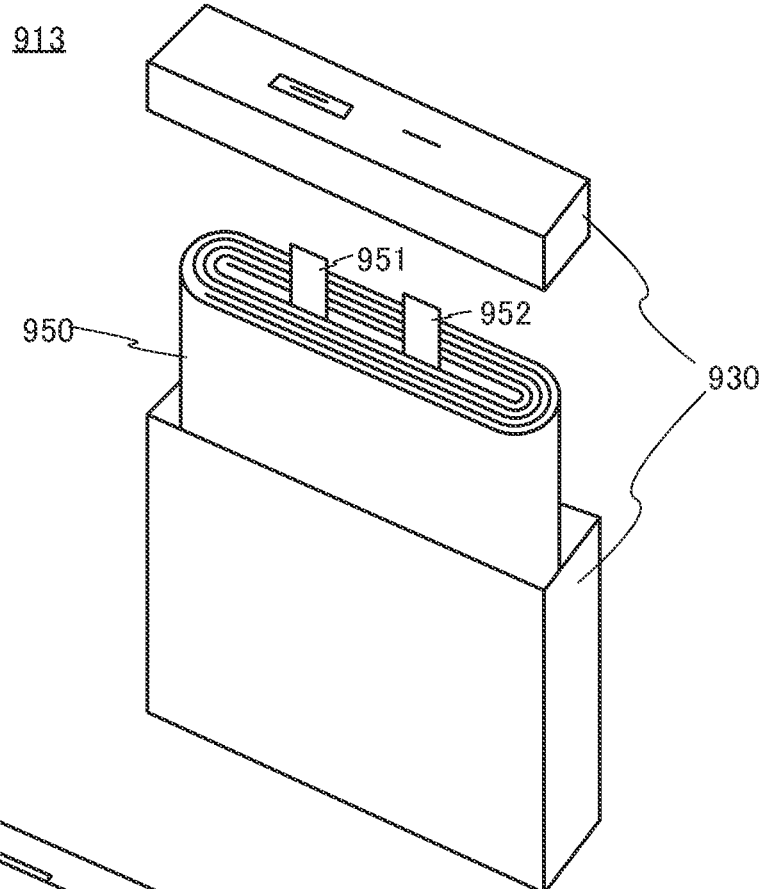
FIG. 9A and FIG. 9B are diagrams illustrating examples of secondary batteries.
Figure 9B:
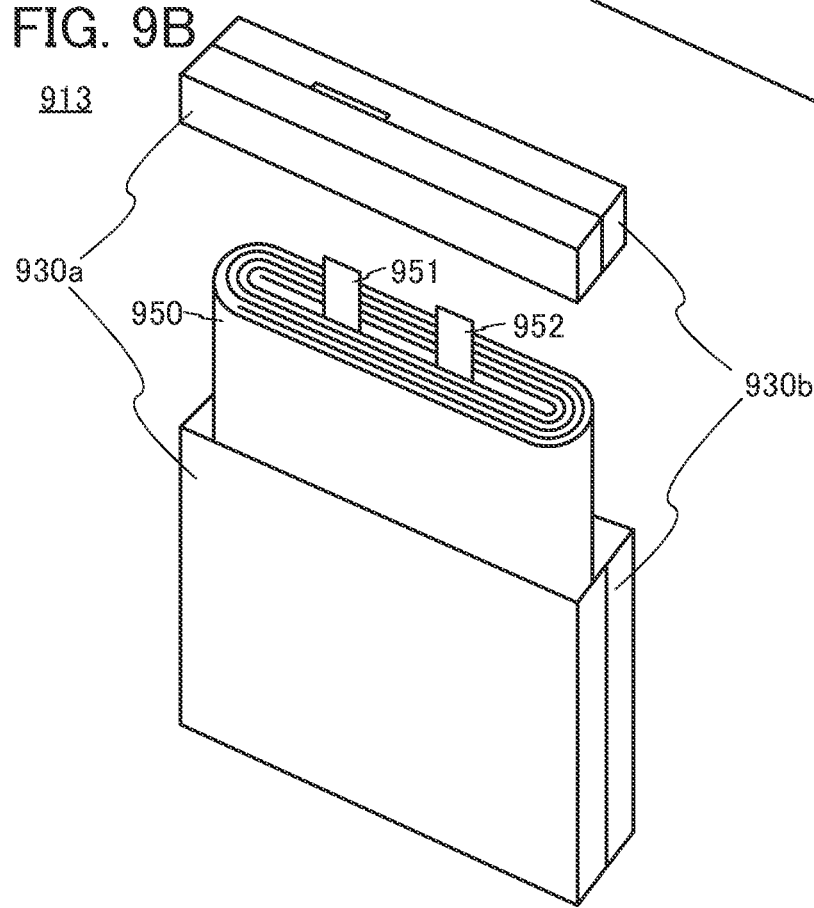
Figure 10:
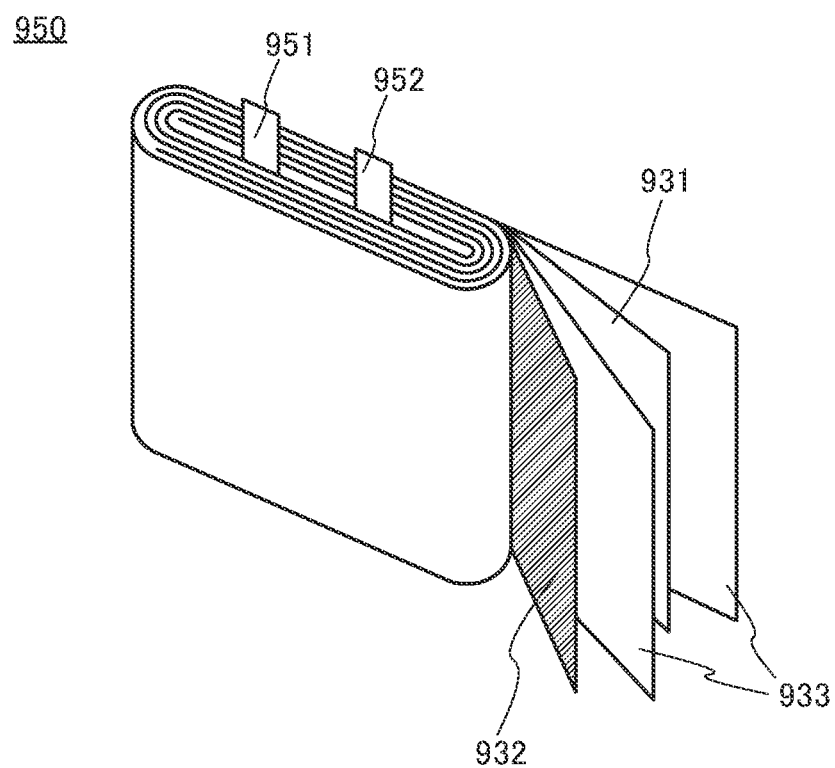
FIG. 10 is a diagram illustrating an example of a secondary battery.

Furthermore, structure examples of the secondary battery 913 are described using FIG. 9 and FIG. 10.

The secondary battery 913 illustrated in FIG. 9A includes a wound body 950 provided with the terminal 951 and the terminal 952 inside a housing 930. The wound body 950 is immersed in an electrolyte solution inside the housing 930. The terminal 952 is in contact with the housing 930, and the use of an insulator or the like inhibits contact between the terminal 951 and the housing 930. Note that for convenience, FIG. 9A illustrates the housing 930 divided into pieces; however, in reality, the wound body 950 is covered with the housing 930 and the terminal 951 and the terminal 952 extend to the outside of the housing 930. For the housing 930, a metal material (e.g., aluminum) or a resin material can be used.

Note that as illustrated in FIG. 9B, the housing 930 illustrated in FIG. 9A may be formed using a plurality of materials. For example, in the secondary battery 913 illustrated in FIG. 9B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antenna 914 or the antenna 915 may be provided inside the housing 930a. For the housing 930b, a metal material can be used, for example.

In addition, FIG. 10 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 sandwiched therebetween. Note that a plurality of stacks each including the negative electrode 931, the positive electrode 932, and the separator 933 may be stacked.

The negative electrode 931 is connected to the terminal 911 illustrated in FIG. 7 via one of the terminal 951 and the terminal 952. The positive electrode 932 is connected to the terminal 911 illustrated in FIG. 7 via the other of the terminal 951 and the terminal 952.

When the positive electrode active material described in the above embodiment is used in the positive electrode 932, the secondary battery 913 with high capacity and excellent cycle performance can be obtained.

[Laminated Secondary Battery]

Next, examples of a laminated secondary battery are described with reference to FIG. 11 to FIG. 17. When the laminated secondary battery has flexibility and is incorporated in an electronic device that has a flexible portion at least partly, the secondary battery can be bent along the deformed electronic device.

Figure 11A:
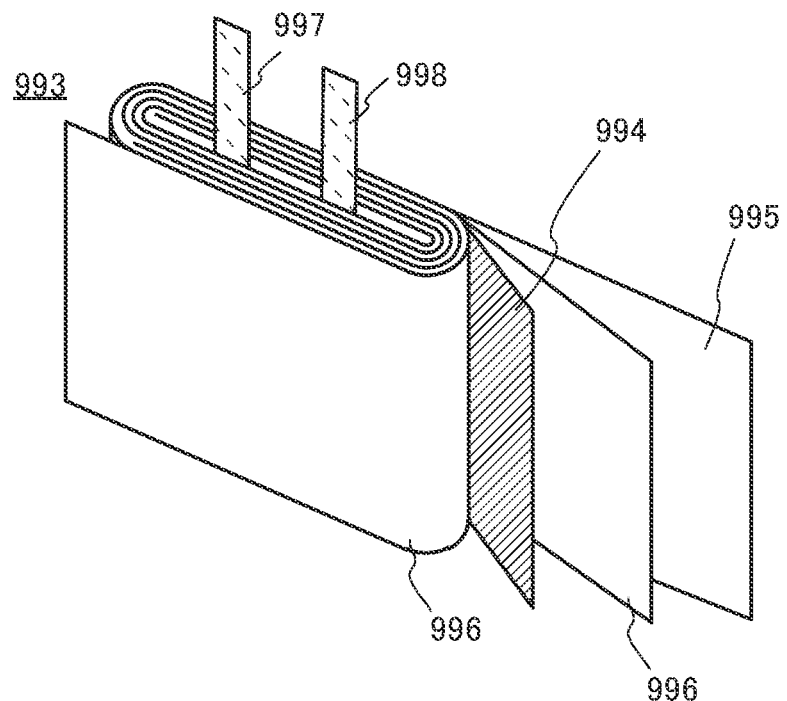
FIG. 11A, FIG. 11B, and FIG. 11C are diagrams illustrating a laminated secondary battery.

A laminated secondary battery 980 is described using FIG. 11. The laminated secondary battery 980 includes a wound body 993 illustrated in FIG. 11A. The wound body 993 includes a negative electrode 994, a positive electrode 995, and separators 996. Like the wound body 950 illustrated in FIG. 10, the wound body 993 is obtained by winding a sheet of a stack in which the negative electrode 994 overlaps with the positive electrode 995 with the separator 996 sandwiched therebetween.

Note that the number of stacked layers including the negative electrode 994, the positive electrode 995, and the separator 996 may be designed as appropriate depending on required capacity and element volume. The negative electrode 994 is connected to a negative electrode current collector (not illustrated) via one of a lead electrode 997 and a lead electrode 998, and the positive electrode 995 is connected to a positive electrode current collector (not illustrated) via the other of the lead electrode 997 and the lead electrode 998.

Figure 11B:
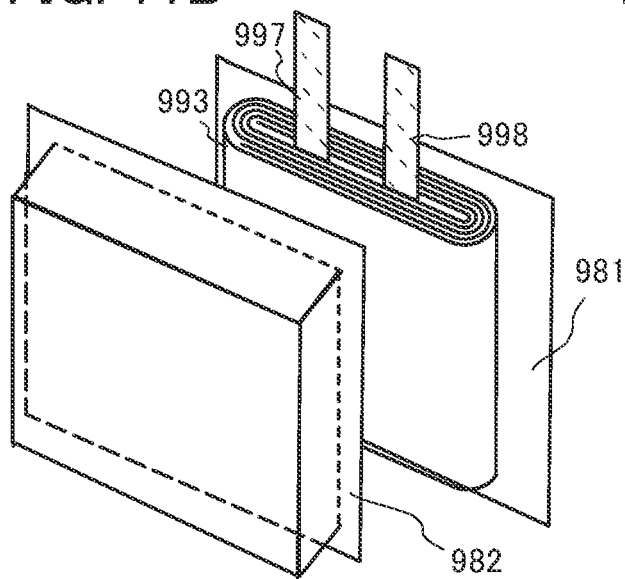
Figure 11C:
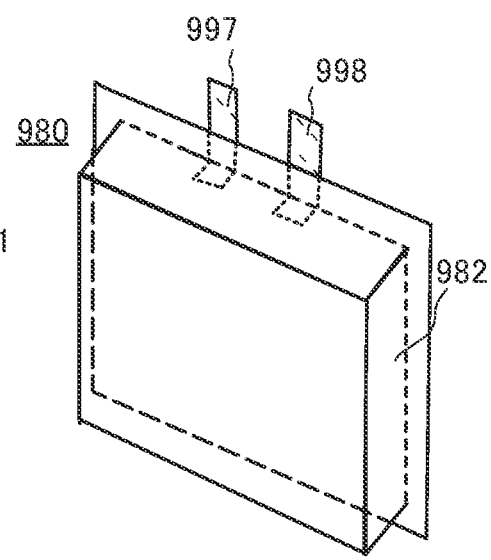

As illustrated in FIG. 11B, the wound body 993 is packed in a space formed by bonding a film 981 and a film 982 having a depressed portion that serve as exterior bodies by thermocompression bonding or the like, whereby the secondary battery 980 illustrated in FIG. 11C can be fabricated. The wound body 993 includes the lead electrode 997 and the lead electrode 998, and is immersed in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Furthermore, although FIG. 11B and FIG. 11C illustrate an example of using two films, a space may be formed by bending one film and the wound body 993 may be packed in the space.

When the positive electrode active material described in the above embodiment is used in the positive electrode 995, the secondary battery 980 with high capacity and excellent cycle performance can be obtained.

Furthermore, FIG. 11 illustrates an example in which the secondary battery 980 includes a wound body in a space formed by films serving as exterior bodies; however, as illustrated in FIG. 12, for example, a secondary battery may include a plurality of strip-shaped positive electrodes, separators, and negative electrodes in a space formed by films serving as exterior bodies.

Figure 12A:
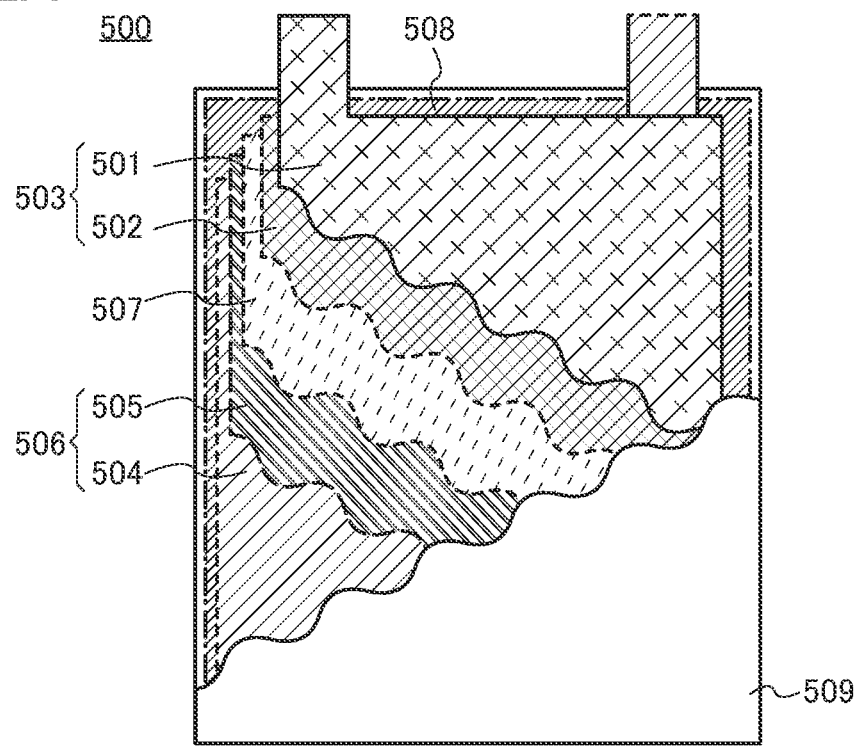
FIG. 12A and FIG. 12B are diagrams illustrating a laminated secondary battery.

A laminated secondary battery 500 illustrated in FIG. 12A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 that are provided in the exterior body 509. The exterior body 509 is filled with the electrolyte solution 508. The electrolyte solution described in Embodiment 2 can be used as the electrolyte solution 508.

In the laminated secondary battery 500 illustrated in FIG. 12A, the positive electrode current collector 501 and the negative electrode current collector 504 also serve as terminals for electrical contact with the outside. For this reason, the positive electrode current collector 501 and the negative electrode current collector 504 may be arranged so that parts of the positive electrode current collector 501 and the negative electrode current collector 504 are exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

Figure 12B:
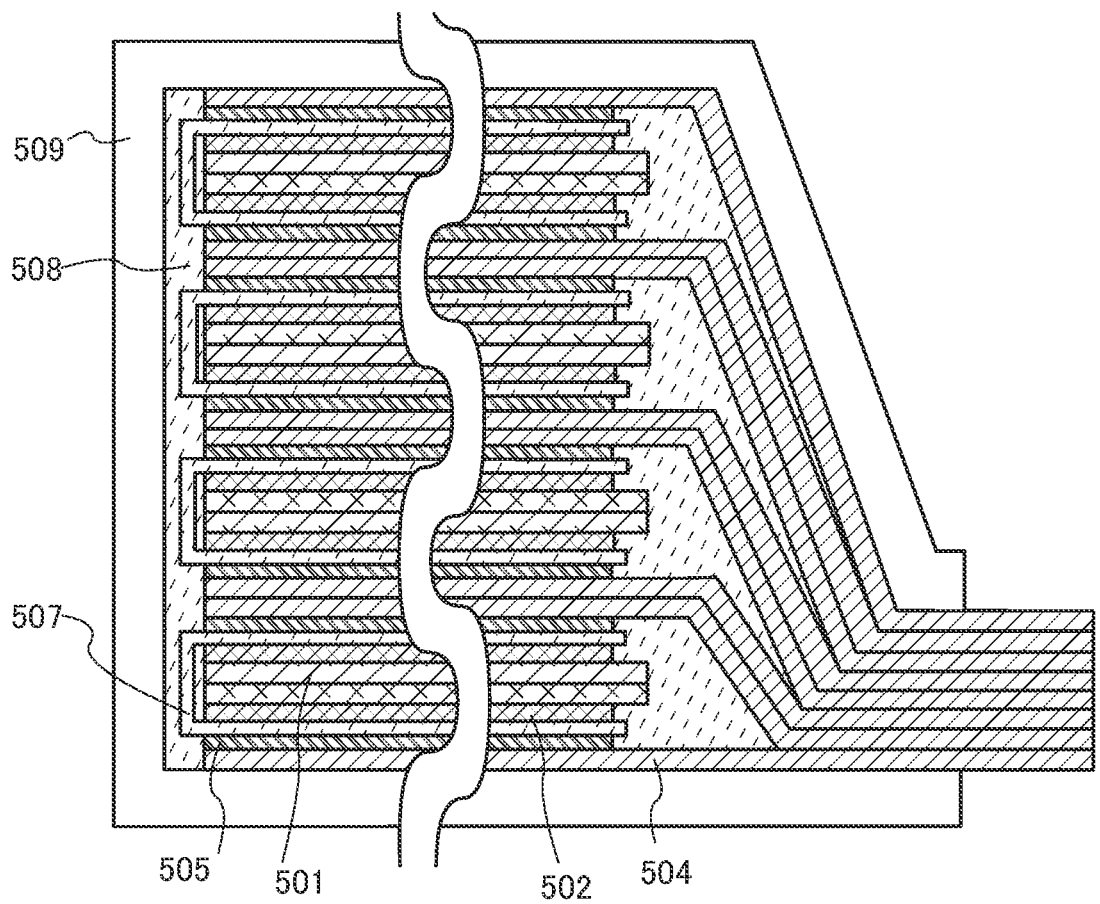

Furthermore, FIG. 12B illustrates an example of a cross-sectional structure of the laminated secondary battery 500. FIG. 12A illustrates an example in which only two current collectors are included for simplicity, but actually, a plurality of electrode layers are included as illustrated in FIG. 12B.

In FIG. 12B, the number of electrode layers is 16, for example. Note that the laminated secondary battery 500 has flexibility even though including 16 electrode layers. FIG. 12B illustrates a structure including 8 layers of negative electrode current collectors 504 and 8 layers of positive electrode current collectors 501, i.e., 16 layers in total. Note that FIG. 12B illustrates a cross section of the lead portion of the negative electrode, and the 8 layers of the negative electrode current collectors 504 are bonded to each other by ultrasonic welding. It is needless to say that the number of electrode layers is not limited to 16, and may be more than 16 or less than 16. In the case of a large number of electrode layers, the secondary battery can have higher capacity. In the case of a small number of electrode layers, the secondary battery can have smaller thickness and high flexibility.

Figure 13:
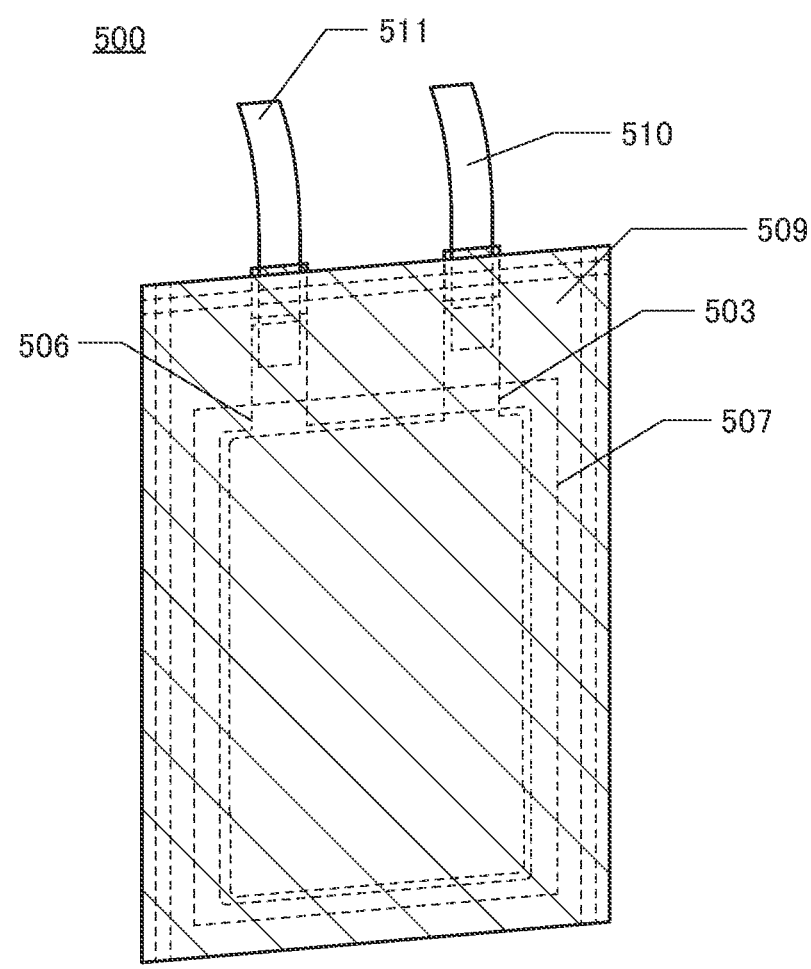
FIG. 13 is an external view of a secondary battery.
Figure 14:
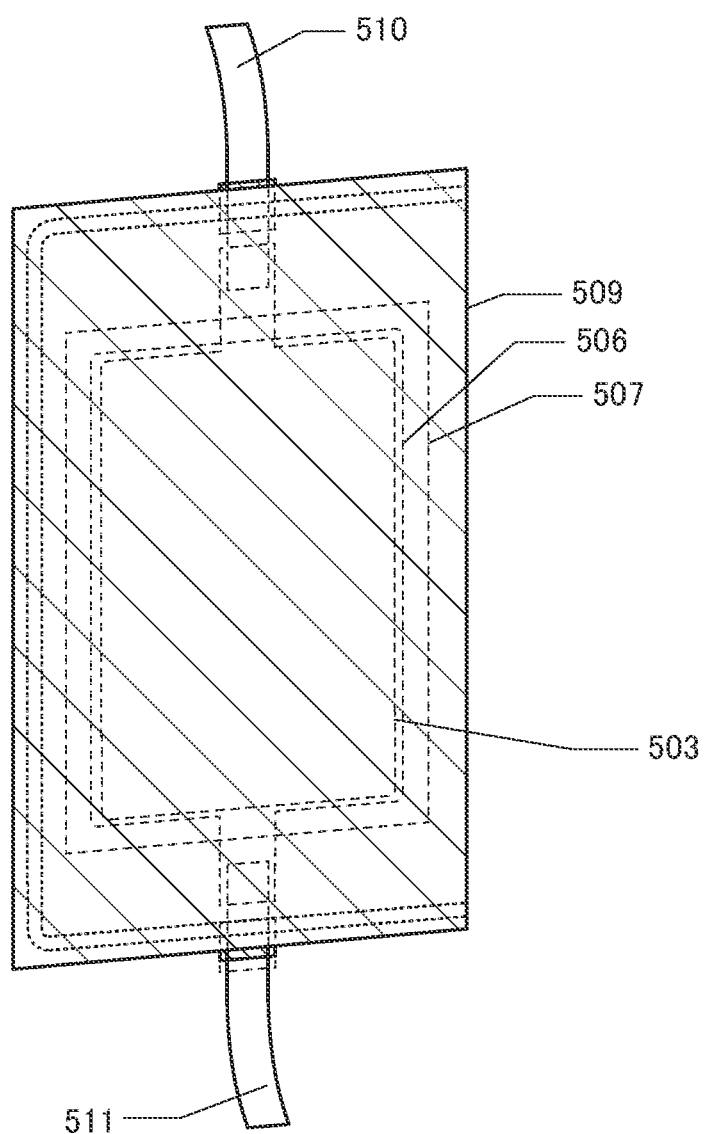
FIG. 14 is an external view of a secondary battery.

FIG. 13 and FIG. 14 each illustrate an example of the external view of the laminated secondary battery 500. In FIG. 13 and FIG. 14, the laminated secondary battery 500 includes the positive electrode 503, the negative electrode 506, the separator 507, the exterior body 509, a positive electrode lead electrode 510, and a negative electrode lead electrode 511.

Figure 15A:
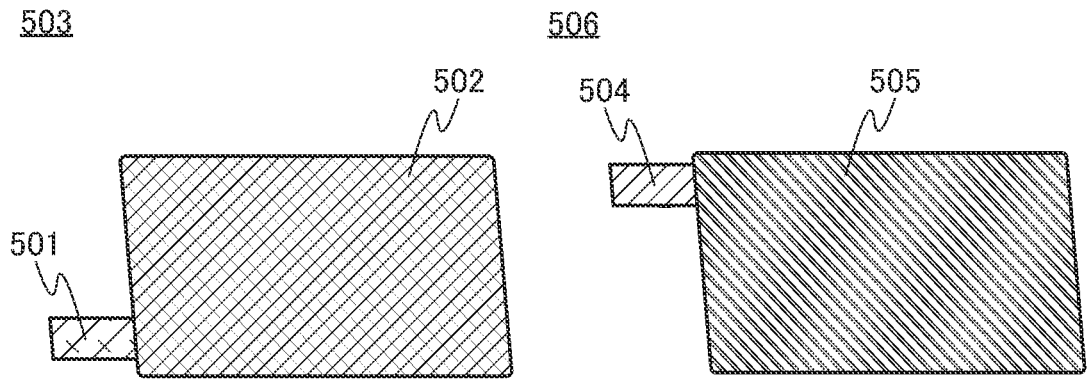
FIG. 15A, FIG. 15B, and FIG. 15C are diagrams illustrating a method for manufacturing a secondary battery.

FIG. 15A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to the examples illustrated in FIG. 15A.

[Method for Manufacturing Laminated Secondary Battery]

Figure 15B:
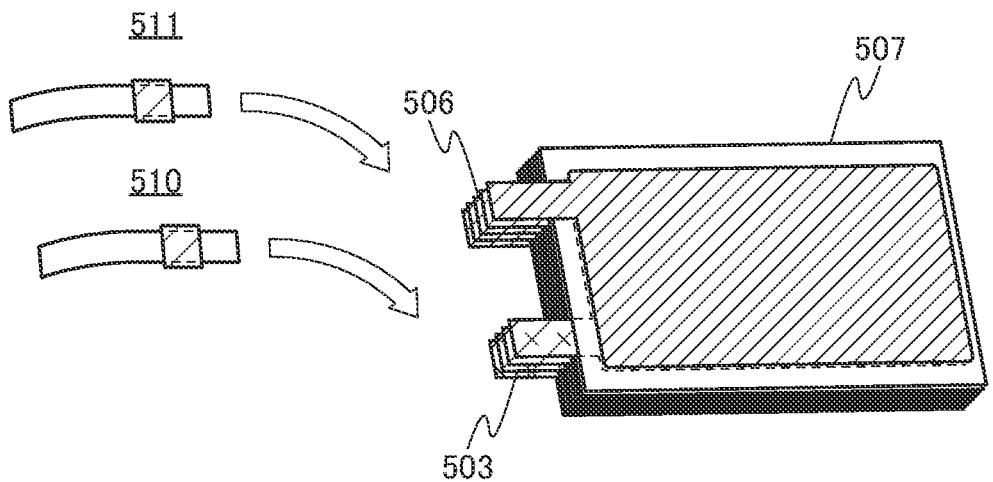
Figure 15C:
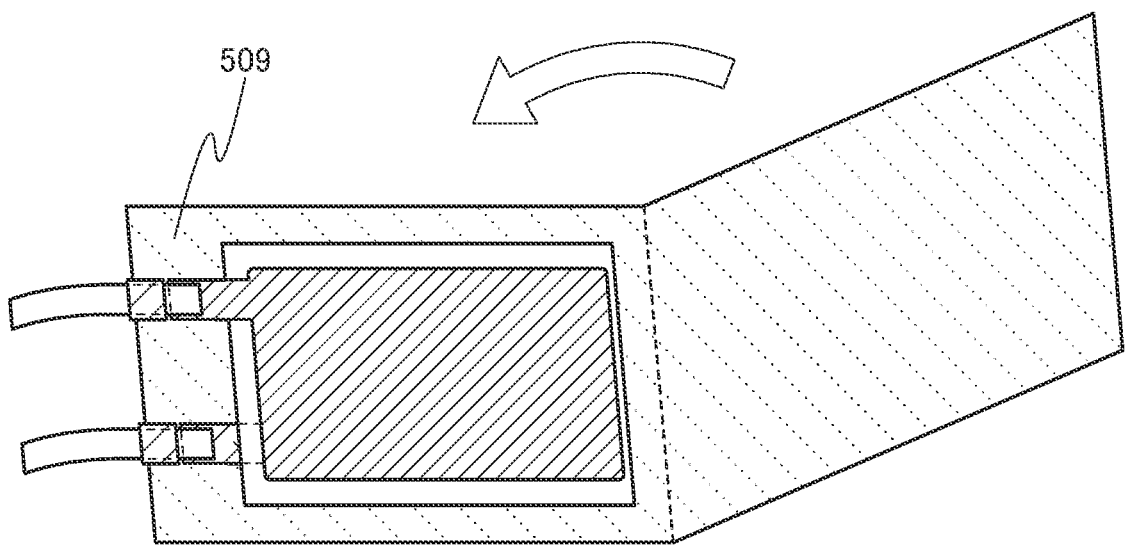

Here, an example of a method for manufacturing the laminated secondary battery whose external view is illustrated in FIG. 13 is described using FIG. 15B and FIG. 15C.

First, the negative electrode 506, the separator 507, and the positive electrode 503 are stacked. FIG. 15B illustrates the stack of the negative electrode 506, the separator 507, and the positive electrode 503. An example of using five sets of negative electrodes and four sets of positive electrodes is described here. Next, the tab regions of the positive electrodes 503 are bonded to each other, and the tab region of the positive electrode on the outermost surface and the positive electrode lead electrode 510 are bonded to each other. For the bonding, ultrasonic welding can be used, for example. In a similar manner, the tab regions of the negative electrodes 506 are bonded to each other, and the tab region of the negative electrode on the outermost surface and the negative electrode lead electrode 511 are bonded to each other.

After that, the negative electrode 506, the separator 507, and the positive electrode 503 are placed over the exterior body 509.

Subsequently, the exterior body 509 is folded along a portion shown by a dashed line, as illustrated in FIG. 15C. Then, the outer portions of the exterior body 509 are bonded. For the bonding, thermocompression can be used, for example. At this time, an unbonded region (hereinafter referred to as an inlet) is provided for part (or one side) of the exterior body 509 so that the electrolyte solution 508 can be introduced later.

Next, the electrolyte solution 508 (not illustrated) is introduced into the exterior body 509 through the inlet provided for the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material described in the above embodiment is used in the positive electrode 503, the secondary battery 500 with high capacity and excellent cycle performance can be obtained.

[Bendable Secondary Battery]

Next, an example of a bendable secondary battery is described with reference to FIG. 16 and FIG. 17.

Figure 16A:
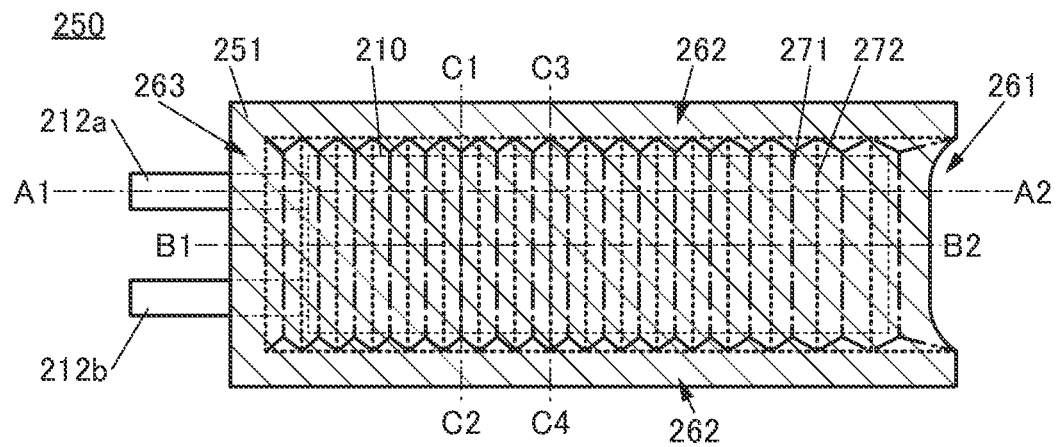
Figure 16A:
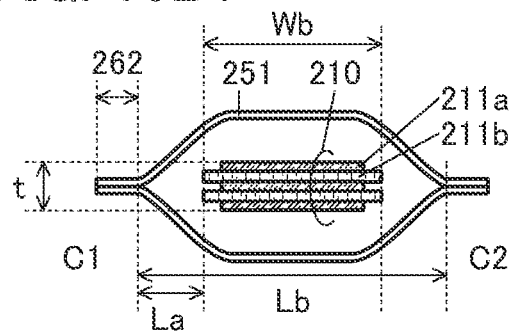
Figure 16A:
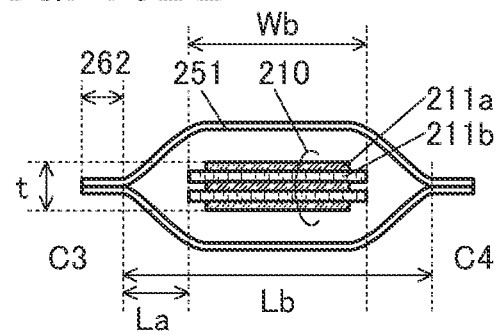

FIG. 16A is a schematic top view of a bendable secondary battery 250. FIG. 16B1, FIG. 16B2, and FIG. 16C are schematic cross-sectional views respectively taken along the cutting line C1-C2, the cutting line C3-C4, and the cutting line A1-A2 in FIG. 16A. The secondary battery 250 includes an exterior body 251 and an electrode stack 210 held in the exterior body 251. The electrode stack 210 has a structure in which at least a positive electrode 211a and a negative electrode 211b are stacked. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 17A:
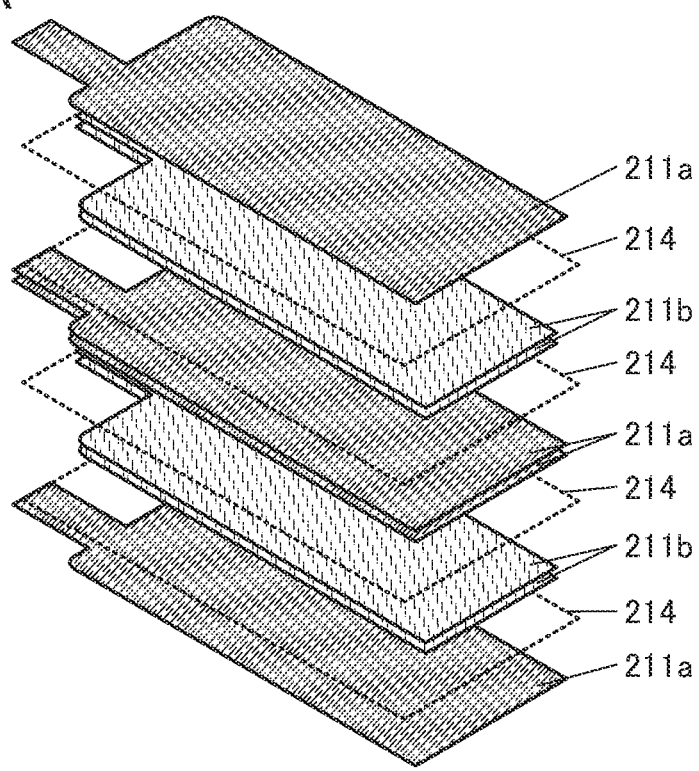
FIG. 17A and FIG. 17B are diagrams illustrating a bendable secondary battery.
Figure 17B:
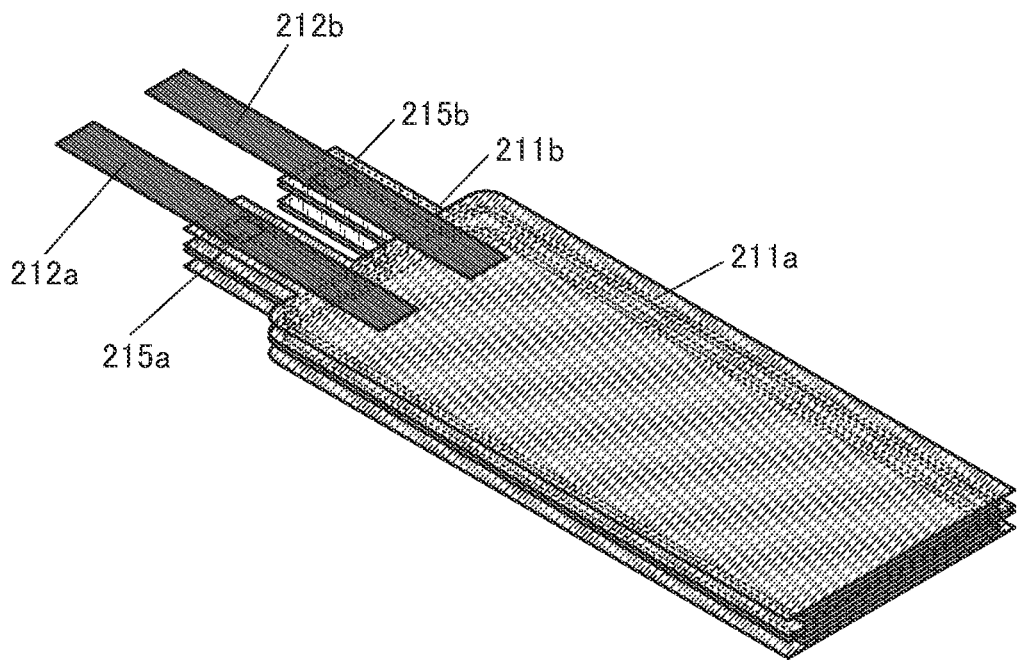

The positive electrode 211a and the negative electrode 211b that are included in the secondary battery 250 are described using FIG. 17. FIG. 17A is a perspective view illustrating the stacking order of the positive electrode 211a, the negative electrode 211b, and a separator 214. FIG. 17B is a perspective view illustrating the lead 212a and the lead 212b in addition to the positive electrode 211a and the negative electrode 211b.

As illustrated in FIG. 17A, the secondary battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab portion. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material is not formed are in contact with each other.

Furthermore, the separator 214 is provided between the surface of the positive electrode 211a on which the positive electrode active material is formed and the surface of the negative electrode 211b on which the negative electrode active material is formed. In FIG. 17, the separator 214 is shown by a dotted line for clarity.

Furthermore, as illustrated in FIG. 17B, the plurality of positive electrodes 211a are electrically connected to the lead 212a in a bonding portion 215a. In addition, the plurality of negative electrodes 211b are electrically connected to the lead 212b in a bonding portion 215b.

Next, the exterior body 251 is described using FIG. 16B1, FIG. 16B2, FIG. 16C, and FIG. 16D.

The exterior body 251 has a film-like shape and is folded in half so as to sandwich the positive electrodes 211a and the negative electrodes 211b. The exterior body 251 includes a folded portion 261, a pair of seal portions 262, and a seal portion 263. The pair of seal portions 262 is provided with the positive electrodes 211a and the negative electrodes 211b sandwiched therebetween and thus can also be referred to as side seals. In addition, the seal portion 263 includes portions overlapping with the lead 212a and the lead 212b and can also be referred to as a top seal.

Portions of the exterior body 251 that overlap with the positive electrodes 211a and the negative electrodes 211b preferably have a wave shape in which crest lines 271 and trough lines 272 are alternately arranged. In addition, the seal portions 262 and the seal portion 263 of the exterior body 251 are preferably flat.

FIG. 16B1 is a cross section cut along a portion overlapping with the crest line 271, and FIG. 16B2 is a cross section cut along a portion overlapping with the trough line 272. FIG. 16B1 and FIG. 16B2 correspond to cross sections of the secondary battery 250, the positive electrodes 211a, and the negative electrodes 211b in the width direction.

Here, the distance between the seal portion 262 and end portions of the positive electrode 211a and the negative electrode 211b in the width direction, that is, the end portions of the positive electrode 211a and the negative electrode 211b, is referred to as a distance La. When the secondary battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 is increased.

Furthermore, the distance La between the seal portion 262 and the positive electrodes 211a and the negative electrodes 211b is preferably increased as the total thickness of the stacked positive electrodes 211a and negative electrodes 211b is increased.

More specifically, when the total thickness of the stacked positive electrodes 211a, negative electrodes 211b, and separators 214 (not illustrated) is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in the above range, a compact battery that is highly reliable for bending can be obtained.

Furthermore, when the distance between the pair of seal portions 262 is referred to as a distance Lb, it is preferable that the distance Lb be sufficiently longer than the widths of the positive electrode 211a and the negative electrode 211b (here, a width Wb of the negative electrode 211b). Thus, even if the positive electrode 211a and the negative electrode 211b come into contact with the exterior body 251 due to a change in shape such as repeated bending of the secondary battery 250, parts of the positive electrode 211a and the negative electrode 211b can be shifted in the width direction; thus, the positive electrode 211a and the negative electrode 211b can be effectively prevented from being rubbed against the exterior body 251.

For example, the difference between the distance Lb, which is the distance between the pair of seal portions 262, and the width Wb of the negative electrode 211b is preferably 1.6 times or more and 6.0 times or less, further preferably 1.8 times or more and 5.0 times or less, and still further preferably 2.0 times or more and 4.0 times or less as large as the thickness t of the positive electrode 211a and the negative electrode 211b.

Figure 16C:
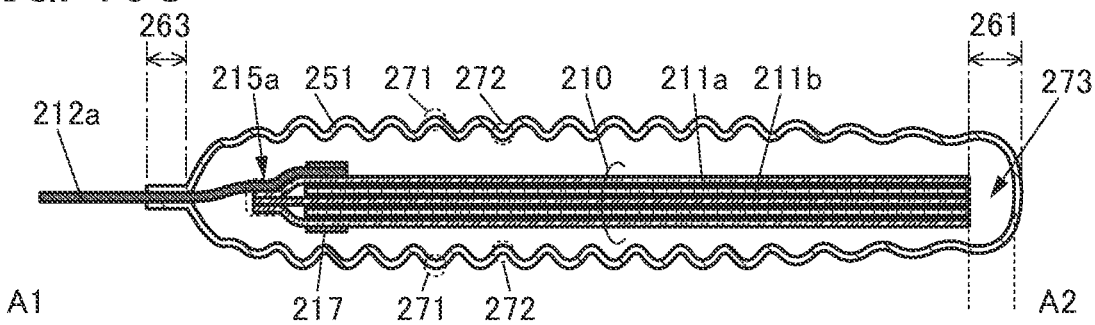

Furthermore, FIG. 16C illustrates a cross section including the lead 212a and corresponds to a cross section of the secondary battery 250, the positive electrode 211a, and the negative electrode 211b in the length direction. As illustrated in FIG. 16C, in the folded portion 261, a space 273 is preferably included between the end portions of the positive electrode 211a and the negative electrode 211b in the length direction and the exterior body 251.

Figure 16D:
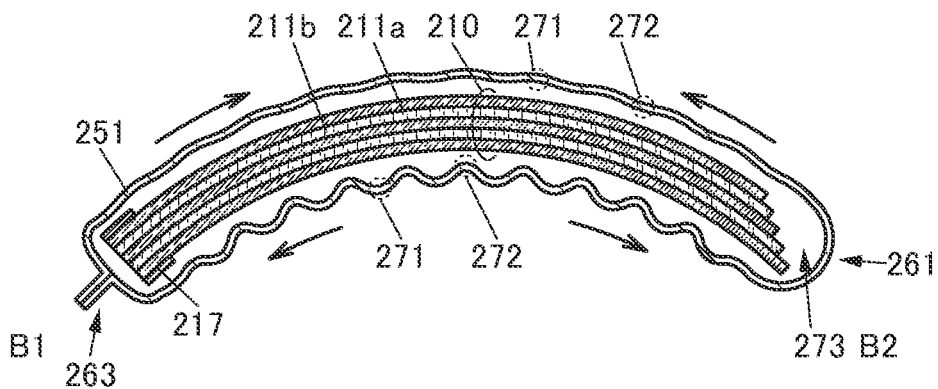

FIG. 16D is a schematic cross-sectional view of the secondary battery 250 in a bent state. FIG. 16D corresponds to a cross section along the cutting line B1-B2 in FIG. 16A.

When the secondary battery 250 is bent, the exterior body 251 changes in shape such that part of the exterior body 251 positioned on the outer side in bending is stretched and the other part positioned on the inner side shrinks. More specifically, the part of the exterior body 251 positioned on the outer side in bending changes in shape such that the wave amplitude becomes smaller and the wave period becomes longer. In contrast, the part of the exterior body 251 positioned on the inner side changes in shape such that the wave amplitude becomes larger and the wave period becomes shorter. When the exterior body 251 changes in shape in this manner, stress applied to the exterior body 251 due to bending is relieved, so that a material itself of the exterior body 251 does not need to expand and contract. As a result, the secondary battery 250 can be bent with weak force without damage to the exterior body 251.

Furthermore, as illustrated in FIG. 16D, when the secondary battery 250 is bent, the positive electrode 211a and the negative electrode 211b are relatively shifted to each other. At this time, ends of the stacked positive electrodes 211a and negative electrodes 211b on the seal portion 263 side are fixed by a fixing member 217; thus, the plurality of positive electrodes 211a and negative electrodes 211b are shifted so that the shift amount becomes larger at a position closer to the folded portion 261. Therefore, stress applied to the positive electrode 211a and the negative electrode 211b is relieved, and the positive electrode 211a and the negative electrode 211b themselves do not need to expand and contract. As a result, the secondary battery 250 can be bent without damage to the positive electrode 211a and the negative electrode 211b.

Furthermore, the space 273 is included between the exterior body 251 and the positive electrode 211a and the negative electrode 211b, whereby the positive electrode 211a and the negative electrode 211b can be shifted relatively while the positive electrode 211a and the negative electrode 211b positioned on an inner side in bending do not come in contact with the exterior body 251.

In the secondary battery 250 illustrated in FIG. 16 and FIG. 17, damage to the exterior body, damage to the positive electrode 211a and the negative electrode 211b, and the like are less likely to occur and battery characteristics are less likely to deteriorate even when the secondary battery 250 is repeatedly bent and stretched. When the positive electrode active material described in the above embodiment is used in the positive electrode 211a included in the secondary battery 250, a battery with better cycle performance can be obtained.

Embodiment 5

In this embodiment, examples of electronic devices each including the secondary battery of one embodiment of the present invention are described.

First, FIG. 18A to FIG. 18G illustrates examples of electronic devices including the bendable secondary battery described in part of Embodiment 3. Examples of electronic devices each including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

Furthermore, a secondary battery with a flexible shape can also be incorporated along a curved surface of an inside wall or an outside wall of a house or a building or an interior or an exterior of an automobile.

FIG. 18A illustrates an example of a mobile phone. A mobile phone 7400 includes operation buttons 7403, an external connection port 7404, a speaker 7405, a microphone 7406, and the like in addition to a display portion 7402 incorporated in a housing 7401. Note that the mobile phone 7400 includes a secondary battery 7407. When the secondary battery of one embodiment of the present invention is used as the secondary battery 7407, a lightweight mobile phone with a long lifetime can be provided.

FIG. 18B illustrates the mobile phone 7400 in a bent state. When the whole mobile phone 7400 is bent through deformation by the external force, the secondary battery 7407 provided therein is also bent. FIG. 18C illustrates the bent secondary battery 7407 in a bent state. The secondary battery 7407 is a thin storage battery. The secondary battery 7407 is fixed in a bent state. Note that the secondary battery 7407 includes a lead electrode electrically connected to a current collector. The current collector is, for example, copper foil and partly alloyed with gallium; thus, adhesion between the current collector and an active material layer in contact with the current collector is improved and the secondary battery 7407 can have high reliability even in a bent state.

FIG. 18D illustrates an example of a bangle-type display device. A portable display device 7100 includes a housing 7101, a display portion 7102, operation buttons 7103, and a secondary battery 7104. FIG. 18E illustrates the secondary battery 7104 in a bent state. When the display device is worn on a user's arm while the secondary battery 7104 is bent, the housing changes in shape and the curvature of part or the whole of the secondary battery 7104 is changed. Note that a value represented by the radius of a circle that corresponds to the bending degree of a curve at a given point is referred to as the radius of curvature, and the reciprocal of the radius of curvature is referred to as curvature. Specifically, part or the whole of the housing or the main surface of the secondary battery 7104 is changed in the range of radius of curvature from 40 mm or more to 150 mm or less. When the radius of curvature at the main surface of the secondary battery 7104 is in the range from 40 mm or more to 150 mm or less, the reliability can be kept high. When the secondary battery of one embodiment of the present invention is used as the secondary battery 7104, a lightweight portable display device with a long lifetime can be provided.

FIG. 18F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music replay, Internet communication, and a computer game.

The display portion 7202 with a curved display surface is provided, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely with the operating system incorporated in the portable information terminal 7200.

Furthermore, the portable information terminal 7200 can execute near field communication that is standardized communication. For example, mutual communication with a headset capable of wireless communication enables hands-free calling.

Furthermore, the portable information terminal 7200 includes the input output terminal 7206, and can perform direct data communication with another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 18E can be provided in the housing 7201 while being curved, or can be provided in the band 7203 such that it can be curved.

The portable information terminal 7200 preferably includes a sensor. As the sensor, for example, a human body sensor such as a fingerprint sensor, a pulse sensor, or a temperature sensor; a touch sensor; a pressure sensitive sensor; an acceleration sensor; or the like is preferably mounted.

FIG. 18G illustrates an example of an armband display device. A display device 7300 includes a display portion 7304 and the secondary battery of one embodiment of the present invention. In addition, the display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication that is standardized communication.

Furthermore, the display device 7300 includes an input/output terminal, and can perform direct data communication with another information terminal via a connector. In addition, charging via the input/output terminal is possible. Note that the charging operation may be performed by wireless power feeding without using the input/output terminal.

When the secondary battery of one embodiment of the present invention is used as the secondary battery included in the display device 7300, a lightweight display device with a long lifetime can be provided.

Figure 19A:
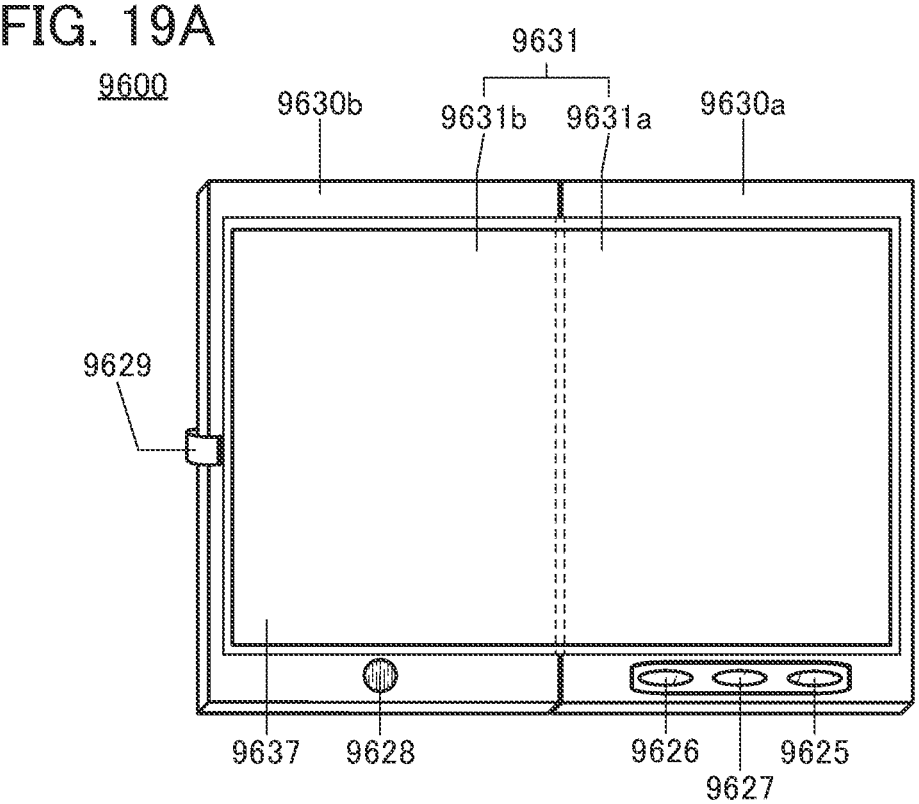
FIG. 19A, FIG. 19B, and FIG. 19C are diagrams illustrating examples of electronic devices.
Figure 19B:
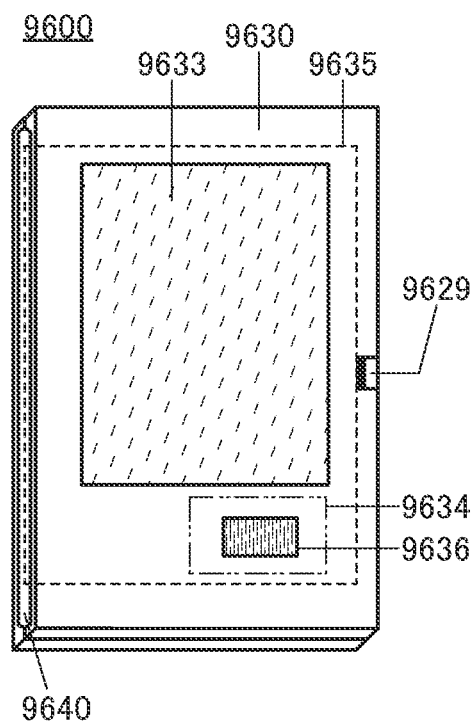
Figure 19C:
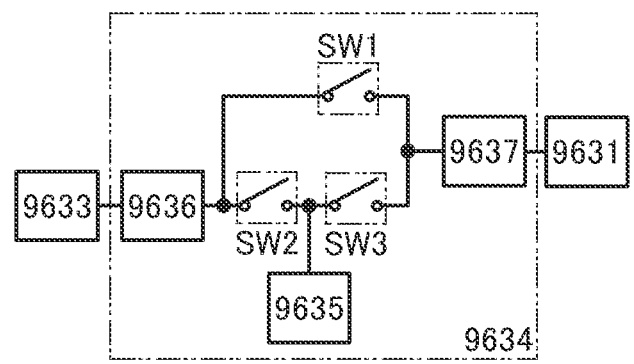
Figure 20:
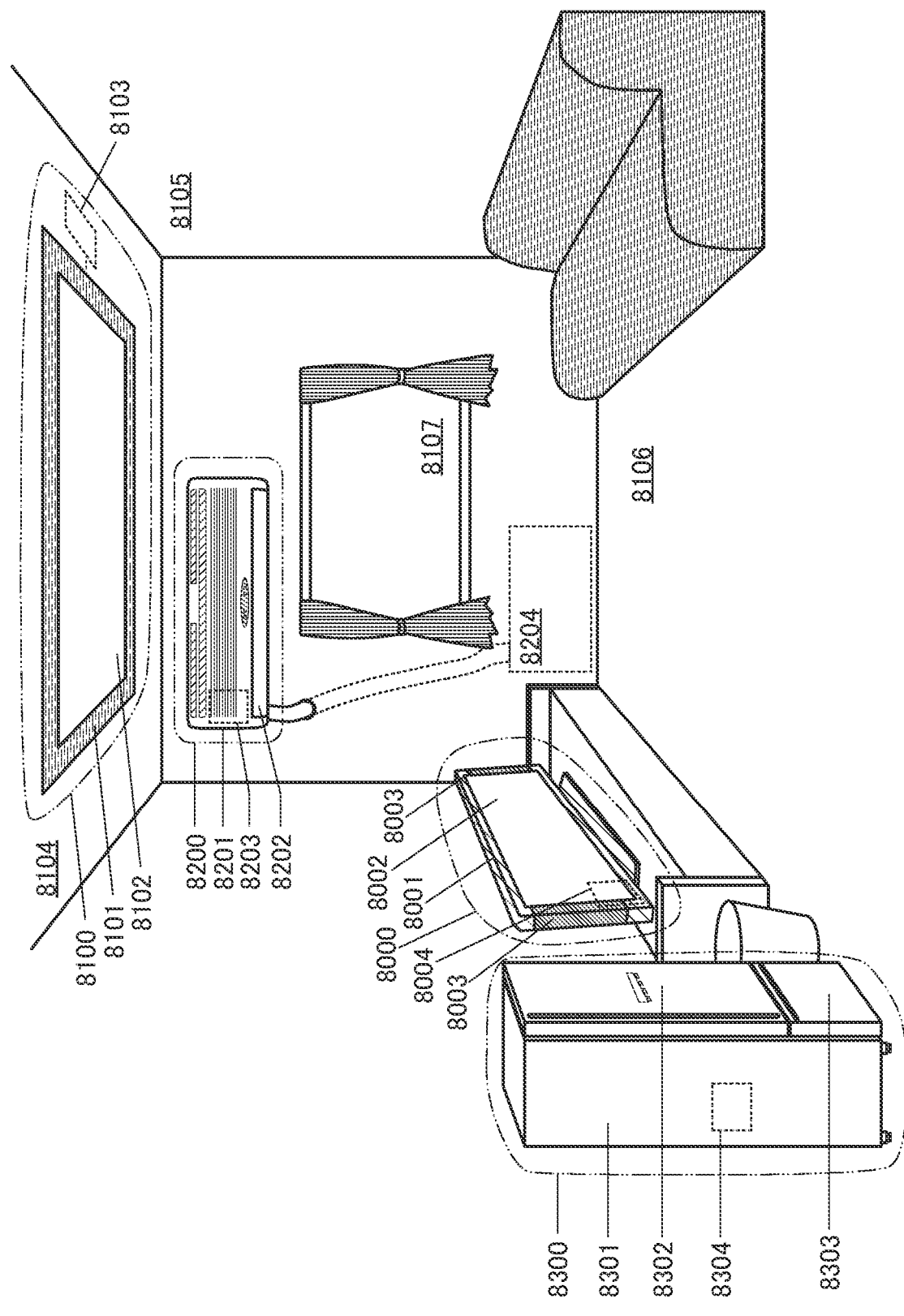
FIG. 20 is a diagram illustrating examples of electronic devices.

Examples of electronic devices each including the secondary battery with excellent cycle performance described in the above embodiment are described using FIG. 18H, FIG. 19, and FIG. 20.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight secondary batteries with stick-like shapes and high capacity are desired in consideration of handling ease for users.

FIG. 18H is a perspective view of a device called a cigarette smoking device (electronic cigarette). In FIG. 18H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharging and overdischarging of the secondary battery 7504 may be electrically connected to the secondary battery 7504. The secondary battery 7504 in FIG. 18H includes an external terminal for connection to a charger. When the electronic cigarette 7500 is held by a user, the secondary battery 7504 becomes a tip portion; thus, it is preferable that the secondary battery 7504 have a short total length and be lightweight. With the secondary battery of one embodiment of the present invention, which has high capacity and excellent cycle performance, the small and lightweight electronic cigarette 7500 that can be used for a long time over a long period can be provided.

Next, FIG. 19A and FIG. 19B illustrate an example of a tablet terminal that can be folded in half. A tablet terminal 9600 illustrated in FIG. 19A and FIG. 19B includes a housing 9630a, a housing 9630b, a movable portion 9640 connecting the housing 9630a and the housing 9630b to each other, a display portion 9631 including a display portion 9631a and a display portion 9631b, a switch 9625, a switch 9626, a switch 9627, a fastener 9629, and an operation switch 9628. By using a flexible panel for the display portion 9631, the tablet terminal can have a larger display portion. FIG. 19A illustrates the tablet terminal 9600 that is opened, and FIG. 19B illustrates the tablet terminal 9600 that is closed.

Furthermore, the tablet terminal 9600 includes a power storage unit 9635 inside the housing 9630a and the housing 9630b. The power storage unit 9635 is provided across the housing 9630a and the housing 9630b, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631a on the housing 9630a side, and data such as text or an image is displayed on the display portion 9631b on the housing 9630b side.

Furthermore, it is possible that a keyboard is displayed on the display portion 9631b on the housing 9630b side, and data such as text or an image is displayed on the display portion 9631a on the housing 9630a side. Furthermore, it is possible that a button for switching keyboard display on a touch panel is displayed on the display portion 9631 and the button is touched with a finger, a stylus, or the like to display a keyboard on the display portion 9631.

Furthermore, touch input can be performed concurrently in a touch panel region in the display portion 9631a on the housing 9630a side and a touch panel region in the display portion 9631b on the housing 9630b side.

Furthermore, the switch 9625 to the switch 9627 may function not only as an interface for operating the tablet terminal 9600 but also as an interface that can switch various functions. For example, at least one of the switch 9625 to the switch 9627 may have a function of switching power on/off of the tablet terminal 9600. For another example, at least one of the switch 9625 to the switch 9627 may have a function of switching display between a portrait mode and a landscape mode and a function of switching display between monochrome display and color display. For another example, at least one of the switch 9625 to the switch 9627 may have a function of adjusting the luminance of the display portion 9631. The luminance of the display portion 9631 can be optimized in accordance with the amount of external light in use of the tablet terminal 9600, which is detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

Furthermore, although FIG. 19A illustrates the example where the display portion 9631a on the housing 9630a side and the display portion 9631b on the housing 9630b side have substantially the same display area, there is no particular limitation on the display area of each of the display portion 9631a and the display portion 9631b; the size may be different between one and the other, and the display quality may also be different. For example, one may be a display panel that can display higher-definition images than the other.

The tablet terminal 9600 is folded in half in FIG. 19B, and the tablet terminal 9600 includes a housing 9630, a solar cell 9633, and a charge and discharge control circuit 9634 including a DCDC converter 9636. The power storage unit of one embodiment of the present invention is used as the power storage unit 9635.

Note that as described above, the tablet terminal 9600 can be folded in half, and thus can be folded when not in use such that the housing 9630a and the housing 9630b overlap with each other. The display portion 9631 can be protected owing to the folding, which can increase the durability of the tablet terminal 9600. Since the power storage unit 9635 including the secondary battery of one embodiment of the present invention has high capacity and excellent cycle performance, the tablet terminal 9600 that can be used for a long time over a long period can be provided.

Furthermore, the tablet terminal 9600 illustrated in FIG. 19A and FIG. 19B can also have a function of displaying various kinds of information (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633 attached on the surface of the tablet terminal 9600 supplies electric power to a touch panel, a display portion, a video signal processing portion, and the like. Note that the solar cell 9633 can be provided on one surface or both surfaces of the housing 9630 and the power storage unit 9635 can be charged efficiently. Note that the use of a lithium-ion battery as the power storage unit 9635 brings an advantage such as a reduction in size.

Furthermore, the structure and operation of the charge and discharge control circuit 9634 illustrated in FIG. 19B are described with reference to a block diagram in FIG. 19C. The solar cell 9633, the power storage unit 9635, the DCDC converter 9636, a converter 9637, switches SW1, SW2, and SW3, and the display portion 9631 are illustrated in FIG. 19C, and the power storage unit 9635, the DCDC converter

9636, the converter 9637, and the switches SW1 to SW3 correspond to the charge and discharge control circuit 9634 illustrated in FIG. 19B.

First, an operation example in the case where electric power is generated by the solar cell 9633 using external light is described. The voltage of electric power generated by the solar cell is raised or lowered by the DCDC converter 9636 to a voltage for charging the power storage unit 9635. Then, when the display portion 9631 is operated with the electric power from the solar cell 9633, the switch SW1 is turned on and the voltage is raised or lowered by the converter 9637 so as to be a voltage needed for the display portion 9631. When display on the display portion 9631 is not performed, the switch SW1 is turned off and the switch SW2 is turned on so that the power storage unit 9635 is charged.

Although the solar cell 9633 is described as an example of a power generation means, the power generation means is not particularly limited, and the power storage unit 9635 may be charged with another power generation means such as a piezoelectric element or a thermoelectric conversion element (Peltier element). For example, the power storage unit 9635 may be charged with a non-contact power transmission module that transmits and receives power wirelessly (without contact) for charging, or with a combination of other charging means.

FIG. 20 illustrates other examples of electronic devices. In FIG. 20, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power supply from a commercial power source or can use electric power stored in the secondary battery 8004. Thus, the display device 8000 can be used with the use of the secondary battery 8004 of one embodiment of the present invention as an uninterruptible power supply even when electric power supply cannot be received from a commercial power source due to power failure or the like.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

Note that the display device includes, in its category, all of information display devices for personal computers, advertisement displays, and the like other than TV broadcast reception.

In FIG. 20, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 20 illustrates the case where the secondary battery 8103 is provided in a ceiling 8104 on which the housing 8101 and the light source 8102 are installed, the secondary battery 8103 may be provided in the housing 8101. The lighting device 8100 can receive electric power supply from a commercial power source, or can use electric power stored in the secondary battery 8103. Thus, the lighting device 8100 can be used with the use of the secondary battery 8103 of one embodiment of the present invention as an uninterruptible power supply even when electric power supply cannot be received from a commercial power source due to power failure or the like.

Note that although the installation lighting device 8100 provided in the ceiling 8104 is illustrated in FIG. 20, the secondary battery of one embodiment of the present invention can be used for an installation lighting device provided in, for example, a wall 8105, a floor 8106, a window 8107, or the like other than the ceiling 8104, or can be used in a tabletop lighting device or the like.

Furthermore, as the light source 8102, an artificial light source that obtains light artificially by using power can be used. Specifically, an incandescent lamp, a discharge lamp such as a fluorescent lamp, and a light-emitting element such as an LED or an organic EL element are given as examples of the artificial light source.

In FIG. 20, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 20 illustrates the case where the secondary battery 8203 is provided in the indoor unit 8200, the secondary battery 8203 may be provided in the outdoor unit 8204. Alternatively, the secondary battery 8203 may be provided in both the indoor unit 8200 and the outdoor unit 8204. The air conditioner can receive electric power supply from a commercial power source, or can use electric power stored in the secondary battery 8203. Particularly in the case where the secondary battery 8203 is provided in both the indoor unit 8200 and the outdoor unit 8204, the air conditioner can be operated with the use of the secondary battery 8203 of one embodiment of the present invention as an uninterruptible power supply even when electric power supply cannot be received from a commercial power source due to power failure or the like.

Note that although FIG. 20 illustrates the split-type air conditioner composed of the indoor unit and the outdoor unit, the secondary battery of one embodiment of the present invention can also be used in an integrated air conditioner in which one housing has the function of an indoor unit and the function of an outdoor unit.

In FIG. 20, an electric refrigerator-freezer 8300 is an example of an electronic device using a secondary battery 8304 of one embodiment of the present invention. Specifically, the electric refrigerator-freezer 8300 includes a housing 8301, a door for refrigerator compartment 8302, a door for freezer compartment 8303, the secondary battery 8304, and the like. The secondary battery 8304 is provided in the housing 8301 in FIG. 20. The electric refrigerator-freezer 8300 can receive electric power supply from a commercial power source, or can use electric power stored in the secondary battery 8304. Thus, the electric refrigerator-freezer 8300 can be used with the use of the secondary battery 8304 of one embodiment of the present invention as an uninterruptible power supply even when electric power supply cannot be received from a commercial power source due to power failure or the like.

Note that among the electronic devices described above, a high-frequency heating apparatus such as a microwave oven and an electronic device such as an electric rice cooker require high power in a short time. Therefore, the tripping of a breaker of a commercial power source in use of an electronic device can be prevented by using the secondary battery of one embodiment of the present invention as an auxiliary power supply for supplying electric power which cannot be supplied enough by a commercial power source.

In addition, in a time period when electronic devices are not used, particularly when the proportion of the amount of electric power which is actually used to the total amount of electric power which can be supplied from a commercial power source (such a proportion referred to as a usage rate of electric power) is low, electric power can be stored in the secondary battery, whereby an increase in the usage rate of electric power can be reduced in a time period when the electronic devices are used. For example, in the case of the electric refrigerator-freezer 8300, electric power can be stored in the secondary battery 8304 in night time when the temperature is low and the door for refrigerator compartment 8302 and the door for freezer compartment 8303 are not opened and closed. Moreover, in daytime when the temperature is high and the door for refrigerator compartment 8302 and the door for freezer compartment 8303 are opened and closed, the usage rate of power in daytime can be kept low by using the secondary battery 8304 as an auxiliary power supply.

According to one embodiment of the present invention, the secondary battery can have excellent cycle performance and improved reliability. Furthermore, according to one embodiment of the present invention, a secondary battery with high capacity can be obtained; thus, the secondary battery itself can be made more compact and lightweight owing to the improvement in the characteristics of the secondary battery. Thus, the secondary battery of one embodiment of the present invention is incorporated in the electronic device described in this embodiment, whereby a more lightweight electronic device with a longer lifetime can be obtained. This embodiment can be implemented in combination with any of the other embodiments as appropriate.

Embodiment 6

In this embodiment, examples of vehicles each including the secondary battery of one embodiment of the present invention are described.

The use of secondary batteries in vehicles enables production of next-generation clean energy vehicles such as hybrid electric vehicles (HVs), electric vehicles (EVs), and plug-in hybrid electric vehicles (PHVs).

Figure 21A:
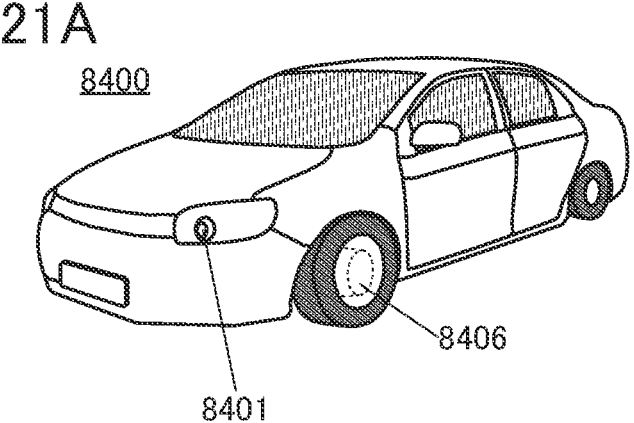
FIG. 21A, FIG. 21B, and FIG. 21C are diagrams illustrating examples of vehicles.

FIG. 21 illustrates examples of vehicles each including the secondary battery of one embodiment of the present invention. An automobile 8400 illustrated in FIG. 21A is an electric vehicle that runs on an electric motor as a power source. Alternatively, the automobile 8400 is a hybrid electric vehicle capable of driving using either an electric motor or an engine with an appropriate selection. The use of one embodiment of the present invention can achieve a high-mileage vehicle. The automobile 8400 includes the secondary battery. As the secondary battery, the modules of the secondary batteries illustrated in FIG. 6C and FIG. 6D may be arranged to be used in a floor portion in the automobile. Alternatively, a battery pack in which a plurality of secondary batteries illustrated in FIG. 9 are combined may be placed in the floor portion in the automobile. The secondary battery is used not only for driving an electric motor 8406, but also for supplying electric power to a light-emitting device such as a headlight 8401 or a room light (not illustrated).

Furthermore, the secondary battery can also supply electric power to a display device included in the automobile 8400, such as a speedometer or a tachometer. Furthermore, the secondary battery can supply electric power to a semiconductor device included in the automobile 8400, such as a navigation system.

Figure 21B:
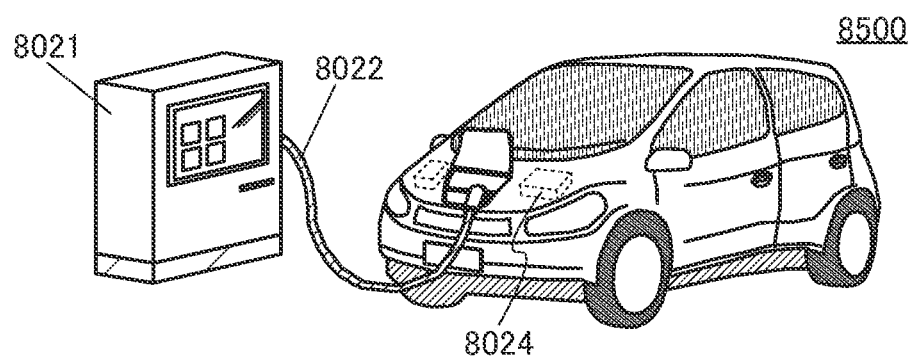

An automobile 8500 illustrated in FIG. 21B can be charged when a secondary battery included in the automobile 8500 is supplied with power through external charging equipment by a plug-in system, a contactless power feeding system, or the like. FIG. 21B illustrates a state where a secondary battery 8024 incorporated in the automobile 8500 is charged from a ground installation type charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with a plug-in technique, the secondary battery 8024 incorporated in the automobile 8500 can be charged by power supply from the outside. The charging can be performed by converting AC electric power into DC electric power through a converter, such as an AC-DC converter.

Although not illustrated, the vehicle may include a power receiving device so that it can be charged by being supplied with electric power from an above-ground power transmitting device in a contactless manner. In the case of the contactless power feeding system, by incorporating a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the vehicle to charge the secondary battery while the vehicle is stopped or driven. To supply electric power in such a contactless manner, an electromagnetic induction method or a magnetic resonance method can be used.

Figure 21C:
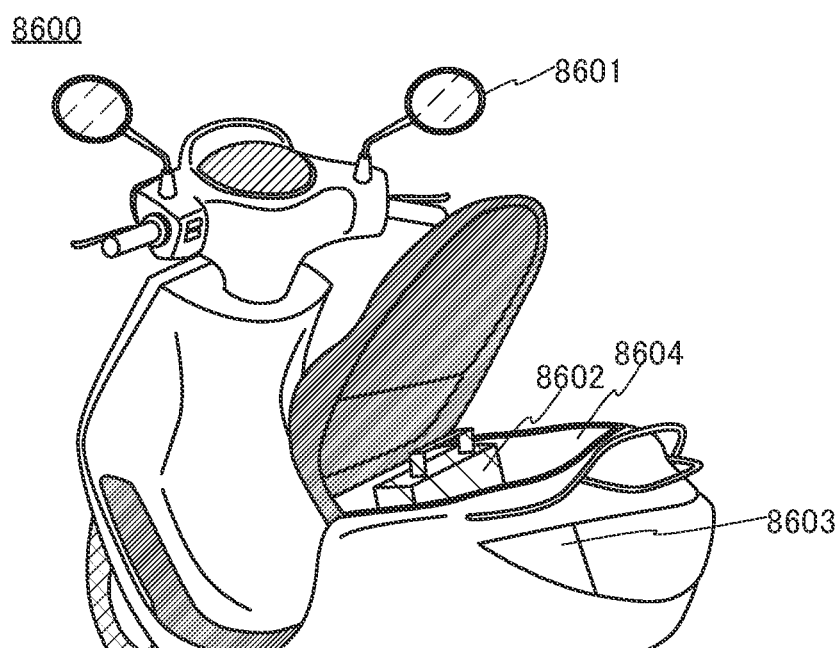

Furthermore, FIG. 21C is an example of a motorcycle including the secondary battery of one embodiment of the present invention. A scooter 8600 illustrated in FIG. 21C includes a secondary battery 8602, side mirrors 8601, and direction indicators 8603. The secondary battery 8602 can supply electricity to the direction indicators 8603.

Furthermore, in the scooter 8600 illustrated in FIG. 21C, the secondary battery 8602 can be stored in an under-seat storage 8604. The secondary battery 8602 can be stored in the under-seat storage 8604 even when the under-seat storage 8604 is small. The secondary battery 8602 is detachable; thus, the secondary battery 8602 is carried indoors when charged, and is stored before the motor scooter is driven.

According to one embodiment of the present invention, the secondary battery can have improved cycle performance and the secondary battery can have higher capacity. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power supply source for products other than the vehicle. In such a case, the use of a commercial power source can be avoided at peak time of electric power demand, for example. Avoiding the use of a commercial power source at peak time of electric power demand can contribute to energy saving and a reduction in carbon dioxide emissions. Moreover, the secondary battery with excellent cycle performance can be used over a long period; thus, the use amount of rare metals such as cobalt can be reduced.

This embodiment can be implemented in combination with the other embodiments as appropriate.

Embodiment 7

In this embodiment, examples of wearable devices in which a secondary battery including the positive electrode active material of one embodiment of the present invention can be provided are described.

Figure 22A:
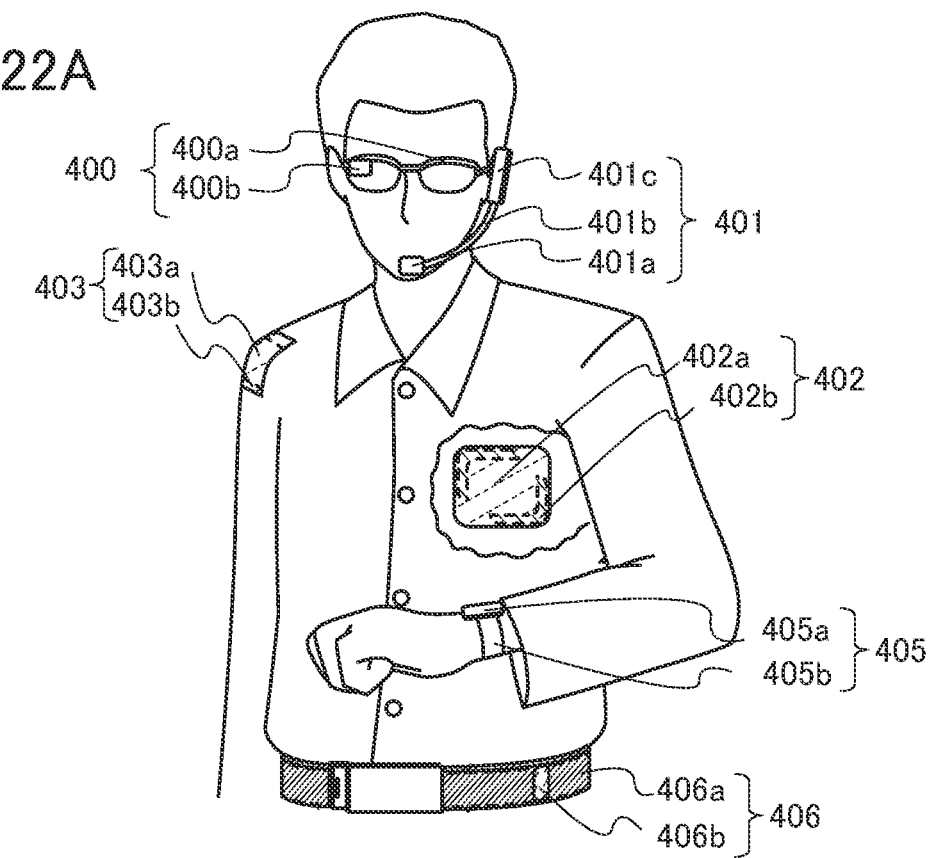
FIG. 22A, FIG. 22B, and FIG. 22C are diagrams illustrating examples of electronic devices.

FIG. 22A illustrates examples of wearable devices. A secondary battery is used as a power source of a wearable device. To have improved water resistance in daily use or outdoor use by a user, a wearable device is desirably capable of being charged wirelessly as well as being charged with a wire whose connector portion for connection is exposed.

For example, a secondary battery can be incorporated in a glasses-type device 400 as illustrated in FIG. 22A. The glasses-type device 400 includes a frame 400a and a display portion 400b. A secondary battery is incorporated in a temple of the frame 400a having a curved shape, whereby the glasses-type device 400 can be lightweight, have a well-balanced weight, and be used continuously for a long time.

Furthermore, the secondary battery can be incorporated in a headset-type device 401.

The headset-type device 401 includes at least a microphone portion 401a, a flexible pipe 401b, and an earphone portion 401c. The secondary battery can be provided in the flexible pipe 401b or the earphone portion 401c.

The secondary battery can also be incorporated in a device 402 that can be directly attached to a human body. A secondary battery 402b can be provided in a thin housing 402a of the device 402.

The secondary battery can be incorporated in a device 403 that can be attached to clothing. A secondary battery 403b can be provided in a thin housing 403a of the device 403.

Furthermore, the secondary battery can be incorporated in a belt-type device 406. The belt-type device 406 includes a belt portion 406a and a wireless power feeding and receiving portion 406b, and the secondary battery can be incorporated in the belt portion 406a.

The secondary battery can also be incorporated in a watch-type device 405. The watch-type device 405 includes a display portion 405a and a belt portion 405b, and the secondary battery can be provided in the display portion 405a or the belt portion 405b.

The display portion 405a can display various kinds of information such as reception information of an e-mail or an incoming call in addition to time.

Since the watch-type device 405 is a type of wearable device that is directly wrapped around an arm, a sensor that measures pulse, blood pressure, or the like of a user can be incorporated therein. Data on the exercise quantity and health of the user can be stored to be used for health maintenance.

A watch-type device 405 illustrated in FIG. 22A is described in detail below.

Figure 22B:
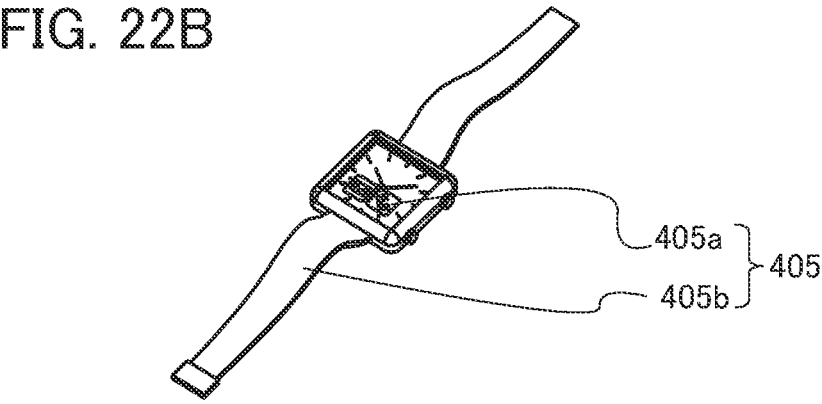

FIG. 22B illustrates a perspective view of the watch-type device 405 that is detached from an arm.

Figure 22C:
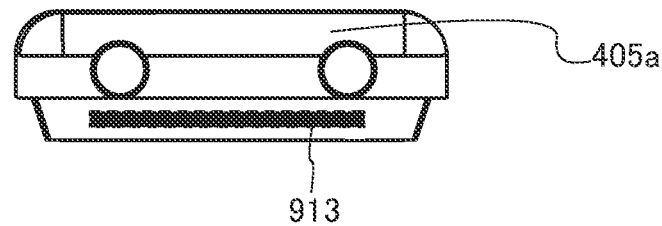

FIG. 22C illustrates a side view. FIG. 22C illustrates a state where the secondary battery 913 is incorporated in the watch-type device 405. The secondary battery 913, which is small and lightweight, is provided at a position overlapping with the display portion 405a.

This embodiment can be implemented in appropriate combination with the other embodiments.

Example 1

In this example, materials used in forming positive electrode active materials were inspected using the inspection by DSC described in the above embodiment.

Using the method illustrated in FIG. 1A, Sample 1 which is a mixture of the material 91 and the material 92 was formed and inspected. As the material 91 and the material 92, lithium fluoride and magnesium fluoride were used, respectively. The molar ratio of lithium included in lithium fluoride was set to 0.33 times that of magnesium included in magnesium fluoride. DSC was used as the inspection method.

Next, using the method illustrated in FIG. 1C, the material 91 to the material 94 were inspected. As the material 91, the material 92, the material 93, and the material 94, lithium fluoride, magnesium fluoride, nickel hydroxide, and aluminum hydroxide were used, respectively. A mixture of the material 91, the material 92, the material 93, and the material 94 is formed as Sample 2. In Sample 2, the molar ratio of lithium included in lithium fluoride, the molar ratio of nickel included in nickel hydroxide, and the molar ratio of aluminum included in aluminum hydroxide were set to 0.33 times, 0.5 times, and 0.5 times, respectively, that of magnesium included in magnesium fluoride. DSC was used as the inspection method.

Figure 23A:
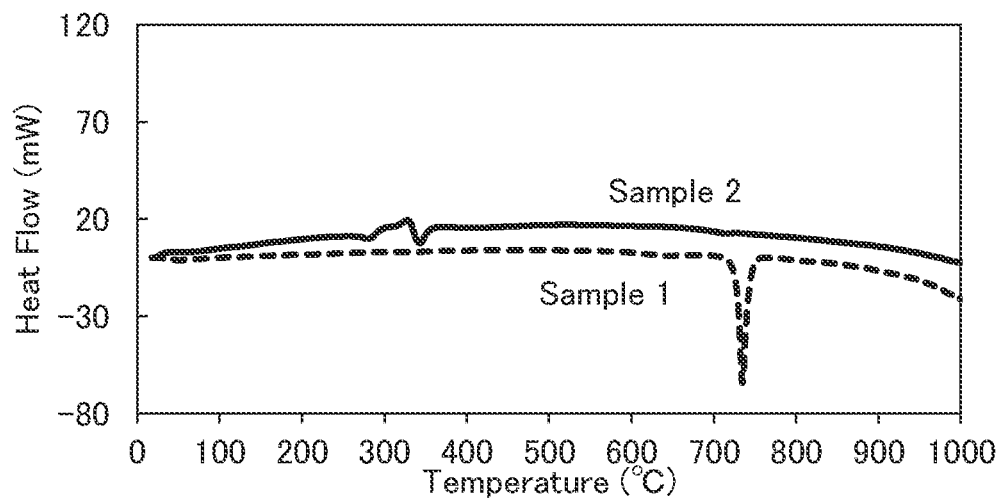
FIG. 23A, FIG. 23B, and FIG. 23C are graphs showing results of evaluation with DSC.

Temperature-heat flow curves of Sample 1 and Sample 2 by DSC are shown in FIG. 23A. Sample 1 had a peak suggesting an endothermic reaction in the vicinity of 730° C. in the observed result, from which it is conceivable that a eutectic reaction occurs between lithium fluoride and magnesium fluoride. In contrast, Sample 2 does not show a significant peak suggesting an endothermic reaction in the vicinity of 730° C. Therefore, either the material 93 or the material 94 is probably likely to inhibit the endothermic reaction.

Figure 23B:
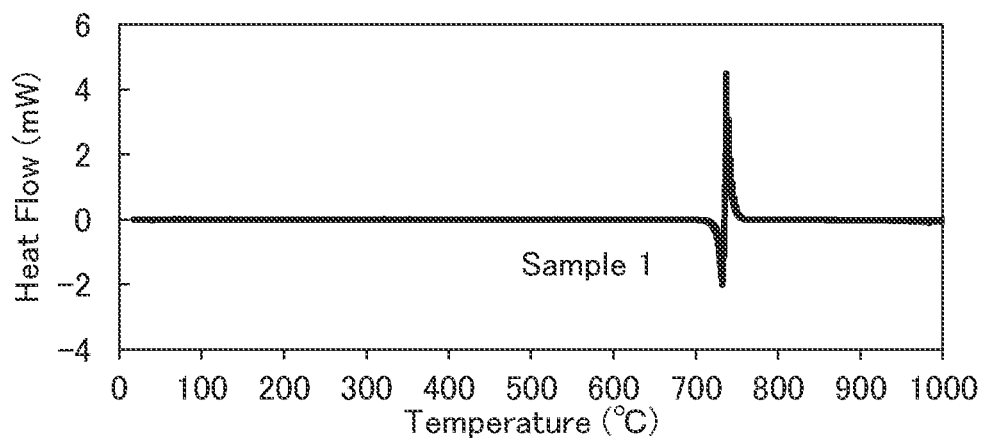
Figure 23C:
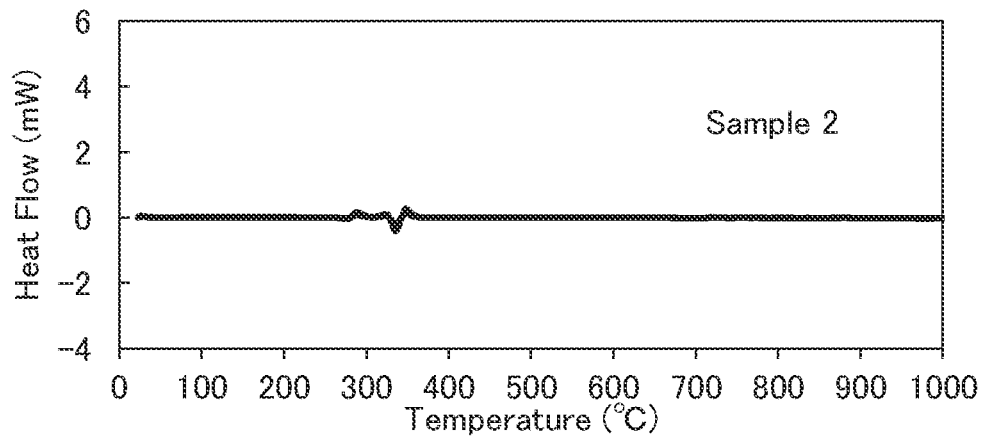

FIG. 23B and FIG. 23C show a differential waveform of the temperature-heat flow curve of Sample 1 by DSC and a differential waveform of the temperature-heat flow curve of Sample 2 by DSC, respectively. Sample 1 had a local maximum point and a local minimum point in the vicinity of 730° C. where the peak was observed in the temperature-heat flow curve. In contrast, Sample 2 showed no significant peak or an extremely weak peak.

Figure 24A:
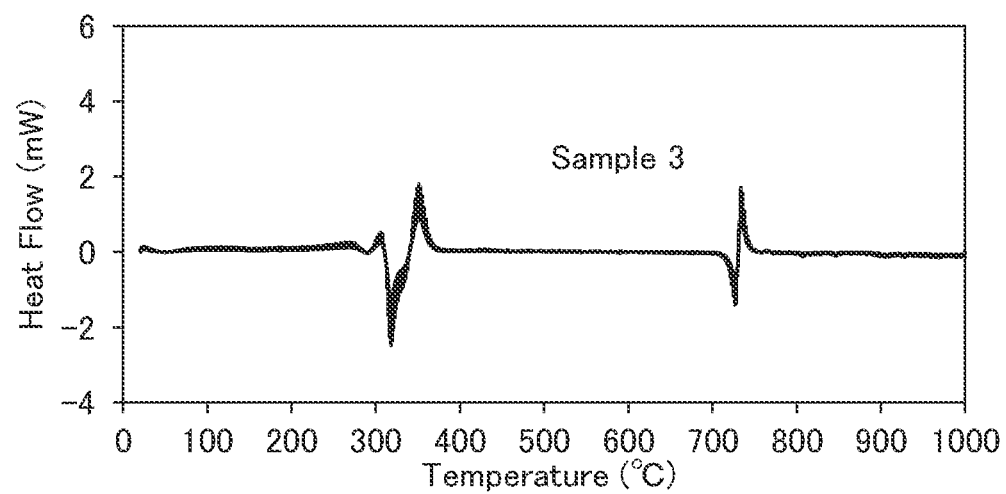
FIG. 24A and FIG. 24B are graphs showing results of evaluation with DSC.
Figure 24B:
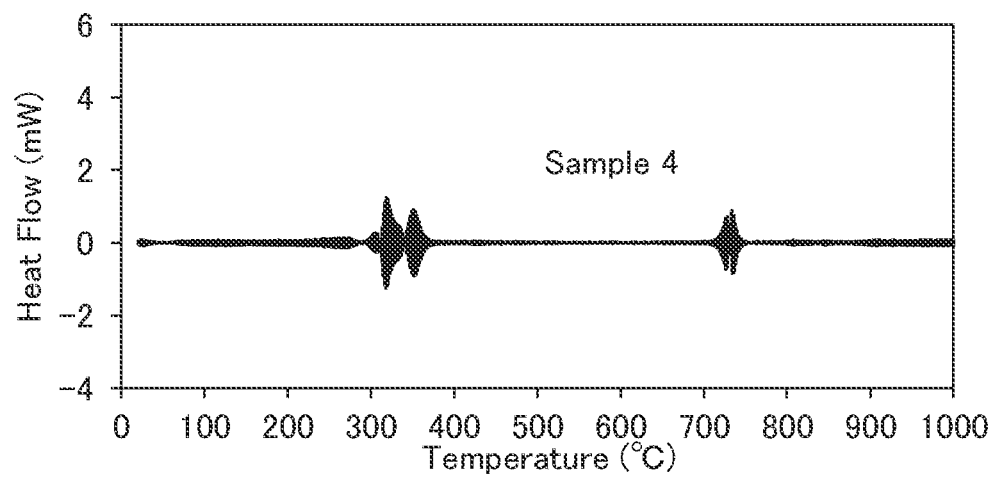

Next, a mixture of Sample 1 and nickel hydroxide was formed as Sample 3, and a mixture of Sample 1 and aluminum hydroxide was formed as Sample 4. Each of the samples was subjected to DSC. In Sample 3, the molar ratio of nickel included in nickel hydroxide was set to 0.5 times that of magnesium included in magnesium fluoride. In Sample 4, the molar ratio of aluminum included in aluminum hydroxide was set to 0.5 times that of magnesium included in magnesium fluoride. A differential waveform of Sample 3 by DSC and a differential waveform of Sample 4 by DSC are shown in FIG. 24A and FIG. 24B, respectively. A peak suggesting an endothermic reaction in the vicinity of 730° C. is smaller in Sample 4 than in Sample 3. In addition, in Sample 4, a peak suggesting an exothermic reaction is observed in the vicinity of 500° C., which shows a possibility of a reaction such as crystallization or generation of a compound by a reaction with magnesium or the like. An inhibitory factor of the endothermic reaction between lithium fluoride and magnesium fluoride is conceivably aluminum hydroxide.

It was suggested that a positive electrode active material with higher quality can be obtained in the case where the method of FIG. 2B or FIG. 2C is used as the method for forming a positive electrode active material, compared with the case where the method of FIG. 2A is used.

Figure 25:
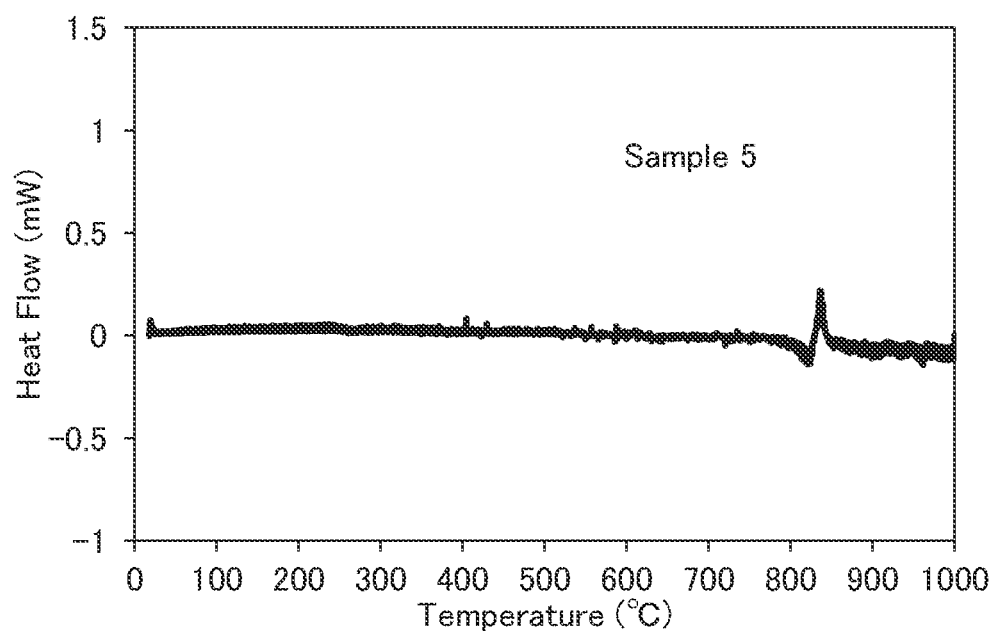
FIG. 25 is a graph showing a result of evaluation with DSC.

Next, lithium cobalt oxide serving as the metal oxide 95 was further added to and mixed with the mixture of the material 91 and the material 92 (Sample 1) to form Sample 5. FIG. 25 shows a differential waveform of Sample 5 by DSC. It was found that the addition of lithium cobalt oxide positively shifts the peak suggesting the endothermic reaction observed by DSC, by approximately 100° C. from the vicinity of 730° C.

Example 2

In this example, positive electrode active materials were formed using the formation methods described in the above embodiment, and secondary batteries were fabricated in order to evaluate characteristics of positive electrodes using the formed positive electrode active materials.

Three secondary batteries, which were Cell 1, Cell 2, and Cell 3, were fabricated.

As the positive electrode active material used in Cell 1, the positive electrode active material was formed using the method illustrated in FIG. 2B. More specifically, the method illustrated in FIG. 3 was used. As the material 91 and the material 92, lithium fluoride and magnesium fluoride were used, respectively. As for the molar ratio between the material 91 and the material 92, Sample 1 was referred to. The weight of the powder of the mixture 904 was 30 g.

As the positive electrode active materials used in Cell 2 and Cell 3, the positive electrode active material was formed using the method illustrated in FIG. 2A. As the material 91, the material 92, the material 93, and the material 94, lithium fluoride, magnesium fluoride, nickel hydroxide, and aluminum hydroxide were used, respectively. As for the molar ratio between the material 91 and the material 92, Sample 1 was referred to. The molar ratio of nickel included in nickel hydroxide was set to 0.5 times that of magnesium included in magnesium fluoride, and the molar ratio of aluminum included in aluminum hydroxide was set to 0.5 times that of magnesium included in magnesium fluoride. The total weight of the powders of the material 91 to the material 94 was 30 g in Cell 2 and 2.4 g in Cell 3.

As Cell 1, Cell 2, and Cell 3, CR2032 coin-type secondary batteries (diameter: 20 mm, height: 3.2 mm) were fabricated.

A positive electrode formed by applying, to a current collector, slurry in which the positive electrode active material formed in the above manner, acetylene black (AB), and polyvinylidene fluoride (PVDF) were mixed at the positive electrode active material: AB:PVDF=95:3:2 (weight ratio) was used.

A lithium metal was used as a counter electrode.

As an electrolyte included in an electrolyte solution, 1 mol/L lithium hexafluorophosphate (LiPF$_6$) was used, and as the electrolyte solution, an electrolyte solution in which ethylene carbonate (EC) and diethyl carbonate (DEC) at EC:DEC=3:7 (volume ratio) and vinylene carbonate (VC) at 2 wt % were mixed was used.

As a separator, 25-μm-thick polypropylene was used.

A positive electrode can and a negative electrode can formed using stainless steel (SUS) were used.

[Cycle Performance]

The CCCV charge (0.5 C, 4.6 V, termination current: 0.05 C) and the CC discharge (0.5 C, 2.5 V) were repeatedly performed on the fabricated secondary batteries at 45° C., and the cycle performance was evaluated.

Figure 26:
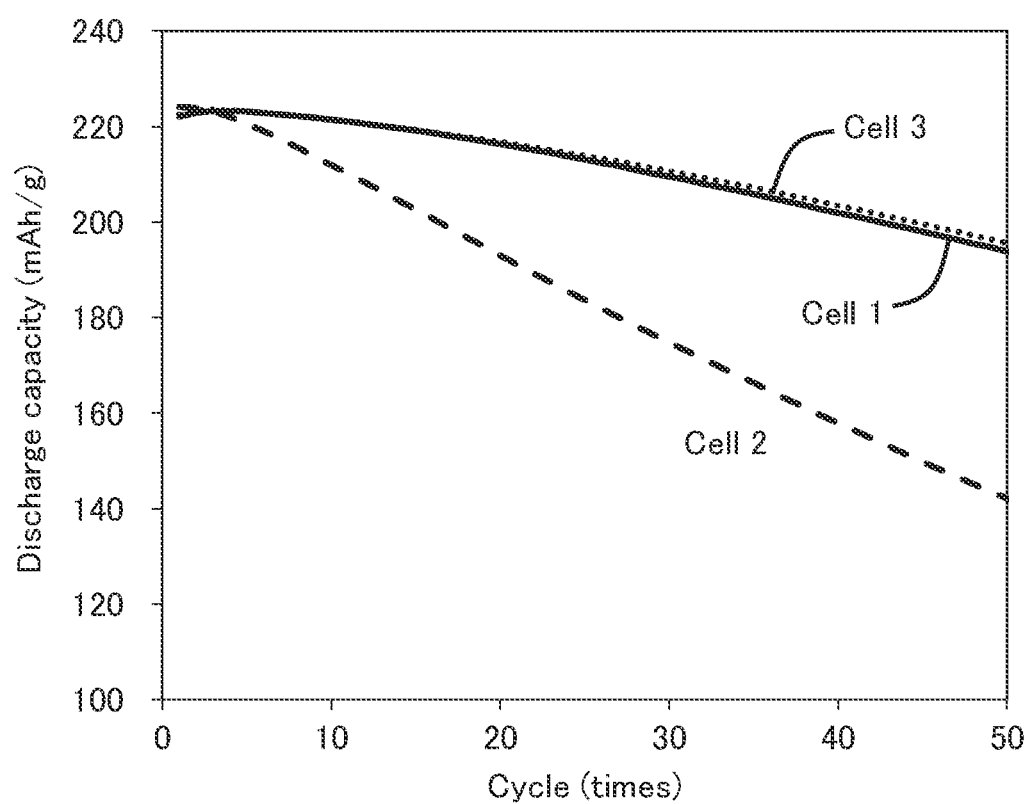
FIG. 26 is a graph showing cycle performance of secondary batteries.
Figure 27:
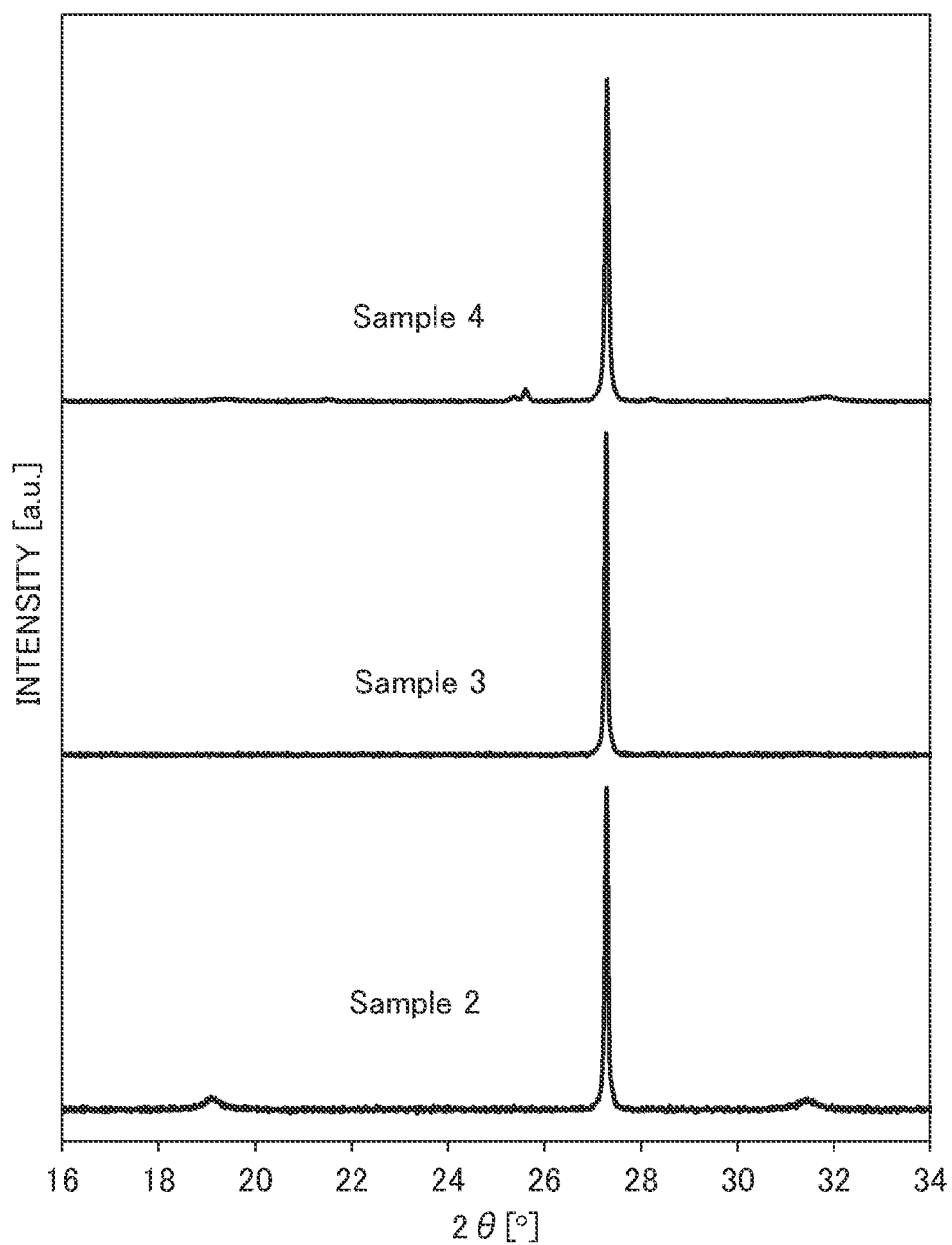
FIG. 27 is a graph showing XRD evaluation results.
Figure 28:
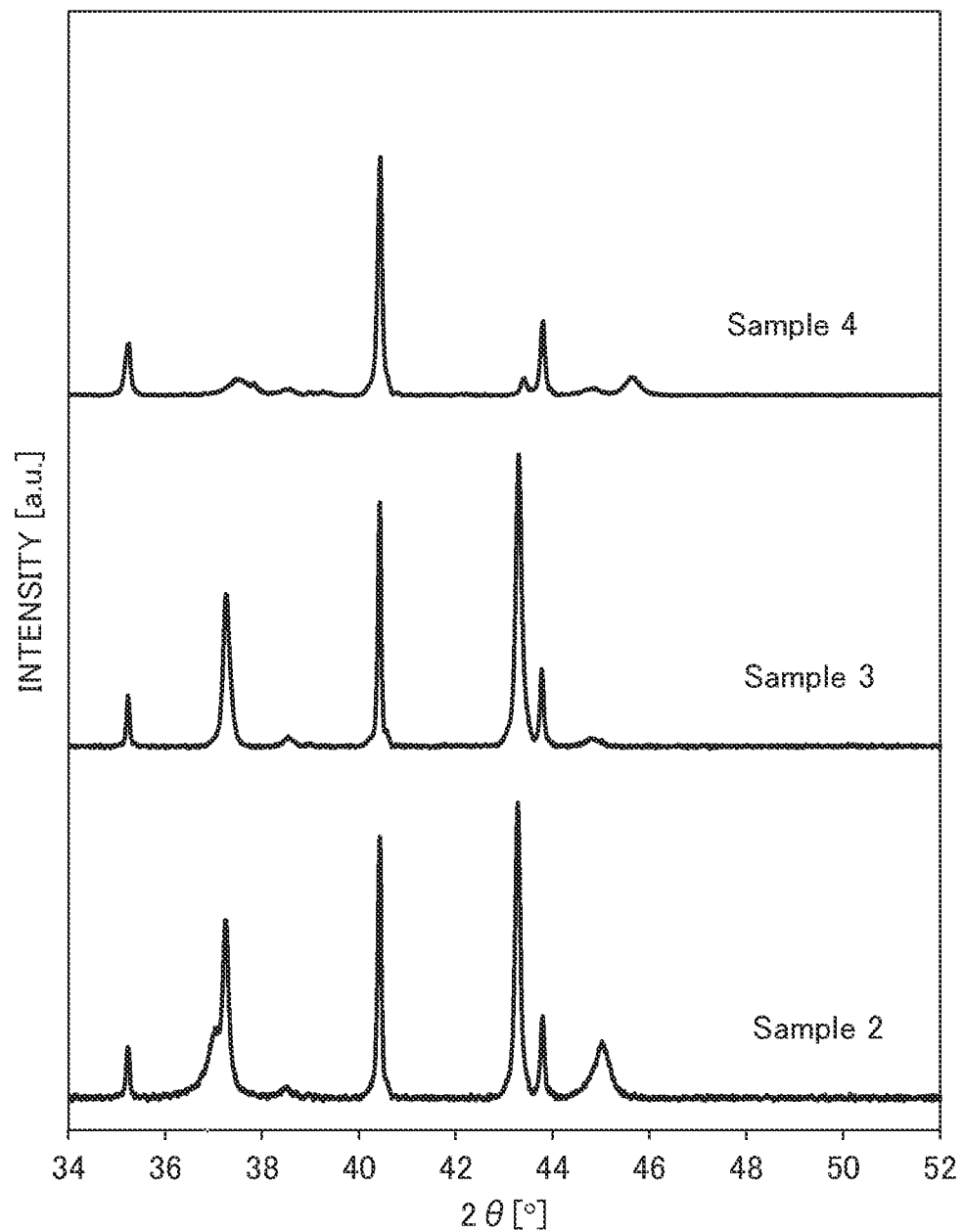
FIG. 28 is a graph showing XRD evaluation results.
Figure 29:
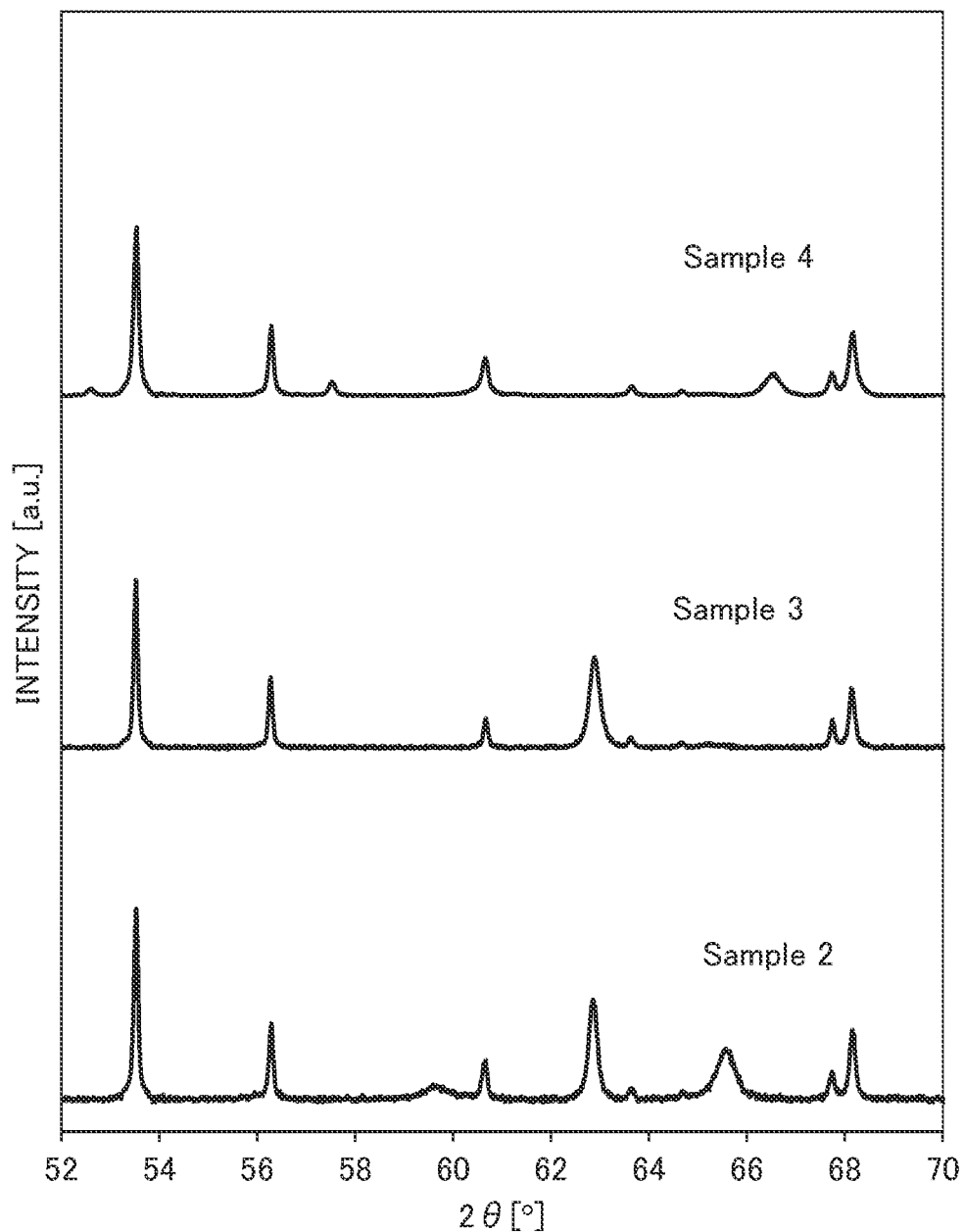
FIG. 29 is a graph showing XRD evaluation results.
Figure 30:
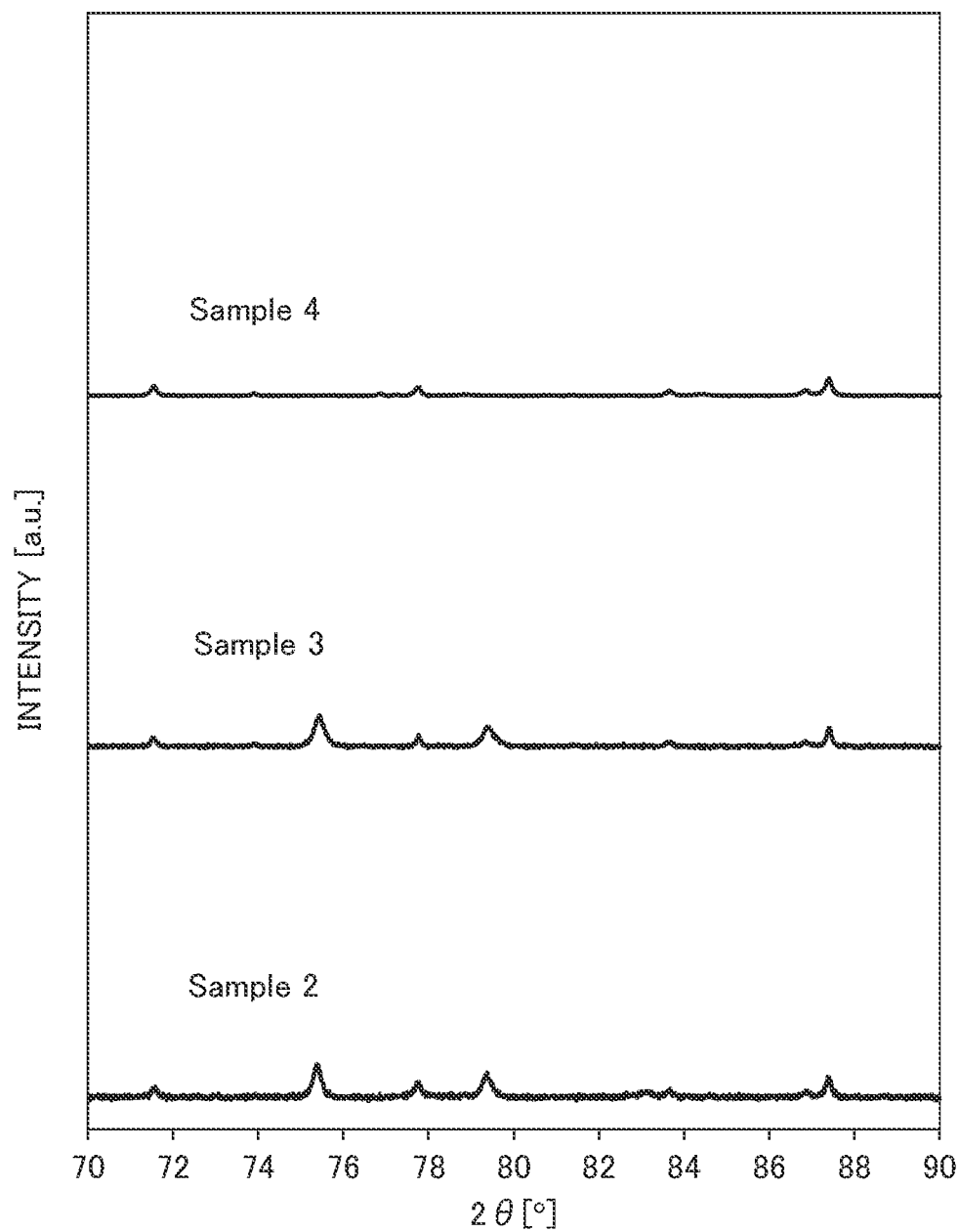
FIG. 30 is a graph showing XRD evaluation results.

FIG. 26 shows the cycle performance result for each of the secondary batteries. When focusing on the aluminum hydroxide whose tendency to inhibit the eutectic reaction between lithium fluoride and magnesium fluoride was suggested, Cell 1, which includes the positive electrode active material formed by the formation method of FIG. 3, that is, the formation method where aluminum hydroxide is added at the time of forming the mixture to be subjected to the second annealing, showed cycle performance superior to the cell formed using the formation method where aluminum hydroxide is added at the first annealing. Furthermore, even in the case where aluminum hydroxide was added at the first annealing, when the weight of the powder at the time of annealing was light, superior performance was obtained.

Example 3

In this example, materials used in forming positive electrode active materials were inspected using the inspection by XRD described in the above embodiment.

Sample 2, Sample 3, and Sample 4 fabricated in the above example were each subjected to heat treatment at 850° C. in an oxygen atmosphere, and then evaluation was performed by XRD. The XRD spectra are shown in FIG. 27, FIG. 28, FIG. 29, and FIG. 30. In FIG. 27 to FIG. 30, the vertical axis represents the intensity of the spectra (INTENSITY), and the horizontal axis represents 2θ. The graphs in FIG. 27 to FIG. 30 have differing range of 2θ, which is indicated by the horizontal axis.

For the XRD measurement, D8 ADVANCE manufactured by Bruker Corporation was used. XRD measurement was performed under the following measurement conditions where the X-ray output was 40 kV, 40 mA, the range of the scanning angle was 15° to 90°, the measurement interval was 0.01°, the scanning rate was 0.5 sec/step, and the sample was rotated at 15 rpm.

On the obtained XRD patterns, background removal and Kα2 removal were performed using DIFFRAC.EVA (XRD data analysis software manufactured by Bruker Corporation).

The peak positions, half widths, and peak intensities of the main peaks based on the obtained results of XRD on Sample 2 are shown in Table 1. Here, the peak position refers to the maximum value of the peak. Although not shown in Table 1, an intensity of approximately 37 was observed at 37.03° position.

TABLE 1

| peak position (°) | half width (°) | peak intensity (counts per second) |
| --- | --- | --- |
| 19.08 | 0.406 | 6.63 |
| 27.30 | 0.076 | 168 |
| 31.44 | 0.307 | 5.9 |
| 35.23 | 0.087 | 26.9 |
| 37.25 | 0.149 | 94 |
| 38.53 | 0.261 | 5.76 |
| 40.43 | 0.088 | 138 |
| 43.28 | 0.122 | 156 |
| 43.79 | 0.091 | 43 |
| 45.03 | 0.369 | 29.5 |
| 53.53 | 0.103 | 100 |
| 56.29 | 0.099 | 40 |
| 59.60 | 0.435 | 7.96 |
| 60.65 | 0.122 | 20.6 |
| 62.86 | 0.208 | 52.6 |
| 63.64 | 0.128 | 5.87 |

TABLE 1-continued

| peak position (°) | half width (°) | peak intensity (counts per second) |
|---|---|---|
| 64.68 | 0.078 | 4.61 |
| 65.57 | 0.41 | 26.5 |
| 67.74 | 0.113 | 14.4 |
| 68.16 | 0.132 | 36.5 |
| 71.57 | 0.149 | 5.75 |
| 75.38 | 0.217 | 17.5 |
| 77.77 | 0.175 | 8.27 |
| 79.36 | 0.243 | 12.6 |
| 83.11 | 0.358 | 3.34 |
| 83.67 | 0.102 | 4.63 |
| 86.85 | 0.148 | 3.67 |
| 87.38 | 0.151 | 10.3 |

Peaks at 2θ of 19.08°, 31.44°, 59.60°, and the like that probably correspond to $MgAl_{(2-x)}Ni_xO_4$ (x is greater than or equal to 0 and less than or equal to 2) with a spinel structure were observed from Sample 2. These peaks had peak intensities that were 0.05 times, 0.04 times, and 0.06 times that of the peak at 40.43°.

From the results in FIG. 27 to FIG. 30 and Table 1, it is probable that a product was generated by a reaction between magnesium in magnesium fluoride and aluminum in aluminum hydroxide. In addition, this generation of the product may have possibly weaken the eutectic reaction between lithium fluoride and magnesium fluoride.

Next, XRD measurement was performed on the positive electrode active material used in Cell 2 described in Example 2. The XRD spectra are shown in FIG. 43A, FIG. 43B, FIG. 44A, and FIG. 44B. In FIG. 43A, FIG. 43B, FIG. 44A, and FIG. 44B, the vertical axis represents the intensity of the spectrum (INTENSITY), and the horizontal axis represents 2θ. The graphs in FIG. 43A, FIG. 43B, FIG. 44A, and FIG. 44B have differing range of 2θ, which is indicated by the horizontal axis.

For the XRD measurement, D8 ADVANCE manufactured by Bruker Corporation was used. XRD measurement was performed under the following measurement conditions where the X-ray output was 40 kV, 40 mA, the range of the scanning angle was 15° to 90°, the measurement interval was 0.01°, the scanning rate was 5 sec/step, and the sample was rotated at 15 rpm.

On the obtained XRD patterns, background removal and Kα2 removal were performed using DIFFRAC.EVA (XRD data analysis software manufactured by Bruker Corporation).

The peak positions, half widths, and peak intensities of the main peaks based on the obtained results of XRD are shown in Table 2. Here, the peak position refers to the maximum value of the peak.

TABLE 2

| peak position (°) | half width (°) | peak intensity (count per second) |
|---|---|---|
| 18.966 | 0.046 | 4105 |
| 37.43 | 0.05 | 173 |
| 38.434 | 0.044 | 273 |
| 39.099 | 0.05 | 68.4 |
| 45.256 | 0.054 | 367 |
| 49.47 | 0.053 | 59.3 |
| 59.145 | 0.045 | 75.9 |
| 59.628 | 0.059 | 68.5 |
| 65.449 | 0.061 | 83.5 |
| 66.369 | 0.058 | 63.2 |
| 69.709 | 0.063 | 45.1 |

TABLE 2-continued

| peak position (°) | half width (°) | peak intensity (count per second) |
|---|---|---|
| 78.507 | 0.058 | 11.9 |
| 78.739 | 0.065 | 11.6 |
| 79.363 | 0.064 | 15.2 |
| 79.787 | 0.073 | 5.44 |
| 82.276 | 0.057 | 80.6 |
| 83.96 | 0.073 | 29.3 |
| 85.807 | 0.074 | 21 |
| 87.072 | 0.073 | 6.97 |

The peaks suggesting a spinel structure, which were suggested above by XRD on Sample 2, were not clearly observed. As described in Embodiment 1, the peaks suggesting a spinel structure are sometimes difficult to observe because of a strong peak derived from the metal oxide 95.

Example 4

In this example, a positive electrode active material was formed by the method illustrated in FIG. 2B, that is more specifically the method illustrated in FIG. 3, and initial charge and discharge characteristics, cycle performance under high voltages, cycle performance under high temperatures, and continuous charge characteristics were evaluated.

A positive electrode active material formed using the method illustrated in FIG. 3 so that the molar concentrations of nickel, aluminum, and magnesium can be 0.005, 0.005, and 0.01 when the number of cobalt atoms included in lithium cobalt oxide is 1 was referred to as Sample 6. The mixing ratio between magnesium fluoride and lithium fluoride was $LiF:MgF_2=1:3$ (molar ratio). The first annealing (S34 in FIG. 3) was performed at 900° C. for 20 hours, and the second annealing (S56 in FIG. 3) was performed at 850° C. for 10 hours; the annealings were both performed in an oxygen atmosphere (flow rate of oxygen gas: 10 L/min).

Magnesium fluoride and lithium fluoride were added to lithium cobalt oxide, and annealing was performed once to obtain a positive electrode active material, which was referred to as Sample 7. When the number of cobalt atoms included in lithium cobalt oxide is 1, the molar concentration of magnesium was adjusted to 0.005. The mixing ratio between magnesium fluoride and lithium fluoride was $LiF:MgF_2=1:3$ (molar ratio). The annealing was performed at 900° C. for 20 hours in an oxygen atmosphere (purging with an oxygen gas was performed on a heating furnace before the annealing).

Lithium cobalt oxide which was subjected to neither addition of other elements nor annealing was referred to as Sample 8 (comparative example).

Coin cells were fabricated using the positive electrode active materials of Sample 6 to Sample 8.

The mixing ratio among the positive electrode active material, the conductive additive, and the binder, the electrolyte, the electrolyte solution, the separator, the positive electrode can, and the negative electrode can were similar to those of Example 2.

<Initial Charge and Discharge Characteristics and Cycle Performance at Charge Voltages of 4.60 V, 4.62 V, 4.64 V, and 4.66 V>

Cycle performance of the fabricated coin cells were evaluated at charge voltages of 4.60 V, 4.62 V, 4.64 V, and 4.66 V. Specifically, the CCCV charge (100 mA/g, various voltages, termination current: 10 mA/g) and the CC discharge (100 mA/g, termination voltage: 2.5 V) were repeatedly performed at 25° C. and 45° C.

Figure 31A:
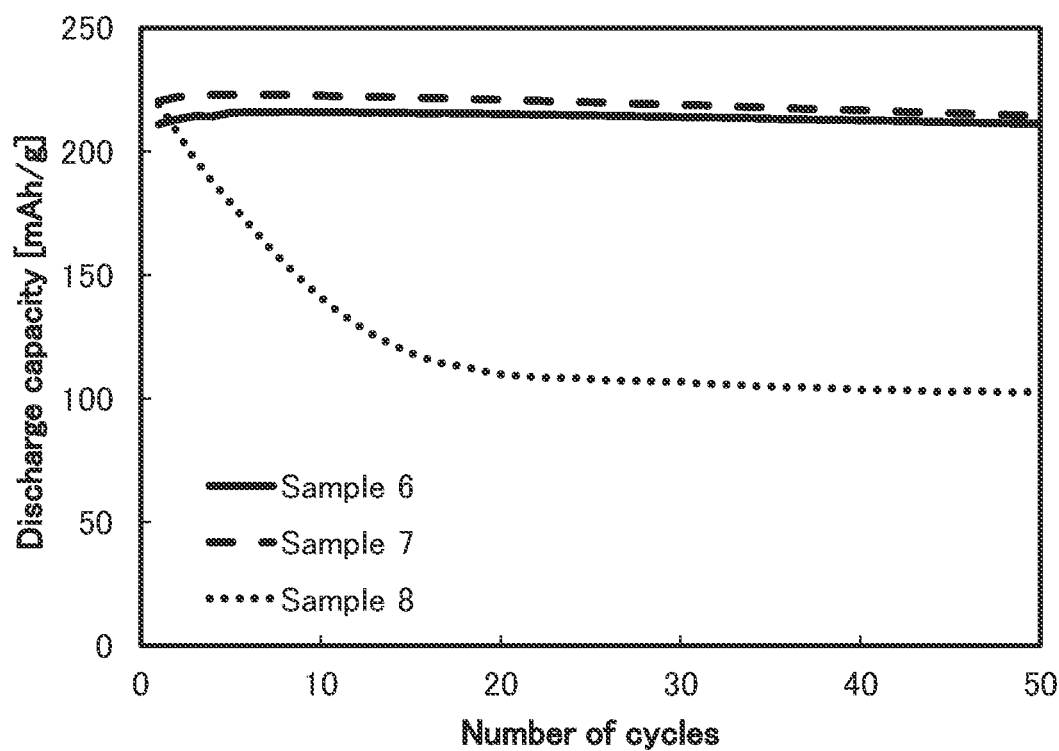
FIG. 31A and FIG. 31B are graphs showing cycle performance of secondary batteries at a charge voltage of 4.60 V.
Figure 31B:
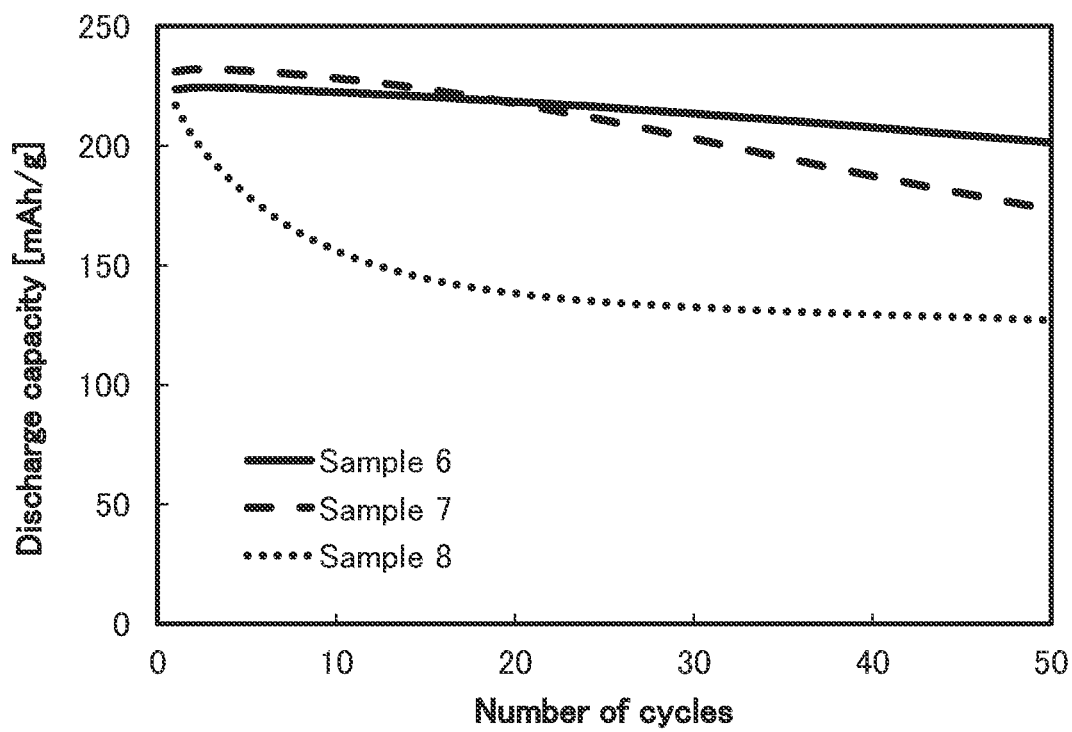
Figure 32A:
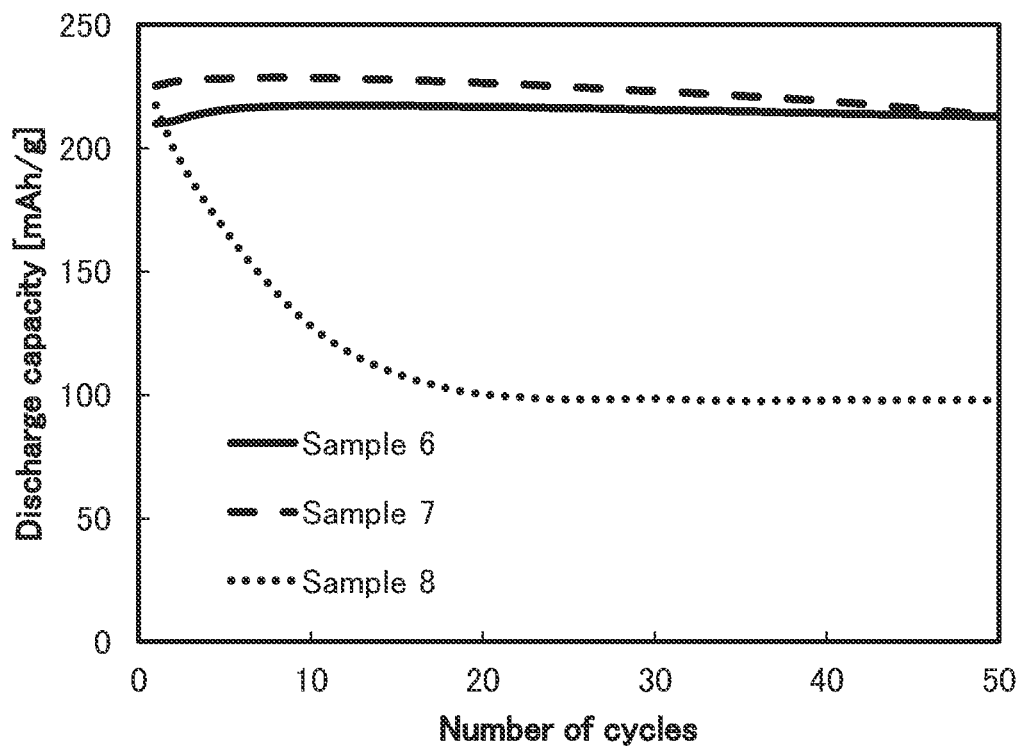
FIG. 32A and FIG. 32B are graphs showing cycle performance of secondary batteries at a charge voltage of 4.62 V.
Figure 32B:
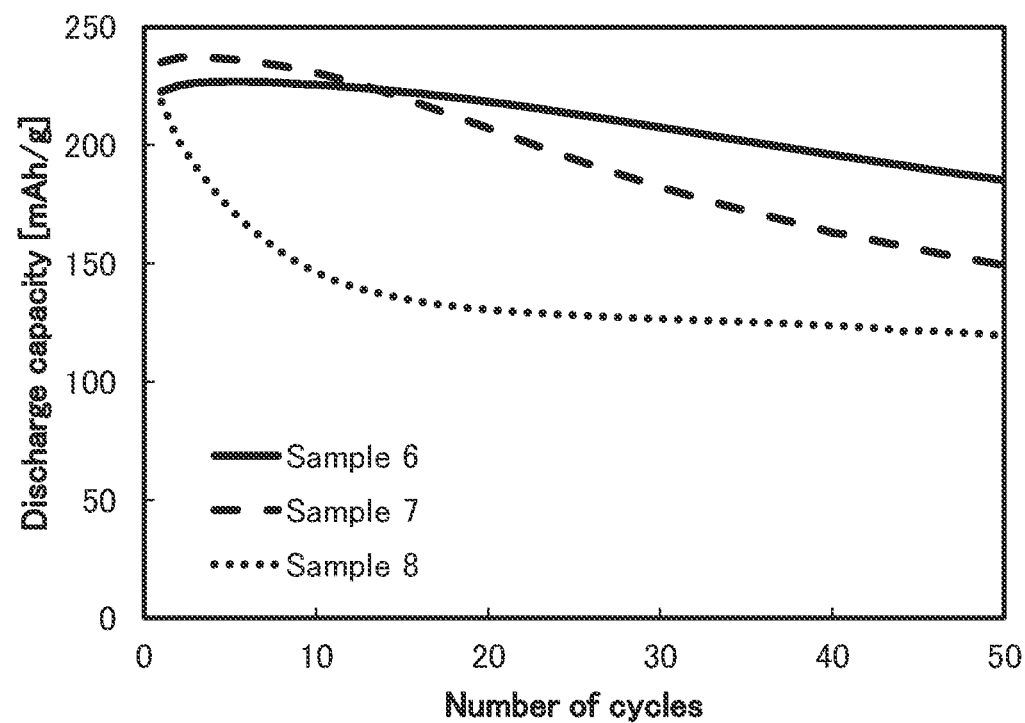
Figure 33A:
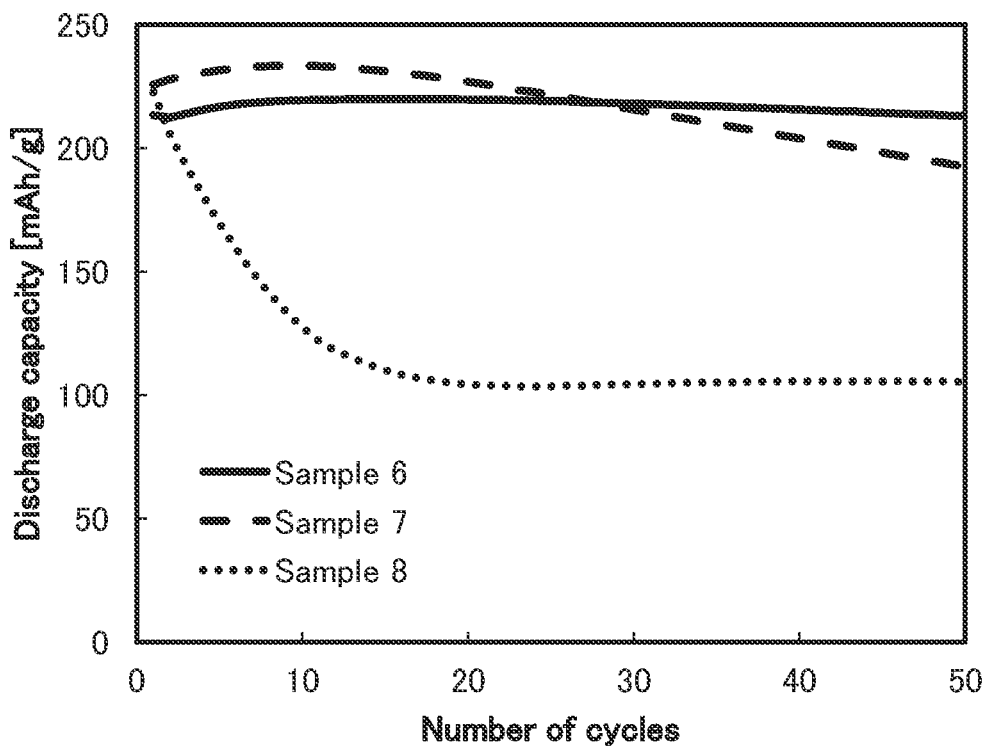
FIG. 33A and FIG. 33B are graphs showing cycle performance of secondary batteries at a charge voltage of 4.64 V.
Figure 33B:
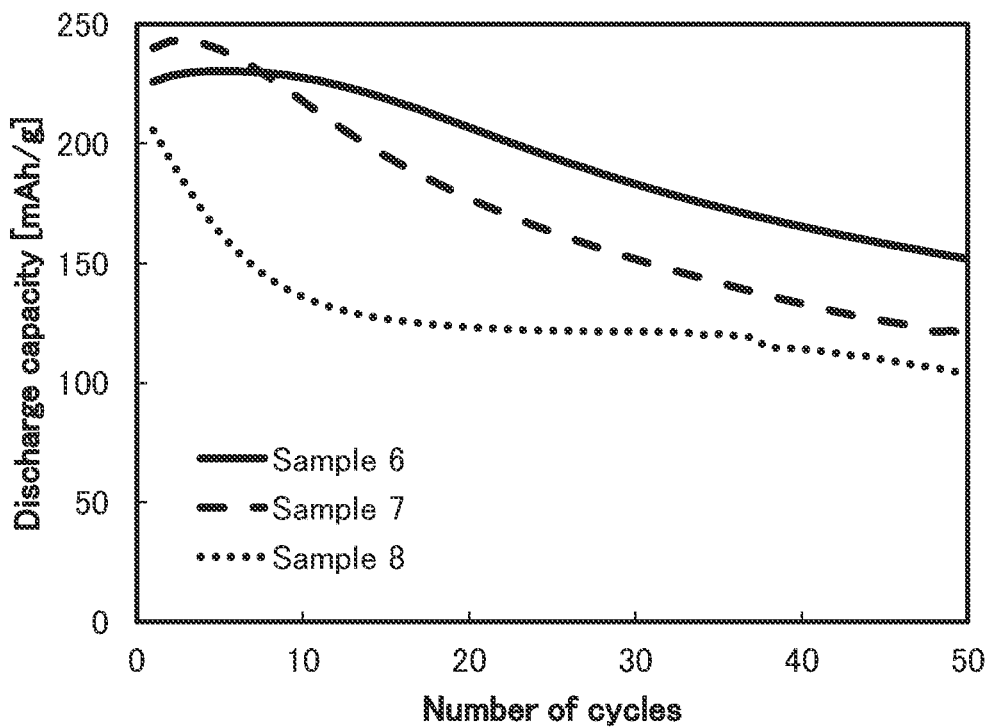
Figure 34A:
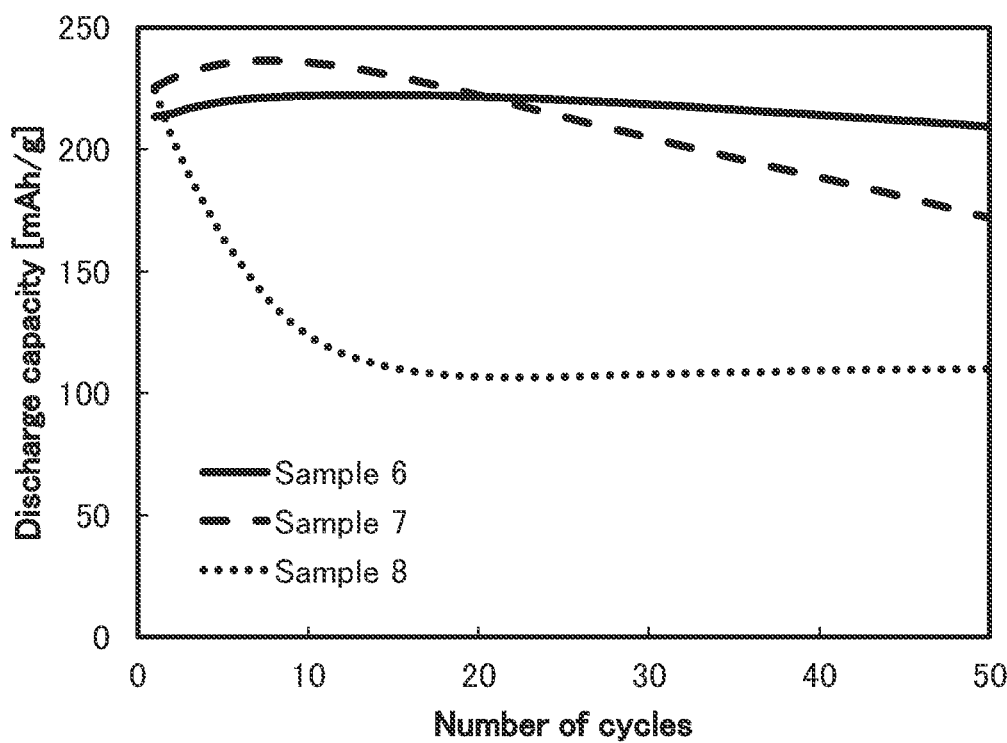
FIG. 34A and FIG. 34B are graphs showing cycle performance of secondary batteries at a charge voltage of 4.66 V.
Figure 34B:
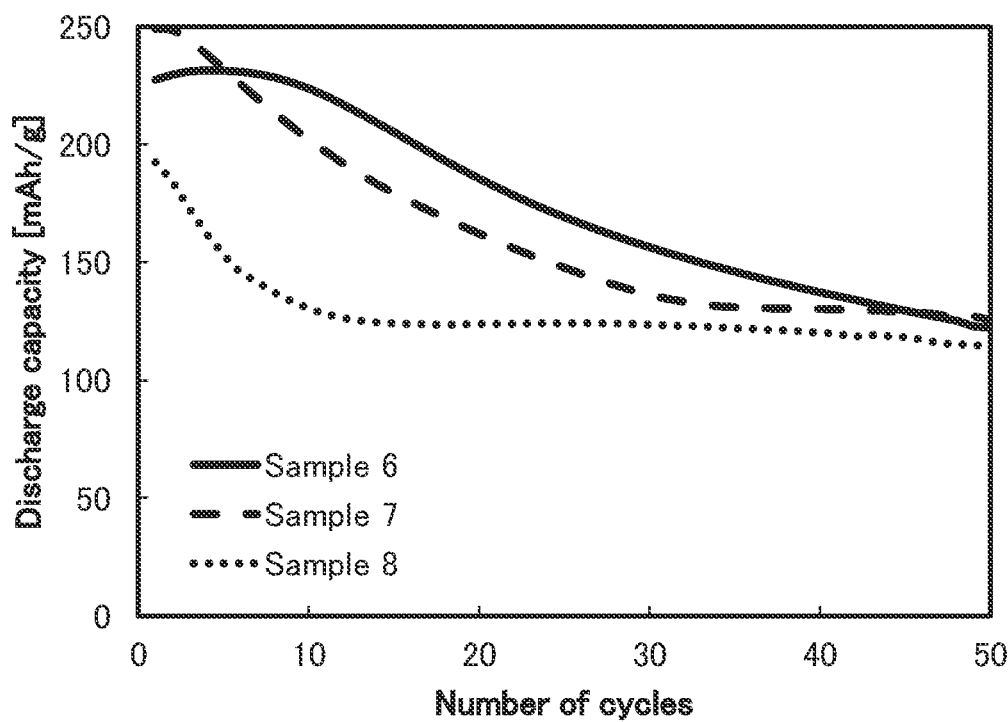

FIG. 31A shows cycle performance at 25° C. and a charge voltage of 4.60 V. FIG. 31B shows cycle performance at 45° C. and a charge voltage of 4.60 V. FIG. 32A shows cycle performance at 25° C. and a charge voltage of 4.62 V. FIG. 32B shows cycle performance at 45° C. and a charge voltage of 4.62 V. FIG. 33A shows cycle performance at 25° C. and a charge voltage of 4.64 V. FIG. 33B shows cycle performance at 45° C. and a charge voltage of 4.64 V. FIG. 34A shows cycle performance at 25° C. and a charge voltage of 4.66 V. FIG. 34B shows cycle performance at 45° C. and a charge voltage of 4.66 V.

Table 3 shows initial charge capacities and initial discharge capacities at 25° C. and 45° C. at the charge voltages. The capacities per weight of the active material are shown in the unit of mAh/g.

TABLE 3

| | | Charge voltage | | | |
|---|---|---|---|---|---|
| | | 4.60 V | 4.62 V | 4.64 V | 4.66 V |
| 25° C. charging | Sample 6 | 220.3 | 220.5 | 224.2 | 224.9 |
| | Sample 7 | 225.3 | 227.6 | 231.4 | 235.8 |
| | Sample 8 | 232.6 | 235.6 | 238.6 | 242.4 |
| 45° C. charging | Sample 6 | 230.4 | 231.2 | 234.7 | 237.0 |
| | Sample 7 | 235.8 | 242.2 | 247.7 | 258.6 |
| | Sample 8 | 235.4 | 241.4 | 243.7 | 246.3 |
| 25° C. discharging | Sample 6 | 211.5 | 209.8 | 213.4 | 213.4 |
| | Sample 7 | 220.2 | 221.9 | 225.7 | 229.2 |
| | Sample 8 | 219.0 | 217.2 | 222.7 | 224.2 |
| 45° C. discharging | Sample 6 | 224.2 | 222.7 | 225.9 | 227.4 |
| | Sample 7 | 231.1 | 235.1 | 240.0 | 248.1 |
| | Sample 8 | 216.7 | 218.3 | 205.5 | 192.4 |

As is apparent from FIG. 31 to FIG. 34, Sample 6 and Sample 7 showed excellent cycle performance compared with that of Sample 8, which was subjected to neither addition of other elements nor annealing. Although Sample 6 and Sample 7 showed any significant difference at 25° C. and a charge voltage of 4.6 V, Sample 6 tended to have more favorable cycle performance at a higher temperature and higher voltages.

It was revealed in Table 3 that Sample 8 had a large irreversible capacity due to the initial charge and discharge. The irreversible capacity tended to increase at a higher temperature and higher voltages. In contrast, Sample 6 and Sample 7 showed favorable performance with little irreversible capacity.

<Cycle Performance at 25° C., 45° C., 50° C., 55° C., and 60° C.>

Next, cycle performance of the coin cells fabricated using the positive electrode active materials of Sample 6 to Sample 8 at 25° C., 45° C., 50° C., 55° C., and 60° C. was evaluated. Specifically, the CCCV charge (100 mA/g, 4.6 V, termination current: 10 mA/g) and the CC discharge (100 mA/g, termination voltage: 2.5 V) were repeatedly performed at the temperatures.

Figure 35A:
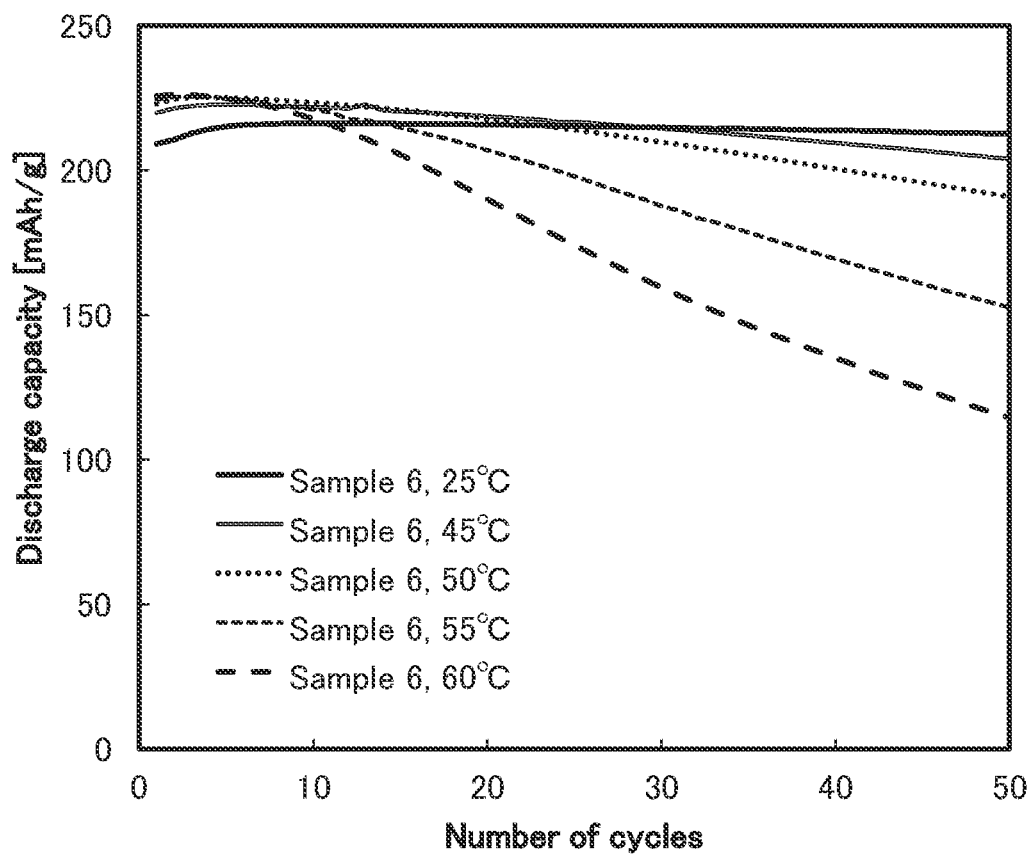
FIG. 35A is a graph showing cycle performance of secondary batteries using Sample 6.
Figure 35B:
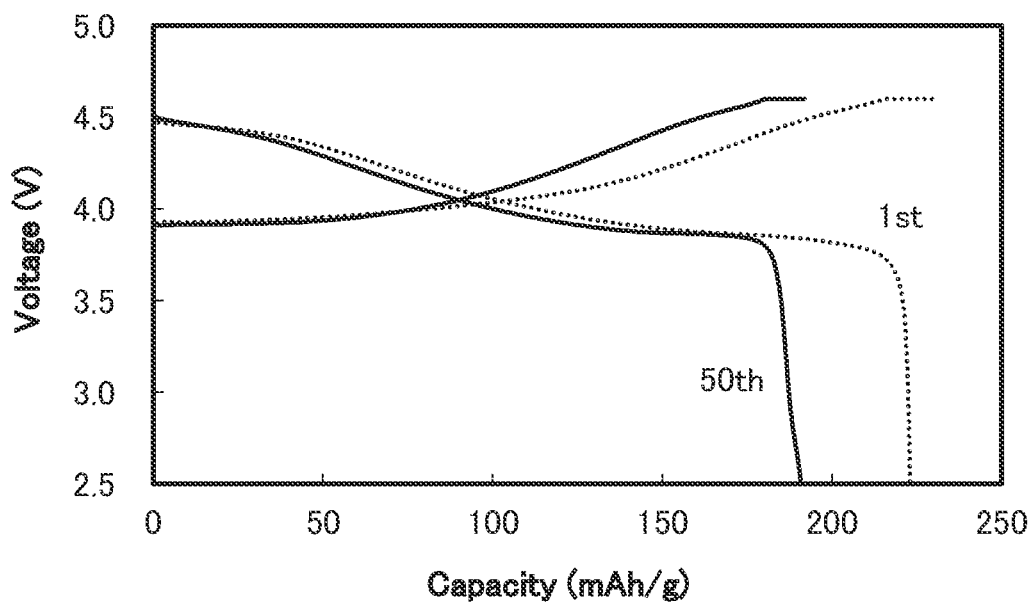
FIG. 35B is a graph showing 1st charge and discharge curves and 50th charge and discharge curves of the secondary battery using Sample 6 at 50° C. at a charge voltage of 4.60 V.
Figure 36A:
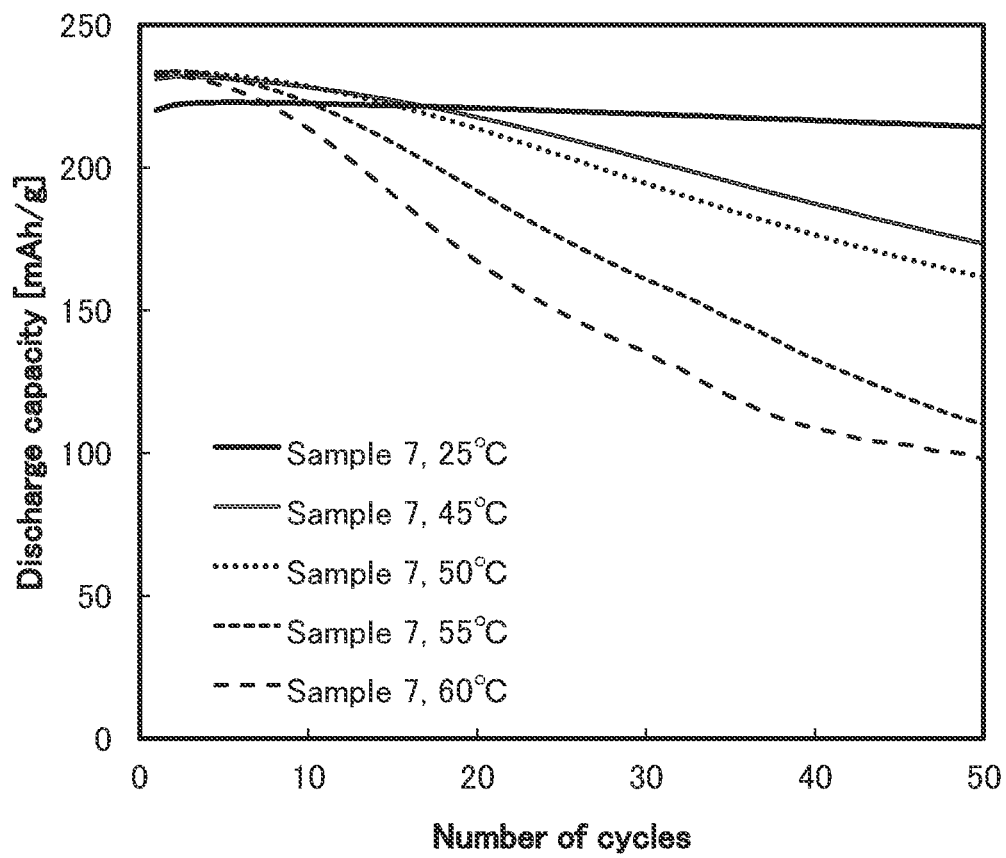
FIG. 36A is a graph showing cycle performance of secondary batteries using Sample 7.
Figure 36B:
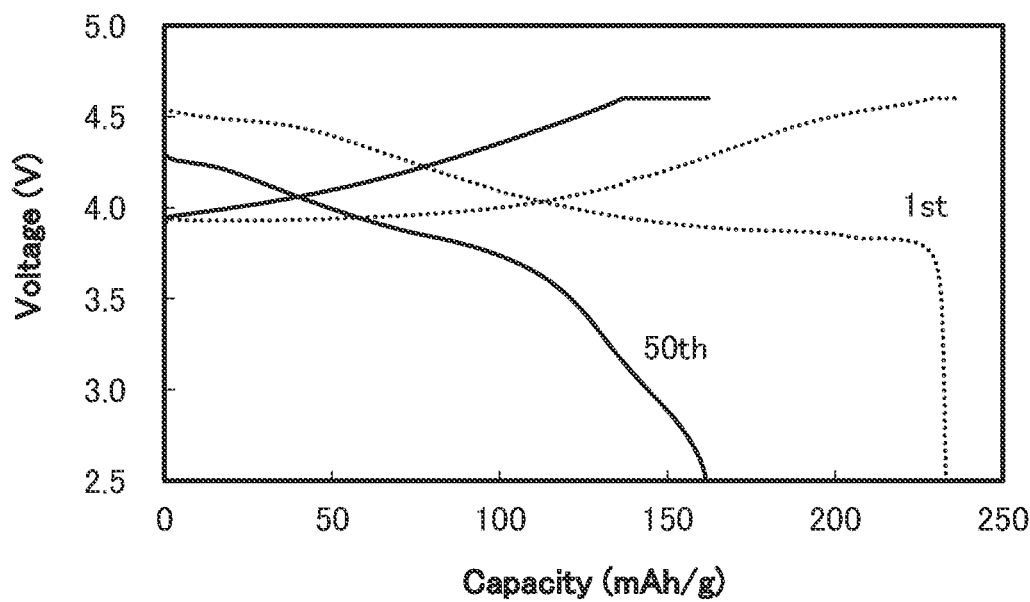
FIG. 36B is a graph showing 1st charge and discharge curves and 50th charge and discharge curves of the secondary battery using Sample 7 at 50° C. at a charge voltage of 4.60 V.
Figure 37A:
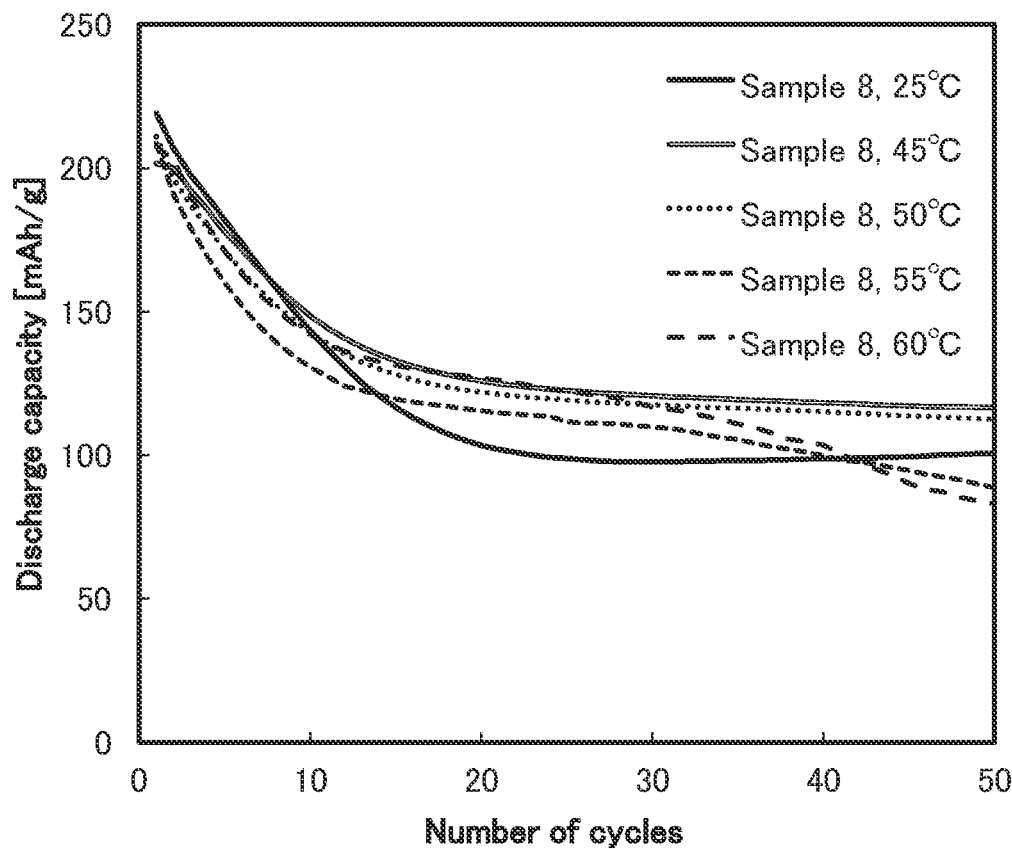
FIG. 37A is a graph showing cycle performance of secondary batteries using Sample 8.
Figure 37B:
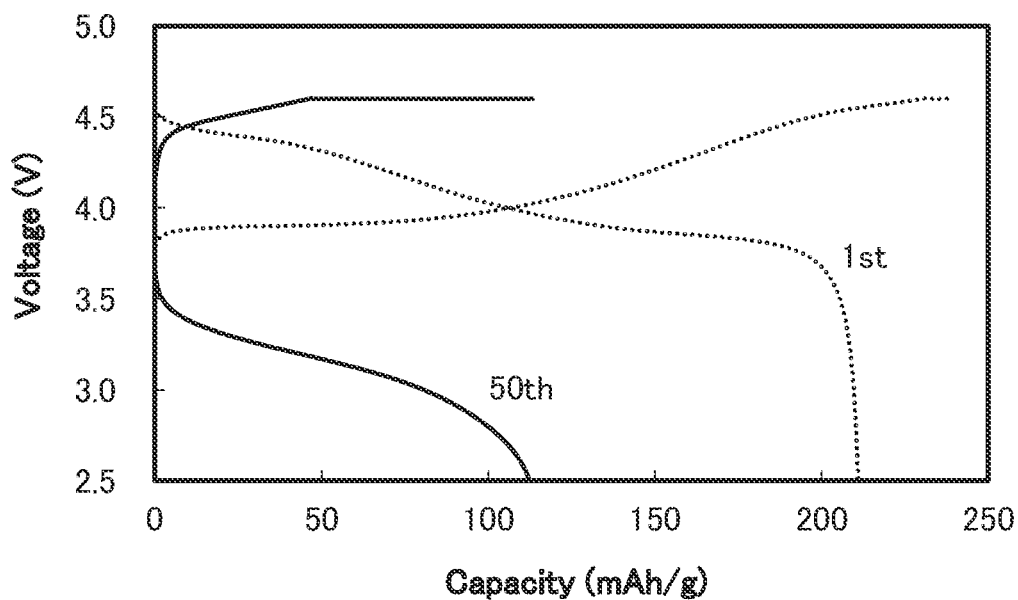
FIG. 37B is a graph showing 1st charge and discharge curves and 50th charge and discharge curves of the secondary battery using Sample 8 at 50° C. at a charge voltage of 4.60 V.

FIG. 35A shows cycle performance of Sample 6 at the temperatures. FIG. 35B shows 1st charge and discharge curves and 50th charge and discharge curves at 50° C. and a charge voltage of 4.60 V. FIG. 36A shows cycle performance of Sample 7 at the temperatures. FIG. 36B shows 1st charge and discharge curves and 50th charge and discharge curves at 50° C. and a charge voltage of 4.60 V. FIG. 37A shows cycle performance of Sample 8 at the temperatures. FIG. 37B shows 1st charge and discharge curves and 50th charge and discharge curves at 50° C. and a charge voltage of 4.60 V.

As is apparent from FIG. 35 to FIG. 37, Sample 6 and Sample 7 showed favorable cycle performance compared with that of Sample 8 at each of the temperatures. Sample 6 including nickel and aluminum showed especially excellent cycle performance at 25° C., 45° C., and 50° C. As shown by the discharge curves in FIG. 35B, high discharge voltage was maintained even at a charge voltage of 4.60 V and 50° C.

At a charge voltage of 4.6 V and 45° C., Sample 6 had an initial discharge capacity of 220.0 mA/g and a discharge capacity at the 50th cycle of 204.0 mA/g, and the decrease rate of the discharge capacity was as favorable as lower than 8%. At a charge voltage of 4.6 V and 50° C., the initial discharge capacity was 223.1 mA/g and the discharge capacity at the 50th cycle was 191.9 mA/g; thus, the decrease rate of the discharge capacity was as favorable as lower than 14%. Here, the decrease rate is a value representing an amount of discharge capacity decreased from the first cycle to a certain cycle with the discharge capacity at the first cycle being 100%.

<Continuous Charge Test>

Next, a continuous charge test was performed using the coin cells fabricated using the positive electrode active materials of Sample 6 to Sample 8. The continuous charge test is a test for evaluating stability and safety of a secondary battery by continuously charging the battery at a constant voltage for a long time.

One cycle of charge and discharge was performed first, and then continuous charge was performed. In the initial charge and discharge, the CCCV charge (38 mA/g, 4.5 V, termination current: 4 mA/g) and the CC discharge (38 mA/g, termination voltage: 3.0 V) were performed at 25° C. In the continuous charge, the CCCV charge (96 mA/g, 4.60 V, 4.62 V, 4.64 V, or 4.66 V) was performed at 60° C. The measurement period of the test was 250 hours.

Figure 38A:
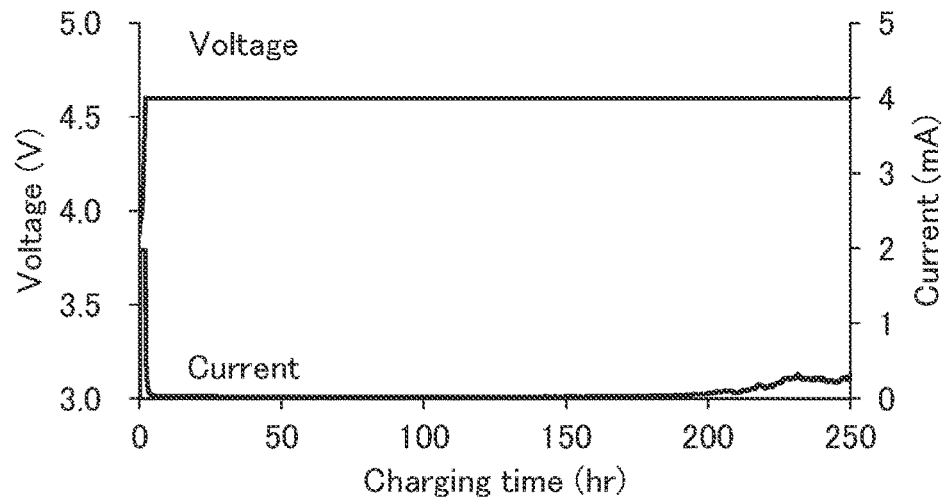
FIG. 38A to FIG. 38C are graphs showing continuous charge characteristics of secondary batteries at a voltage of 4.60 V.
Figure 38B:
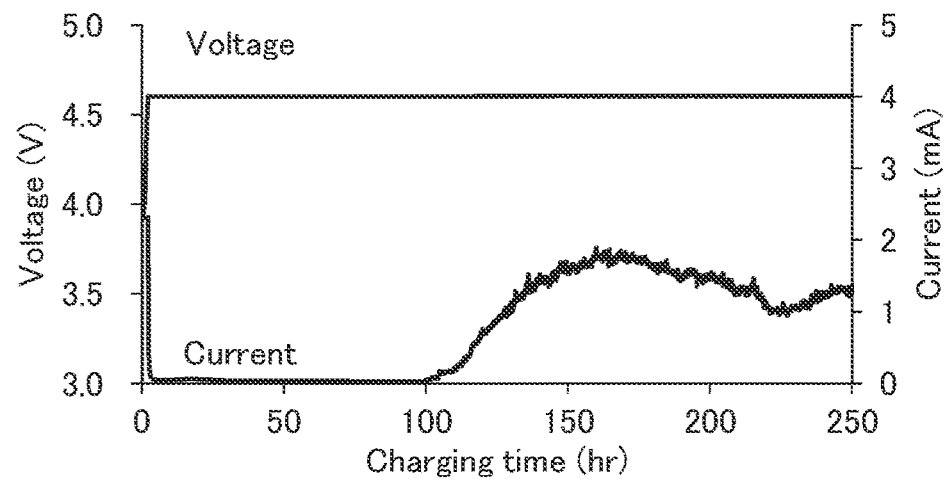
Figure 38C:
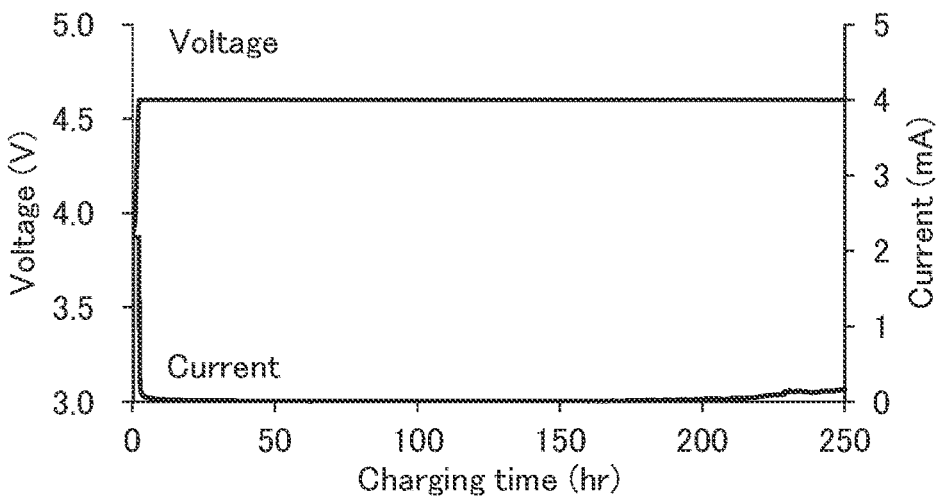

FIG. 38A to FIG. 38C show the results at a voltage of 4.60 V; the horizontal axis represents charging time and the vertical axis represents voltage and current. FIG. 38A, FIG. 38B, and FIG. 38C show the results of the continuous charge test on Sample 6, Sample 7, and Sample 8, respectively.

Figure 39A:
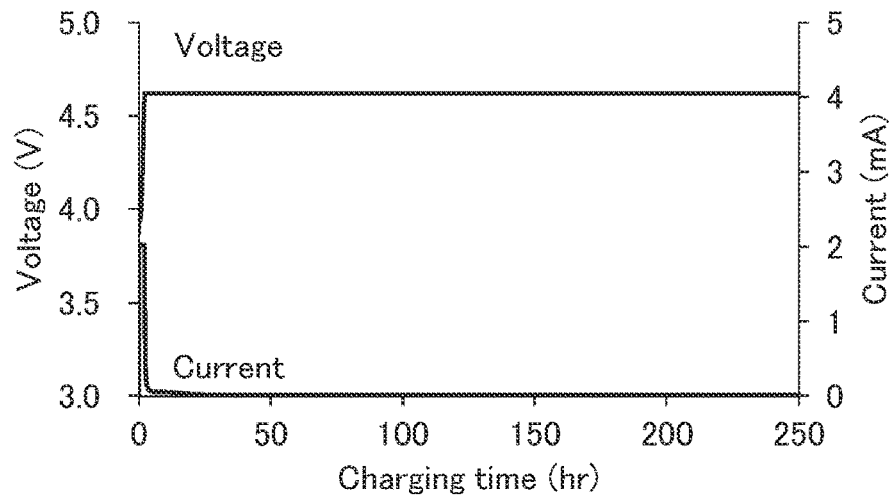
FIG. 39A to FIG. 39C are graphs showing continuous charge characteristics of the secondary batteries at a voltage of 4.62 V.
Figure 39B:
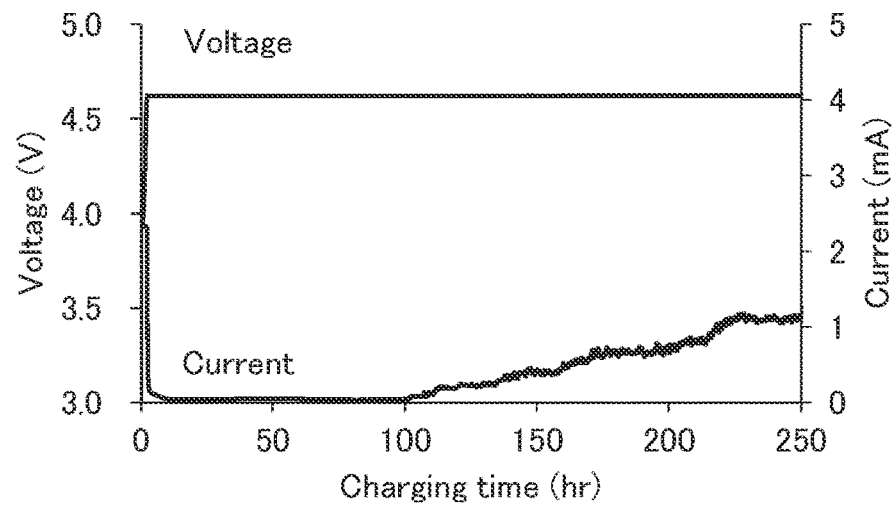
Figure 39C:
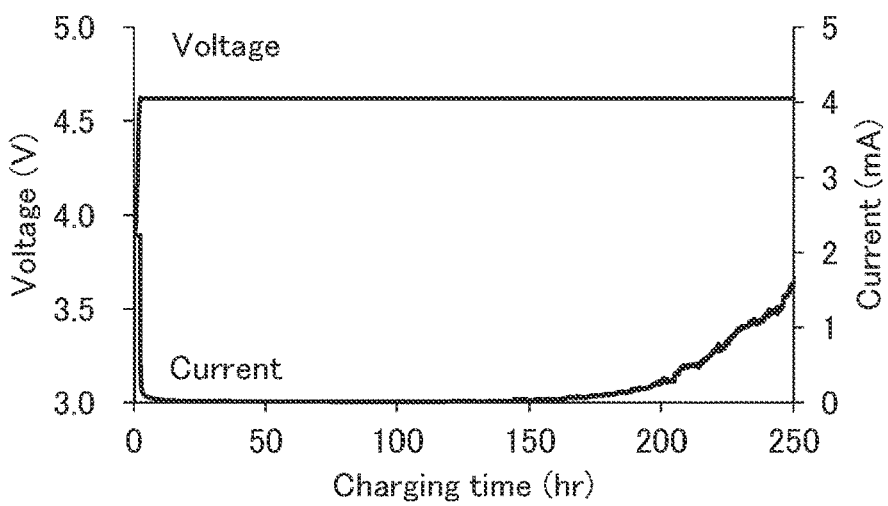

FIG. 39A to FIG. 39C show the results at a voltage of 4.62 V; the horizontal axis represents charging time and the vertical axis represents voltage and current. Similarly, FIG. 39A, FIG. 39B, and FIG. 39C show the results of the continuous charge test on Sample 6, Sample 7, and Sample 8, respectively.

Figure 40A:
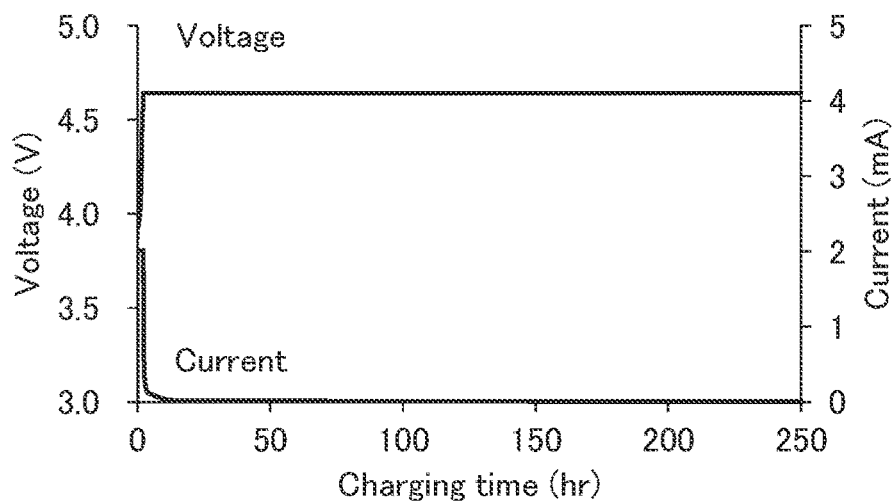
FIG. 40A to FIG. 40C are graphs showing continuous charge characteristics of the secondary batteries at a voltage of 4.64 V.
Figure 40B:
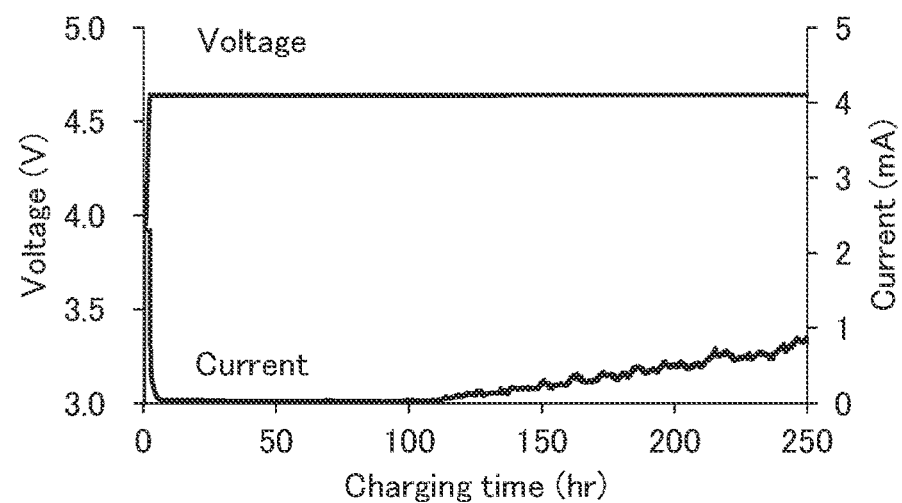
Figure 40C:
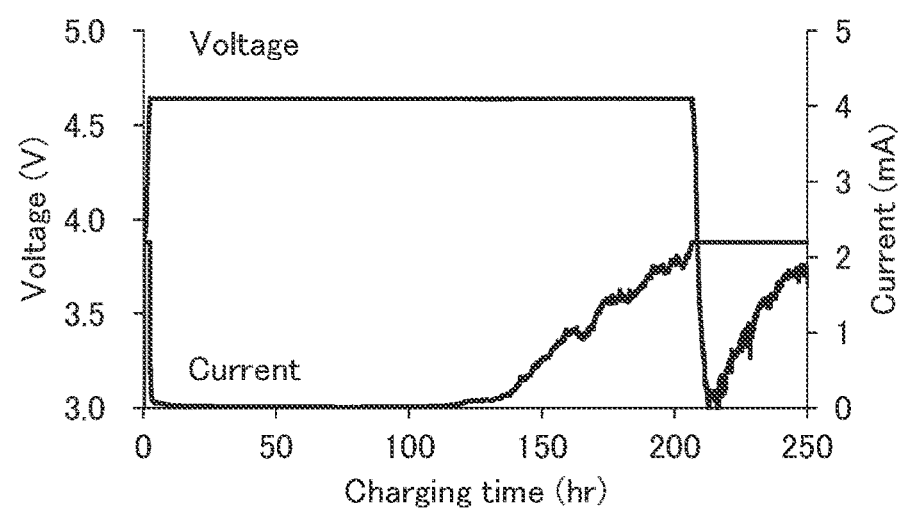

FIG. 40A to FIG. 40C show the results at a voltage of 4.64 V; the horizontal axis represents charging time and the vertical axis represents voltage and current. Similarly, FIG. 40A, FIG. 40B, and FIG. 40C show the results of the continuous charge test on Sample 6, Sample 7, and Sample 8, respectively.

Figure 41A:
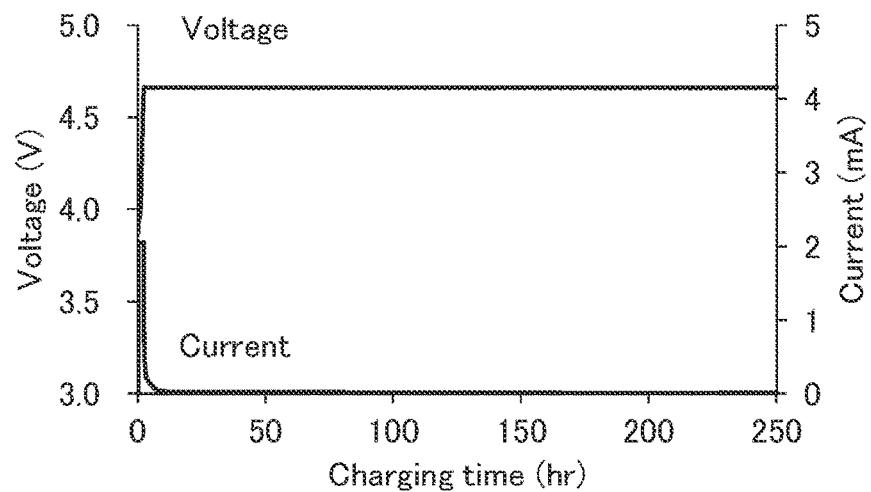
FIG. 41A to FIG. 41C are graphs showing continuous charge characteristics of the secondary batteries at a voltage of 4.66 V.
Figure 41B:
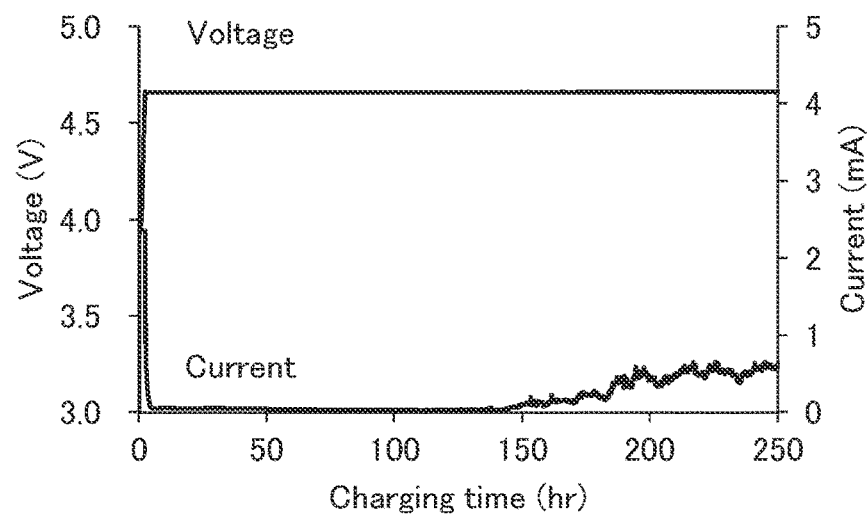
Figure 41C:
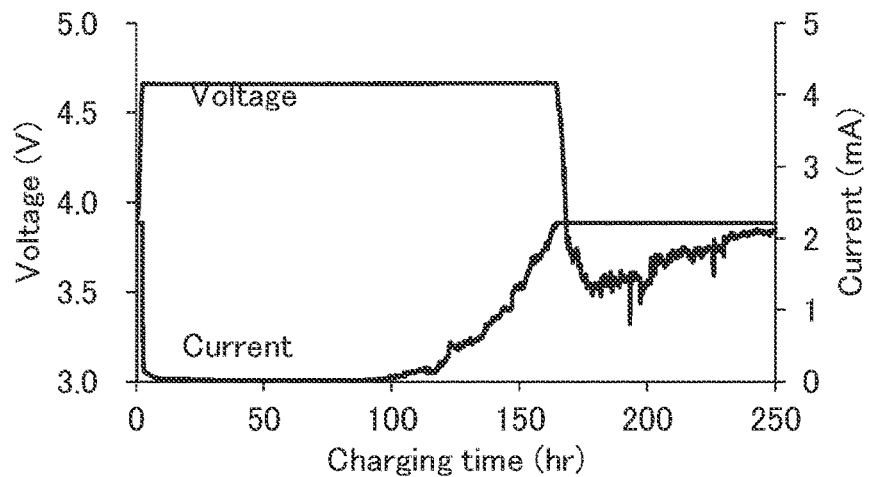

FIG. 41A to FIG. 41C show the results at a voltage of 4.66 V; the horizontal axis represents charging time and the vertical axis represents voltage and current. Similarly, FIG. 41A, FIG. 41B, and FIG. 41C show the results of the continuous charge test on Sample 6, Sample 7, and Sample 8, respectively.

As shown in FIG. 38 to FIG. 41, Sample 8, which was a comparative example, showed comparatively stable continuous charge characteristics at 4.6 V but showed a current increase that is probably derived from short circuit within 200 hours at 4.62 V or higher.

In contrast, Sample 6 showed more stable continuous charge characteristics as the voltage becomes higher, revealing a high level of safety even under conditions of a high temperature of 60° C. and high voltages of 4.62 V or higher.

Figure 42:
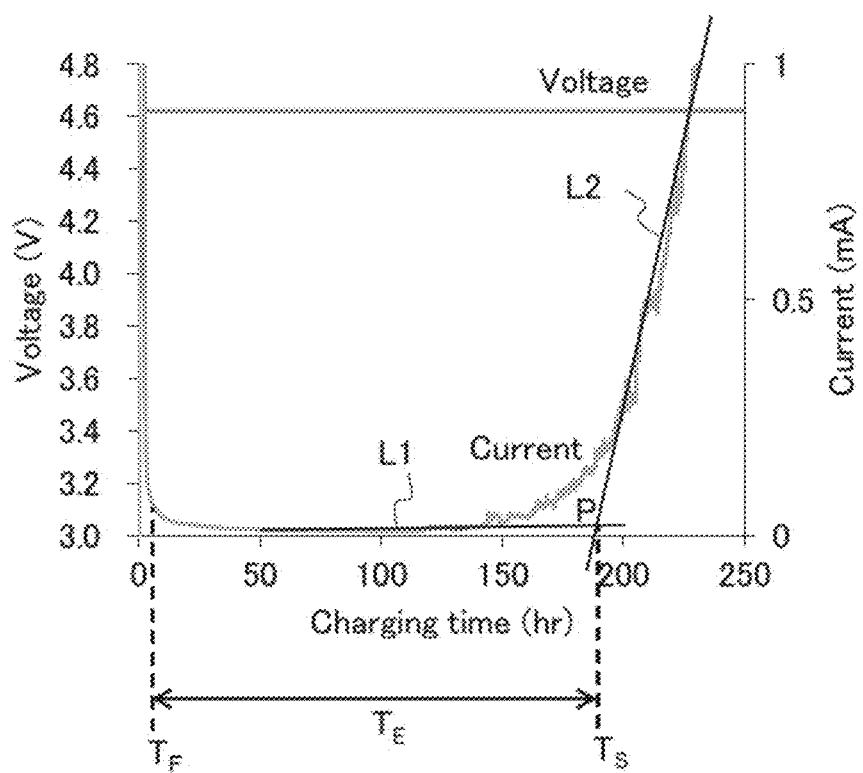
FIG. 42 is a graph showing endurance time in a continuous charge test.
Figure 43A:
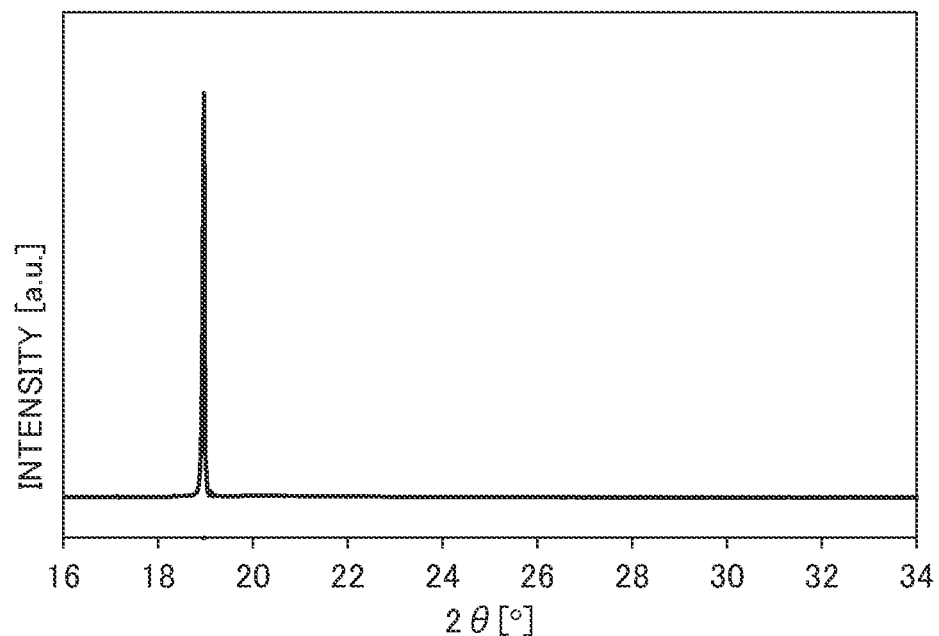
FIG. 43A and FIG. 43B are graphs showing XRD evaluation results.
Figure 43B:
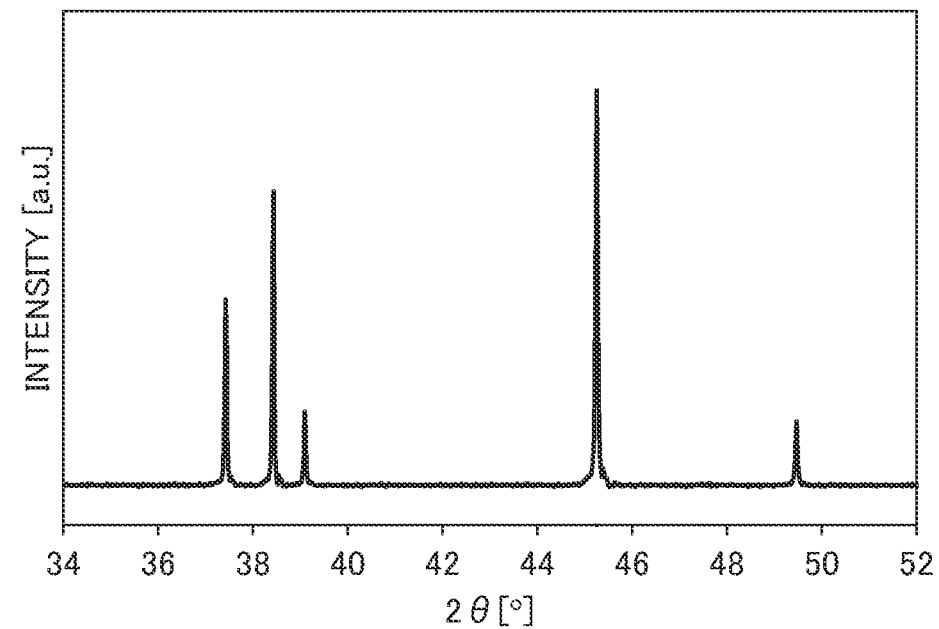
Figure 44A:
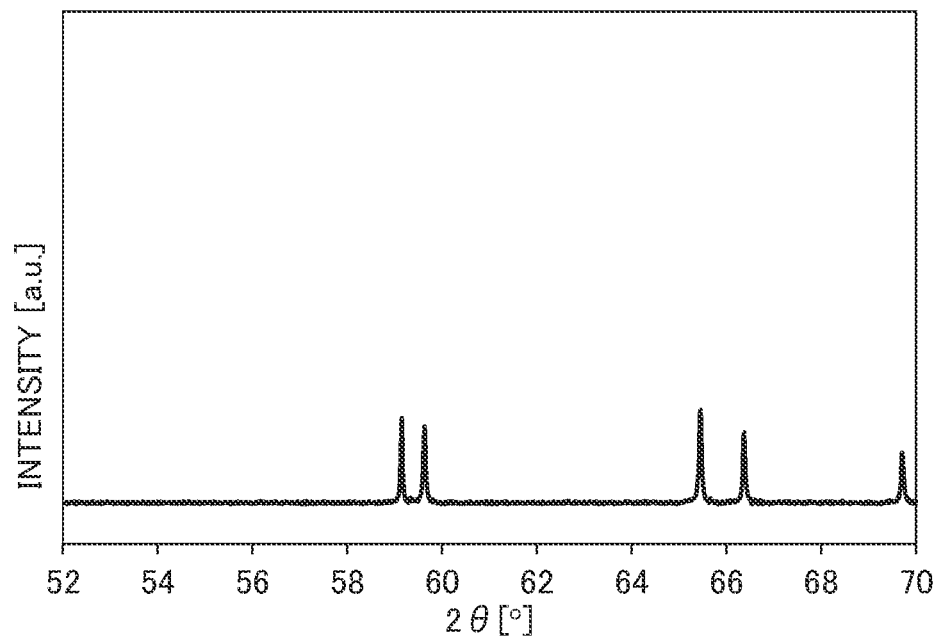
FIG. 44A and FIG. 44B are graphs showing XRD evaluation results.
Figure 44B:
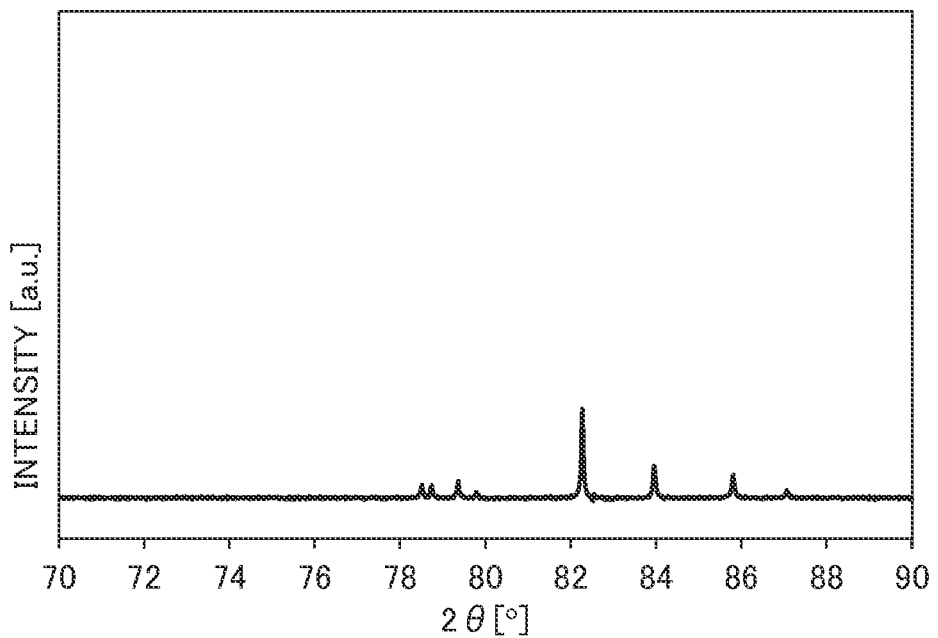

Next, the endurance time of the secondary batteries were measured from FIG. 38 to FIG. 41. The endurance time is described using FIG. 42. In FIG. 42, the horizontal axis represents charging time and the vertical axis represents voltage and current.

Endurance time TE was obtained by subtracting CC charge finish time $T_F$ from short-circuit time $T_S$. Short-circuit time $T_S$ was the time at a point P of intersection of an approximate line L1 for a period when a low current is stably maintained after the start of the CV charge and an approximate line L2 for a period when a current increase that is probably derived from short circuit occurs.

Table 4 shows the endurance time of Sample 6 to Sample 8. The unit is time.

TABLE 4

| | Charge voltage | | | |
|---|---|---|---|---|
| | 4.6 V | 4.62 V | 4.64 V | 4.66 V |
| Sample 6 | 205 | >250 | >250 | >250 |
| Sample 7 | 101 | 101 | 106 | 140 |
| Sample 8 | 198 | 192 | 130 | 108 |

As shown in Table 4, the endurance time of Sample 6 was over 200 hours in every condition. In particular, the endurance time at charge voltages of 4.62 V, 4.64 V, and 4.66 V was over 250 hours, showing an extremely high level of safety even at a high temperature and high voltages.

REFERENCE NUMERALS

SW1: switch, SW2: switch, SW3: switch, 78i: current, 81: mixture, 91: material, 92: material, 93: material, 94: material, 95: metal oxide, 100: positive electrode active material, 210: electrode stack, 211a: positive electrode, 211b: negative electrode, 212a: lead, 212b: lead, 214: separator, 215a: bonding portion, 215b: bonding portion, 217: fixing member, 250: secondary battery, 251: exterior body, 261: folded portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: glasses-type device, 400a: frame, 400b: display portion, 401: headset-type device, 401a: microphone portion, 401b: flexible pipe, 401c: earphone portion, 402: device, 402a: housing, 402b: secondary battery, 403: device, 403a: housing, 403b: secondary battery, 405: watch-type device, 405a: display portion, 405b: belt portion, 406: belt-type device, 406a: belt portion, 406b: wireless power feeding and receiving portion, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: wiring, 617: temperature control device, 900: circuit board, 902: mixture, 903: mixture, 904: mixture, 905: mixture, 906: mixture, 907: mixture, 908: mixture, 909: mixture, 910: label, 911: terminal, 912: circuit, 913: secondary battery, 914: antenna, 915: antenna, 916: layer, 917: layer, 918: antenna, 920: display device, 921: sensor, 922: terminal, 930: housing, 930a: housing, 930b: housing, 931: negative electrode, 932: positive electrode, 933: separator, 950: wound body, 951: terminal, 952: terminal, 980: secondary battery, 981: film, 982: film, 993: wound body, 994: negative electrode, 995: positive electrode, 996: separator, 997: lead electrode, 998: lead electrode, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 7500: electronic cigarette, 7501: atomizer, 7502: cartridge, 7504: secondary battery, 8000: display device, 8001: housing, 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: door for refrigerator compartment, 8303: door for freezer compartment, 8304: secondary battery, 8400: automobile, 8401: headlight, 8406: electric motor, 8500: automobile, 8600: scooter, 8601: side mirrors, 8602: secondary battery, 8603: direction indicator, 8604: under-seat storage, 9600: tablet terminal, 9625: switch, 9626: switch, 9627: switch, 9628: operation switch, 9629: fastener, 9630: housing, 9630a: housing, 9630b: housing, 9631: display portion, 9631a: display portion, 9631b: display portion, 9633: solar cell, 9634: charge and discharge control circuit, 9635: power storage unit, 9636: DCDC converter, 9637: converter, 9640: movable portion

The invention claimed is:
1. A method for forming a positive electrode active material, the method comprising steps of:
   forming a first mixture in which a first material, a second material, and a third material are mixed;
   heating the first mixture to form a second mixture;
   forming a third mixture in which the second mixture, a fourth material, and a fifth material are mixed; and
   heating the third mixture,
   wherein the first material is a halogen compound comprising an alkali metal,
   wherein the second material comprises magnesium,
   wherein the third material is a metal oxide comprising the alkali metal and cobalt,
   wherein the fourth material comprises nickel,
   wherein the fifth material comprises aluminum,
   wherein the heating of the third mixture is performed in a treatment chamber of an annealing apparatus,
   wherein a total amount of the third mixture heated in the treatment chamber is more than or equal to 15 g,
   wherein the heating of the first mixture is performed in an atmosphere comprising oxygen,
   wherein the heating of the first mixture is performed in a temperature range higher than or equal to 600° C. and lower than or equal to 950° C. for more than or equal to 1 hour and less than or equal to 100 hours, wherein the heating of the third mixture is performed in an atmosphere comprising oxygen, wherein the heating of the third mixture is performed in a temperature range higher than or equal to 600° C. and lower than or equal to 950° C. for more than or equal to 1 hour and less than or equal to 100 hours, and wherein a temperature of the heating of the third mixture is lower than a temperature of the heating of the first mixture by 20° C. or more.

2. The method for forming a positive electrode active material according to claim 1, wherein the alkali metal is lithium, wherein the first material is lithium fluoride, and wherein the second material is magnesium fluoride.

3. The method for forming a positive electrode active material according to claim 1, wherein the fourth material is nickel hydroxide, and wherein the fifth material is aluminum hydroxide.

4. A method for forming a positive electrode active material, the method comprising steps of:

forming a first mixture in which a first material, a second material, a third material, and a fourth material are mixed; and heating the first mixture, wherein the first material is a halogen compound comprising an alkali metal, wherein the second material comprises magnesium, wherein the third material comprises one or more selected from nickel, aluminum, titanium, vanadium, and chromium, wherein the fourth material is a metal oxide comprising the alkali metal and cobalt, wherein the heating of the first mixture is performed in a temperature range higher than or equal to 600° C. and lower than or equal to 950° C. for more than or equal to 1 hour and less than or equal to 100 hours, wherein when a second mixture is formed by mixing the first material, the second material, and the third material, and the second mixture is subjected to differential scanning calorimetry, the second mixture has a first peak having a local minimum value in a range higher than or equal to 620° C. and lower than or equal to 920° C., and wherein the first peak is a negative peak.

5. The method for forming a positive electrode active material according to claim 4, wherein the alkali metal is lithium, wherein the first material is lithium fluoride, and wherein the second material is magnesium fluoride.

6. The method for forming a positive electrode active material according to claim 4, wherein the third material comprises nickel, wherein the first mixture is a mixture in which a fifth material is mixed with the first material, the second material, the third material, and the fourth material, and wherein the fifth material comprises aluminum.

7. The method for forming a positive electrode active material according to claim 6, wherein the third material is nickel hydroxide.

8. The method for forming a positive electrode active material according to claim 4, wherein a half width of the first peak is lower than 100° C.

9. The method for forming a positive electrode active material according to claim 4, wherein a measurement temperature range of the differential scanning calorimetry comprises a range higher than or equal to 200° C. and lower than or equal to 850° C.

10. The method for forming a positive electrode active material according to claim 4, wherein the heating of the first mixture is performed in an atmosphere that comprises oxygen.

* * * * *